H. A. MARTIN.
CASH REGISTER.
APPLICATION FILED OCT. 18, 1915.

1,323,303.

Patented Dec. 2, 1919.
24 SHEETS—SHEET 1.

Inventor
HAAKON A. MARTIN
by R. C. haas
Carl Beust
Attorney

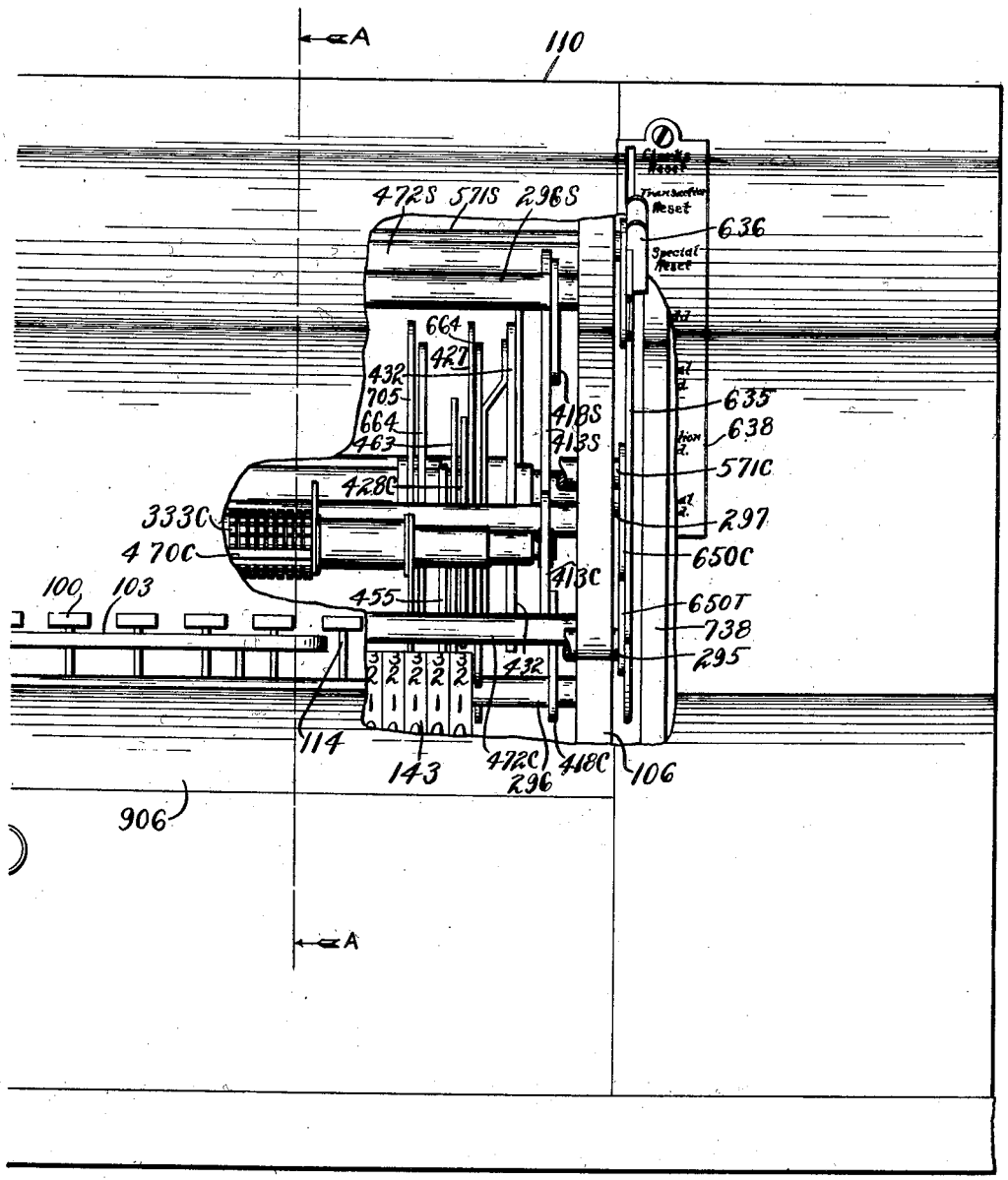

H. A. MARTIN.
CASH REGISTER.
APPLICATION FILED OCT. 18, 1915.

1,323,303.

Patented Dec. 2, 1919.
24 SHEETS—SHEET 3.

Inventor
HAAKON A. MARTIN
by R. C. Sloan
Carl Beust
Attorneys

H. A. MARTIN.
CASH REGISTER.
APPLICATION FILED OCT. 18, 1915.

1,323,303.

Patented Dec. 2, 1919.
24 SHEETS—SHEET 4.

Inventor
HAAKON A. MARTIN
Attorneys

H. A. MARTIN.
CASH REGISTER.
APPLICATION FILED OCT. 18, 1915.
1,323,303.
Patented Dec. 2, 1919.
24 SHEETS—SHEET 5.
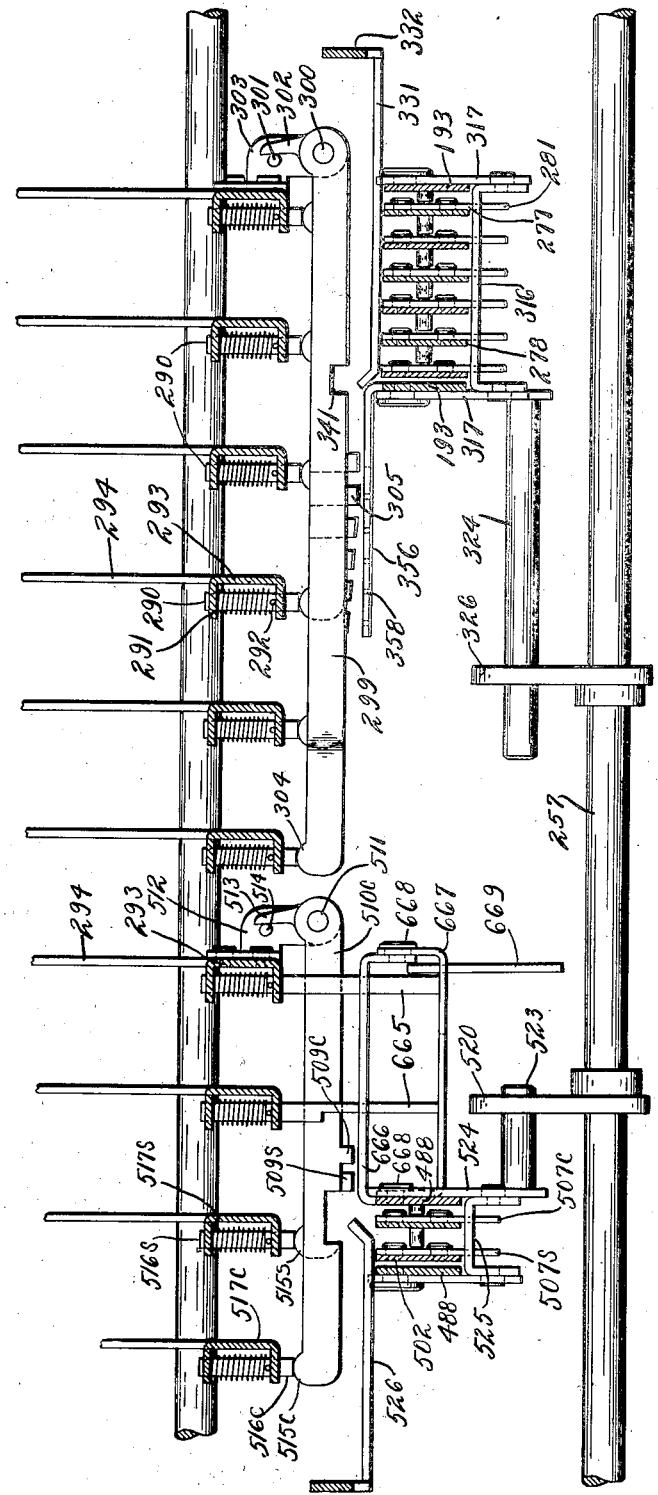
Inventor
HAAKON A. MARTIN
Carl Beust
Attorneys

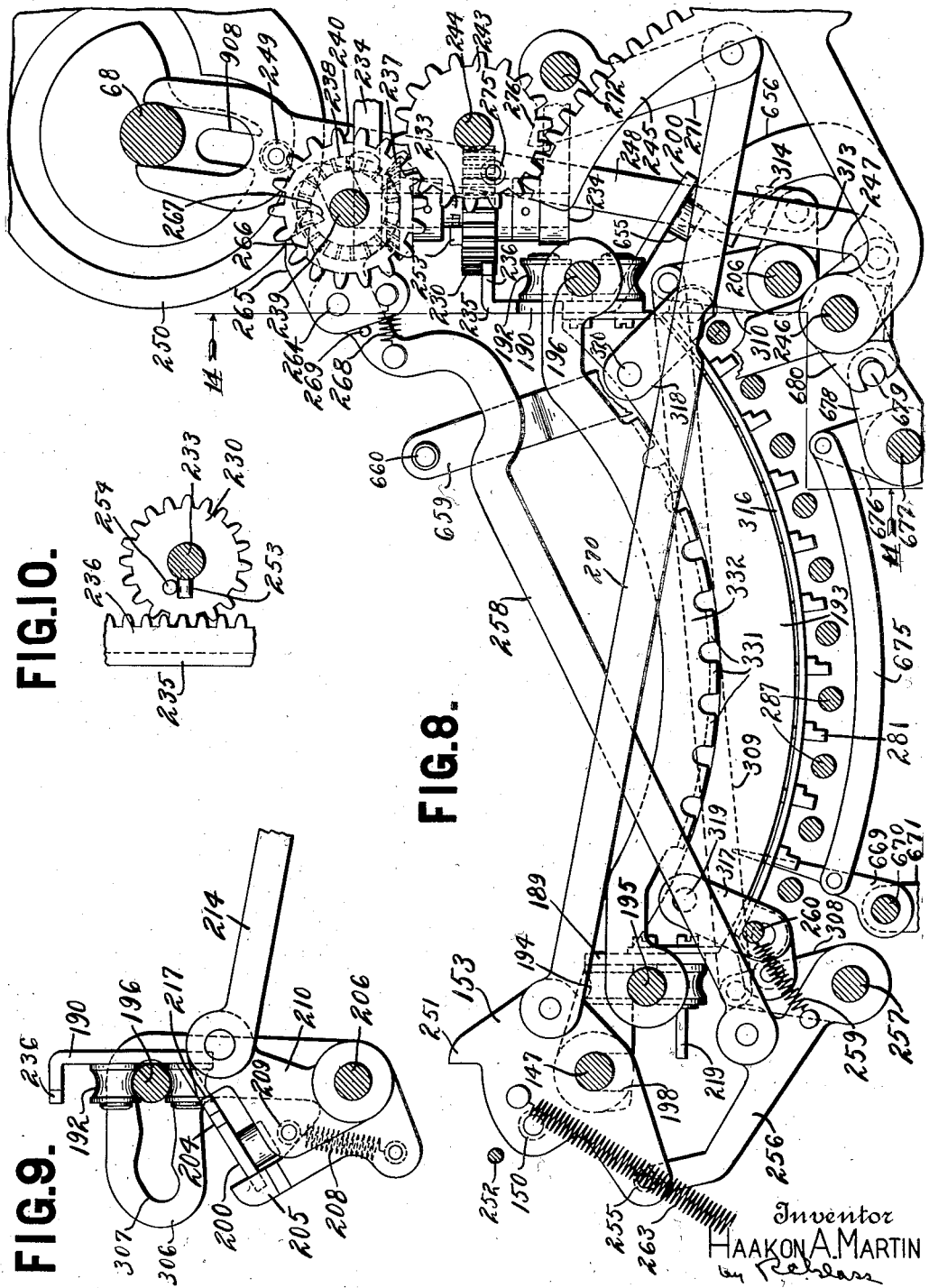

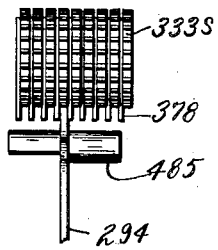
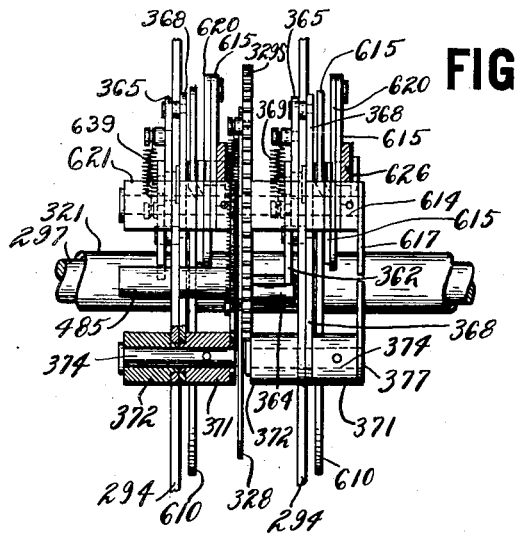
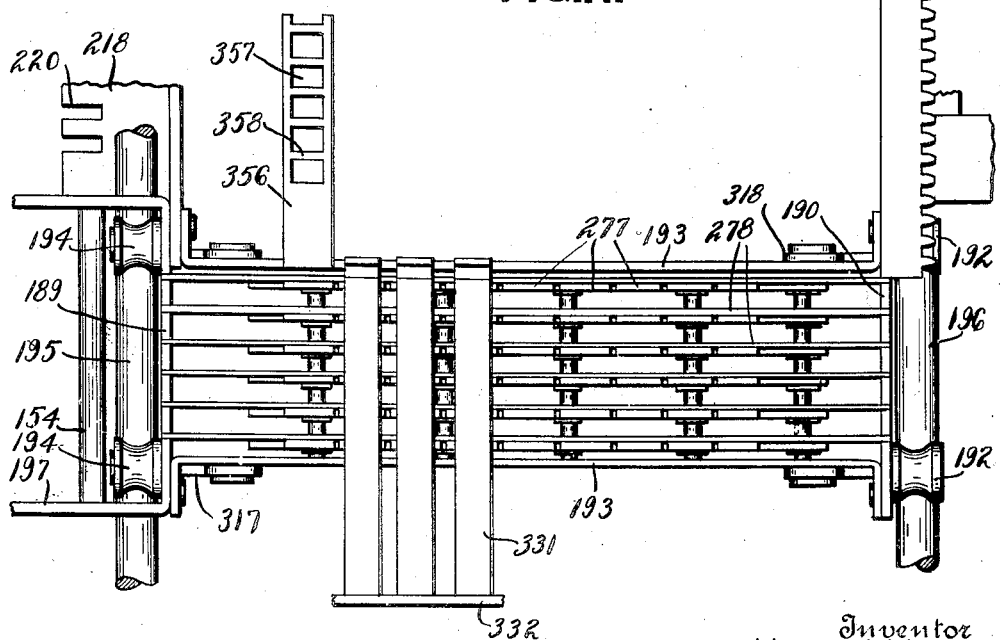

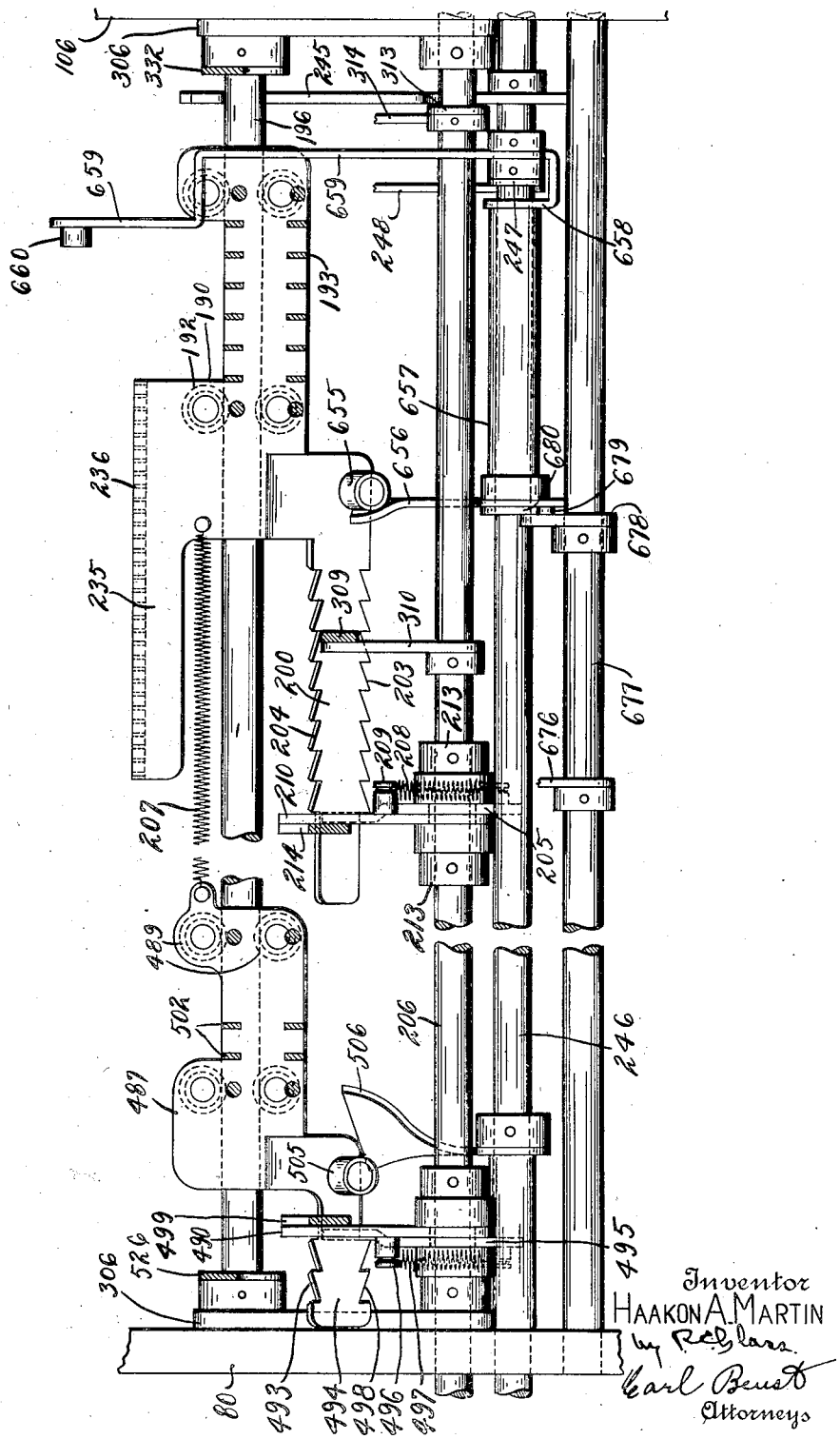

H. A. MARTIN.
CASH REGISTER.
APPLICATION FILED OCT. 18, 1915.

1,323,303.

Patented Dec. 2, 1919.
24 SHEETS—SHEET 9.

Inventor
HAAKON A. MARTIN
by Earl Beust
Attorneys

H. A. MARTIN.
CASH REGISTER.
APPLICATION FILED OCT. 18, 1915.

1,323,303.

Patented Dec. 2, 1919.
24 SHEETS—SHEET 10.

Inventor
HAAKON A. MARTIN
by R. S. Glass
Earl Benst
Attorneys

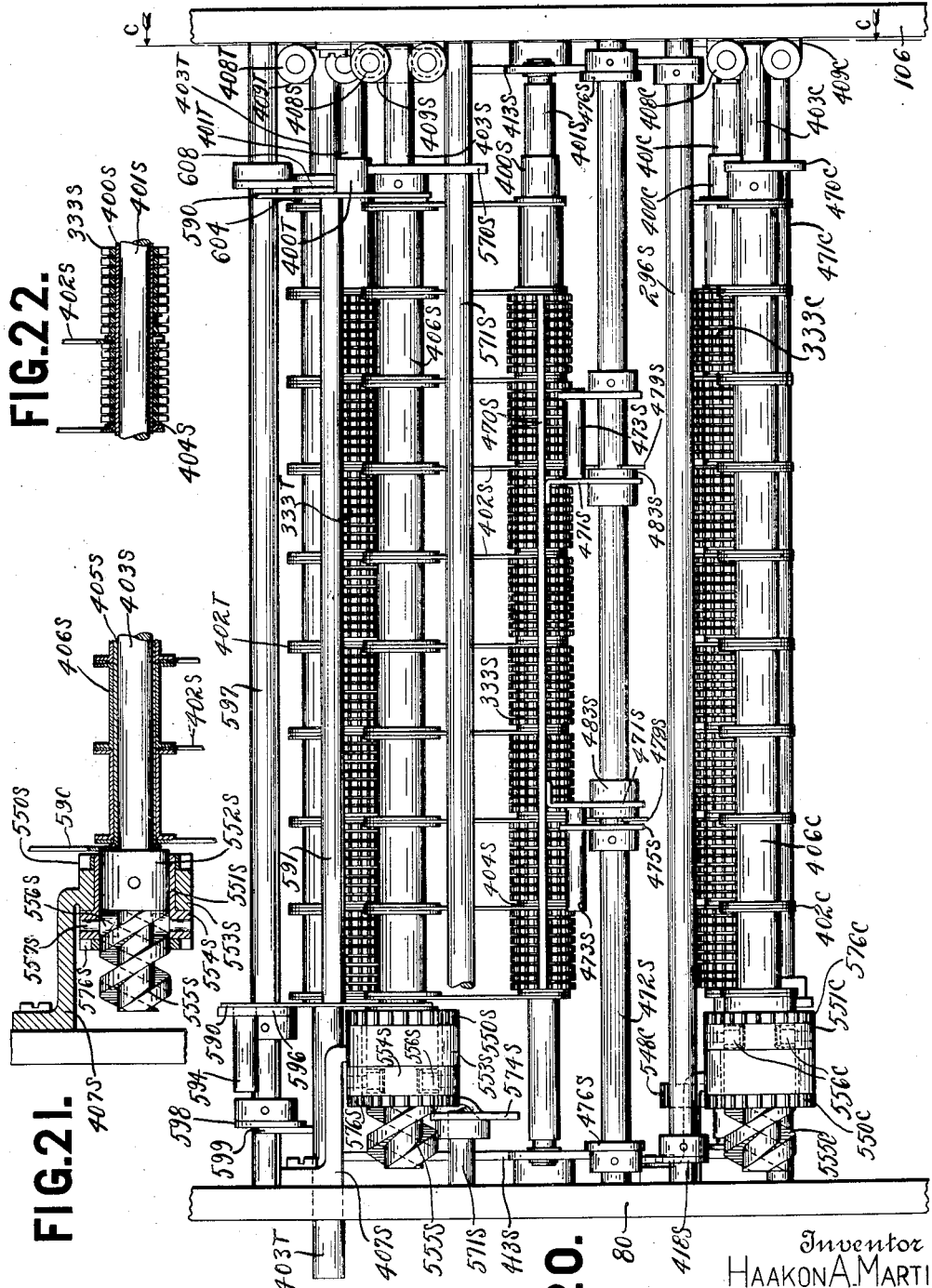

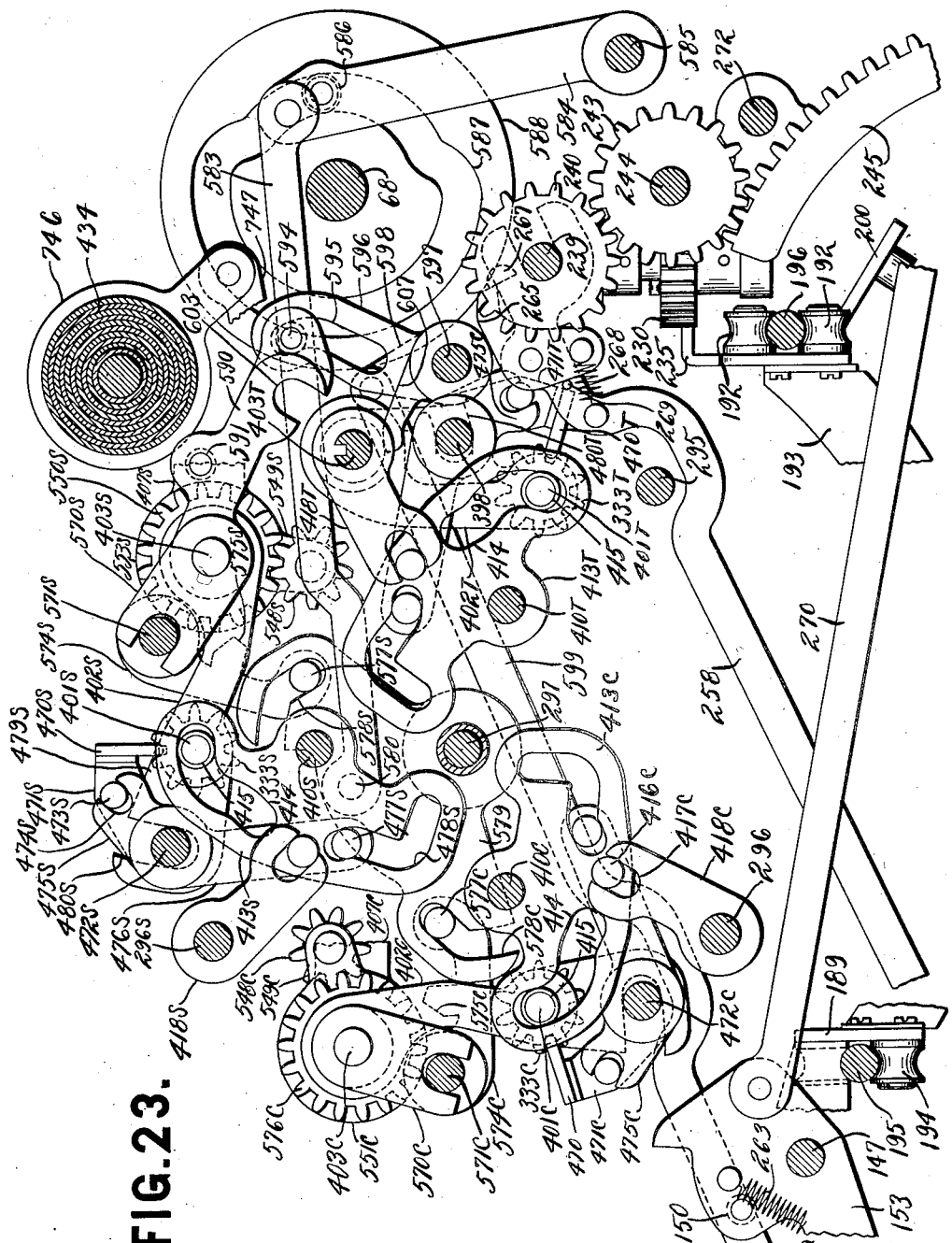

H. A. MARTIN.
CASH REGISTER.
APPLICATION FILED OCT. 18, 1915.

1,323,303.

Patented Dec. 2, 1919.
24 SHEETS—SHEET 14.

Inventor
HAAKON A. MARTIN
by R. C. Bloss
Carl Bent
Attorneys

H. A. MARTIN.
CASH REGISTER.
APPLICATION FILED OCT. 18, 1915.

1,323,303.

Patented Dec. 2, 1919.
24 SHEETS—SHEET 15.

Inventor
HAAKON A. MARTIN
Attorneys

H. A. MARTIN.
CASH REGISTER.
APPLICATION FILED OCT. 18, 1915.

1,323,303.

Patented Dec. 2, 1919.
24 SHEETS—SHEET 16.

Inventor
HAAKON A. MARTIN
Earl Beust
Attorneys

H. A. MARTIN.
CASH REGISTER.
APPLICATION FILED OCT. 18, 1915.

1,323,303.

Patented Dec. 2, 1919.
24 SHEETS—SHEET 18.

Inventor
HAAKON A. MARTIN
by R. Chlear
Carl Beust
Attorney

H. A. MARTIN.
CASH REGISTER.
APPLICATION FILED OCT. 18, 1915.

1,323,303.

Patented Dec. 2, 1919.
24 SHEETS—SHEET 20.

Inventor
HAAKON A. MARTIN
Attorneys

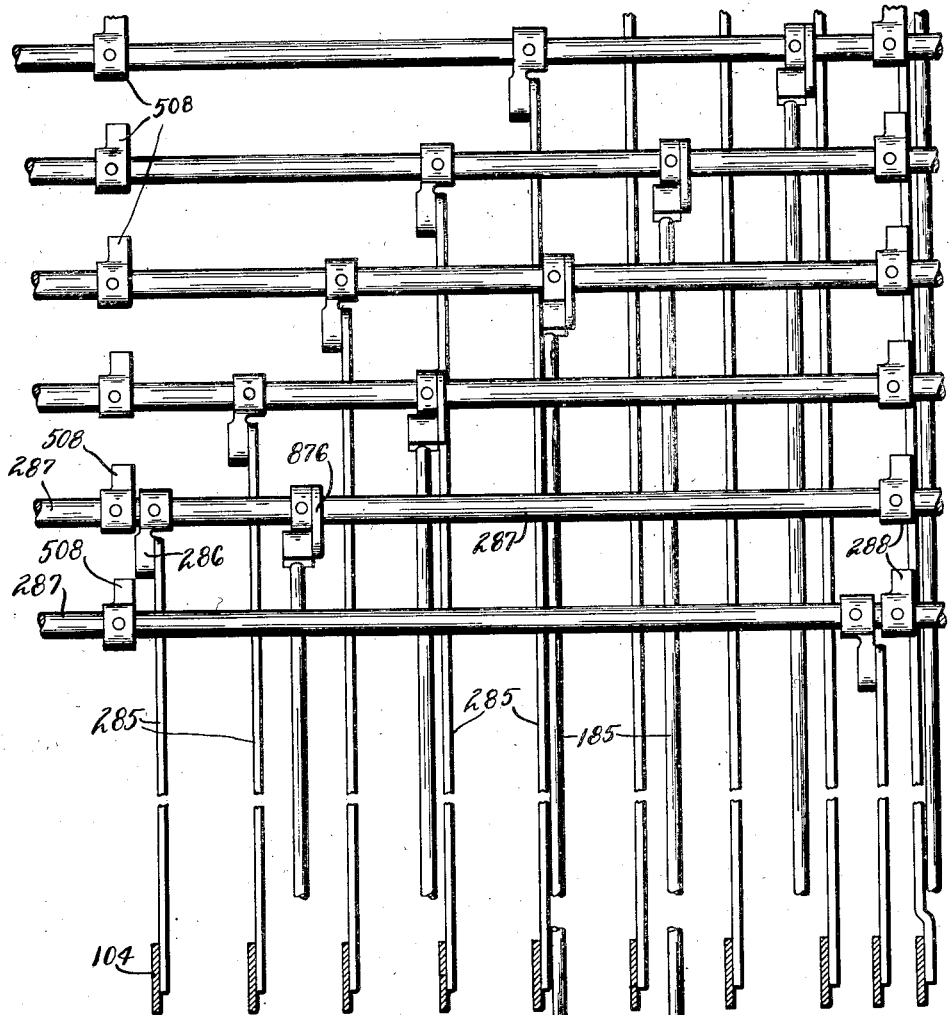
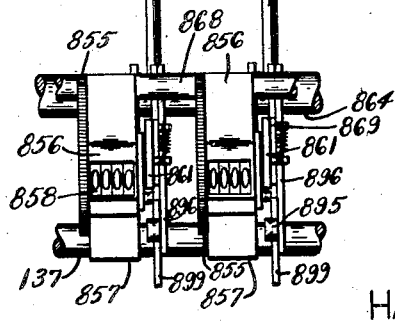
FIG. 42.

H. A. MARTIN.
CASH REGISTER.
APPLICATION FILED OCT. 18, 1915.

1,323,303.

Patented Dec. 2, 1919.
24 SHEETS—SHEET 22.

Inventor
HAAKON A. MARTIN

Attorneys

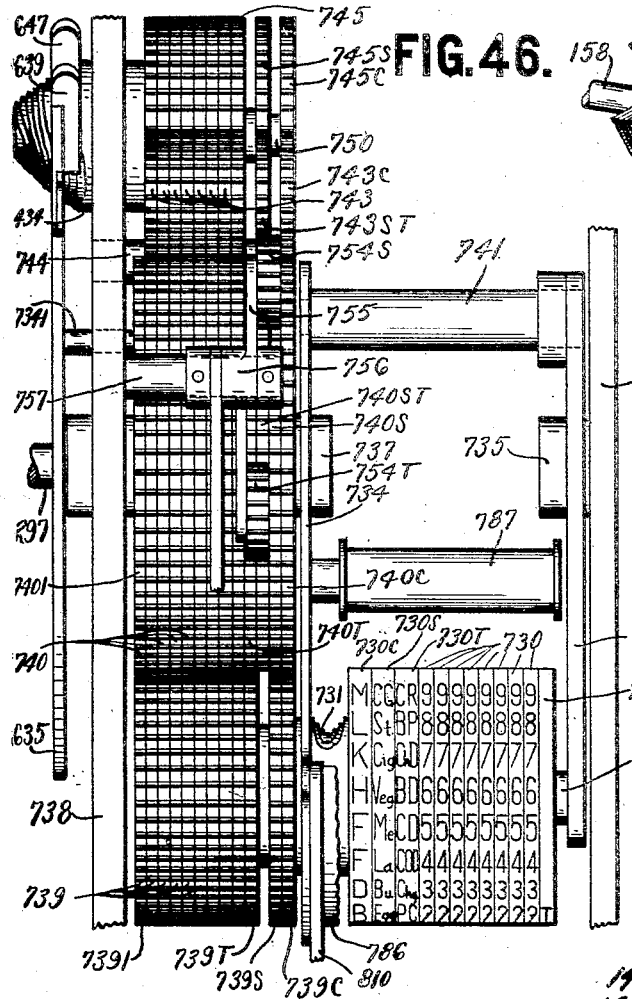
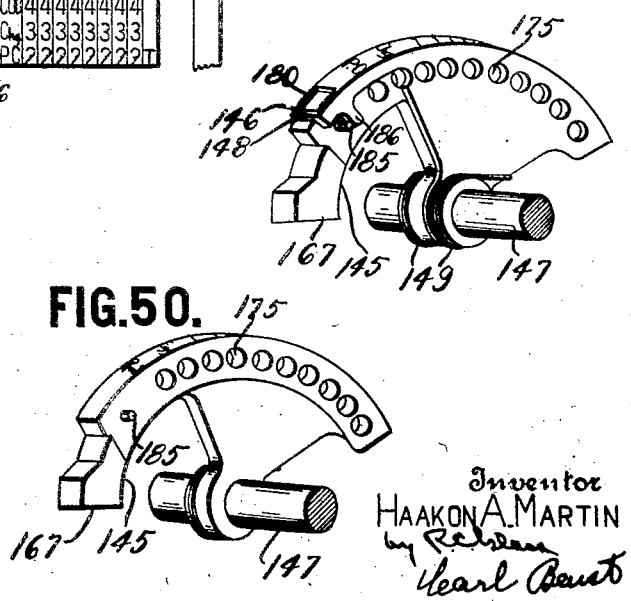

H. A. MARTIN.
CASH REGISTER.
APPLICATION FILED OCT. 18, 1915.

1,323,303.

Patented Dec. 2, 1919.
24 SHEETS—SHEET 24.

Inventor
HAAKON A. MARTIN
Attorney

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

CASH-REGISTER.

1,323,303.  Specification of Letters Patent.  Patented Dec. 2, 1919.

Application filed October 18, 1915. Serial No. 56,492.

*To all whom it may concern:*

Be it known that I, HAAKON A. MARTIN, a citizen of the United States, residing at Dayton, in the county of Montgomery and State of Ohio, have invented certain new and useful Improvements in Cash-Registers, of which I declare the following to be a full, clear, and exact description.

This invention relates to accounting machines and the like and more particularly to that type known as ten key machines.

It is usual in accounting machines to provide manipulative amount determining means for controlling the amount differential mechanism of the machine and special manipulative means for controlling the indicating and recording of special characters to identify the clerk making each transaction, the class of each transaction, etc. Special and separate manipulative means are also employed in some accounting machines for controlling the selection of individual totalizers or counters for operation or for disabling the totalizer engaging mechanism on certain operations.

It is the principal object of this invention to construct a machine so that common manipulative means serve to accomplish the different functions of a plurality of manipulative means of different classes heretofore employed. In the present form of employment disclosed herein one series of keys is employed to perform the functions previously performed by two or more adjustable levers or series of keys of different classes, thus reducing the space required by a plurality of levers or series of keys as well as simplifying the construction and operation of the machine. In the illustrative form of embodiment disclosed herein one series of keys is employed to control the amount differential mechanism, to select individual totalizers for operation, to select individual counters for operation, to control the indicating and printing of words and symbols to identify the classes of transactions, the kinds of merchandise sold, and the clerks making the particular sales.

One of the principal objects of this invention is to provide a plurality of totalizers and select the desired totalizers for operation under the control of the amount keys which also control the actuating mechanism for the totalizers. Another object of this invention is to provide a plurality of totalizers and construct the selecting mechanism so that each amount key is adapted to select a plurality of the totalizers for operation. In the preferred form of embodiment disclosed herein three groups of totalizers are provided and the selecting mechanisms for these totalizers are so constructed that each amount key may select a totalizer in each group. In the illustrative form of embodiment special totalizers comprising one group, segregate totals in accordance to the different classes of provisions sold, there being one totalizer for each class of provisions. The clerks' totalizers, comprising another group, accumulate the clerks' individual cash sales and the totals of the various classes of transactions are accumulated in the transaction totalizers comprising the third group of totalizers.

Another object of this invention is to provide a grand totalizer for accumulating all of the amounts entered on two groups of totalizers and for entering certain amounts on totalizers of one group without entering the amounts on totalizers of the other two groups. In the illustrative form disclosed herein the grand totalizer accumulates the totals of all cash amounts which are entered in the clerks' totalizers and the special totalizers, while all other classes of transactions are entered only on the transaction totalizers and not upon the clerks' and special totalizers.

It is also an object of this invention to employ common selecting means under the control of manipulative means for selecting a totalizer in either one of two groups for operation. In the present invention this object is effected by coupling the group of transaction totalizers and the group of special totalizers together when a transaction other than a cash transaction is to be entered in the machine.

It is a further object of this invention to provide novel indicating mechanism for indicating preliminarily to the operation of the machine the transaction totalizer selected for operation when other than a cash transaction is entered in the machine and for indicating the special totalizer selected when a cash transaction is entered in the machine.

The printing mechanism is also provided with type carriers for printing characters representing the various kinds of provisions sold and the various classes of transactions. The type carrier for printing characters representing the various kinds of provisions prints on record material only when cash transactions are entered in the machine, the type carrier for printing characters designating the classes of transactions being adapted to print only when transactions other than cash transactions are entered in the machine.

Still another object of this invention is to provide a plurality of counters selectively controlled by the amount keys. In the present invention the counters segregate the number of sales made by the individual clerks, the counters being selected for operation under the control of the amount keys when operated to represent the clerks.

The invention further presents a novel and improved form of transfer mechanisms for the totalizers.

The invention also embodies novel means for controlling total and subtotal printing operations of machines having a plurality of totalizers.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Figures 1ᴬ and 1ᴮ combined constitute a front elevation of the machine with parts of the cabinet broken away.

Fig. 6 is a full sized longitudinal sectional view through the transverse rows of stop pins and the carriages carrying the selecting plates for operating the stop pins which are adapted to control the extents of movement of the differential mechanism. This view is somewhat diagrammatical as it shows only the zero stop pins and the associated lifting arms and selecting plates.

Fig. 7 is a full sized top plan detail view of the device adapted to raise the zero stop pins for the additional amount differential units in adding operations.

Fig. 7ᴬ is a detail view of the driving arm for one of the amount differential units.

Fig. 8 is a full sized detail side view of the amount stop pin carriage and the mechanism for restoring it to normal position. This carriage carries the selecting plates for moving the stop pins into position to control the amount differential means.

Fig. 9 is a full sized detail side view of part of the escapement mechanism for the amount carriage. One of the cams for lifting this carriage is also shown in this view.

Fig. 10 is a full sized detail top plan view of part of the mechanism for restoring the amount carriage to zero position.

Fig. 11 is a full sized detail top plan view of the amount carriage.

Fig. 12 is a full sized detail view of a denominational group of totalizer pinions.

Fig. 13 is a full sized detail top plan view of two of the transfer devices and two of the devices operated by the totalizer wheels of the special totalizers upon total and subtotal printing operations of the machine.

Fig. 14 is a full sized detail sectional view on the line 14—14 of Fig. 8 and shows the escapement mechanisms for the amount carriage and the special carriage which carries the selecting plates for moving the stop pins into position to control the differential mechanism employed to move the desired totalizers into position to be engaged by the amount differential mechanism.

Figure 15:
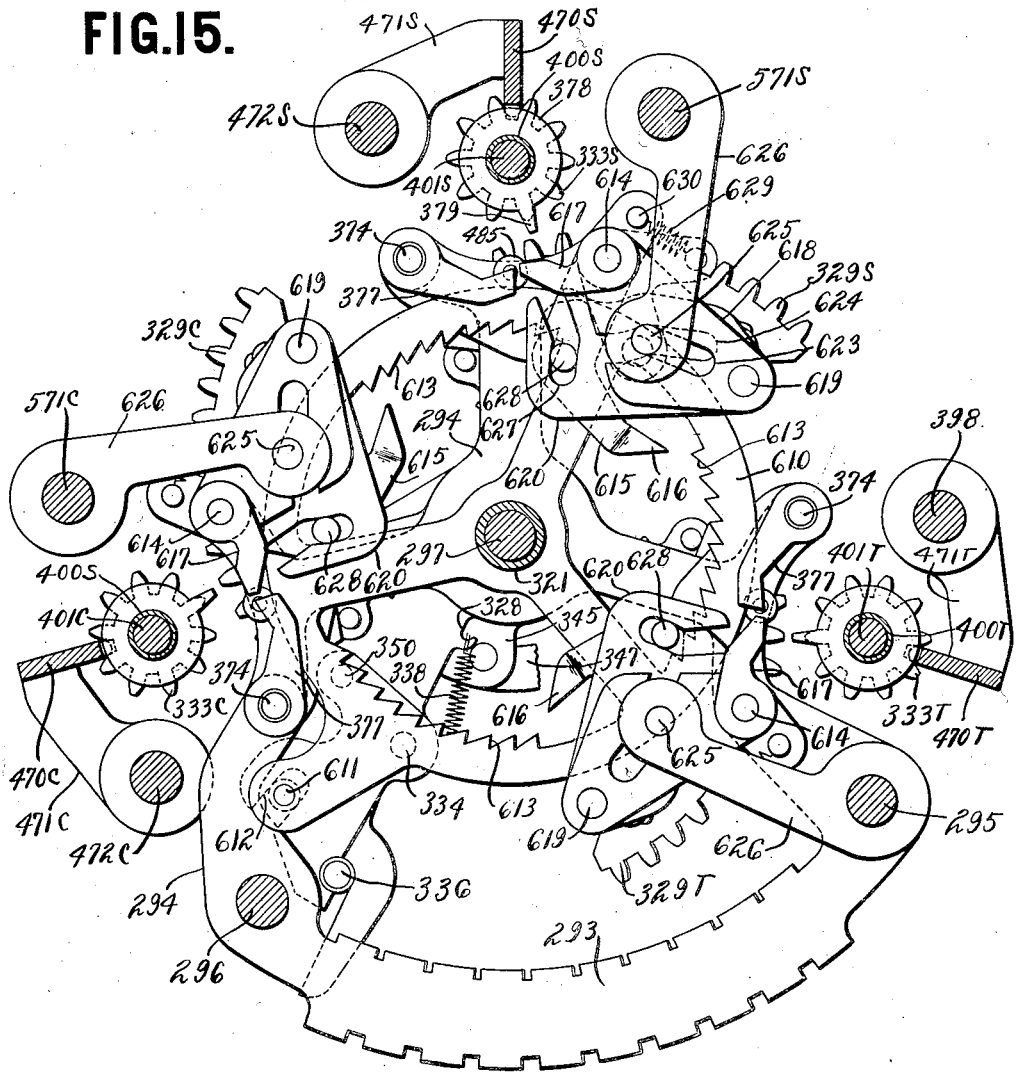

Fig. 15 is an enlarged detail sectional view taken along the side of one of the units of the amount differential mechanism.

Figure 16:
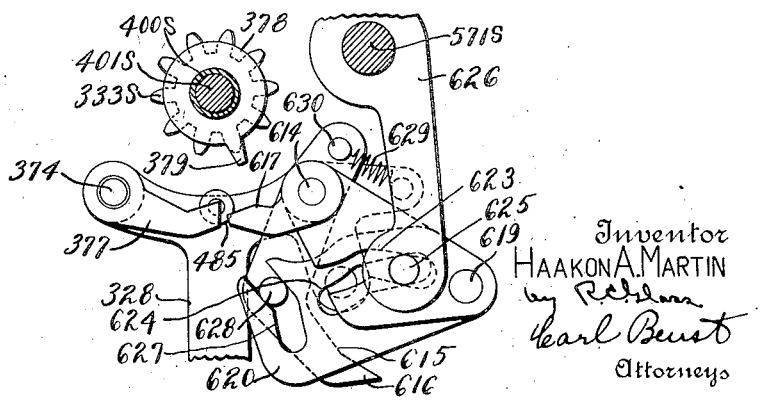

Fig. 16 is an enlarged detail view of a device operated by a totalizer pinion in total and subtotal printing operations of the machine.

Figure 17:
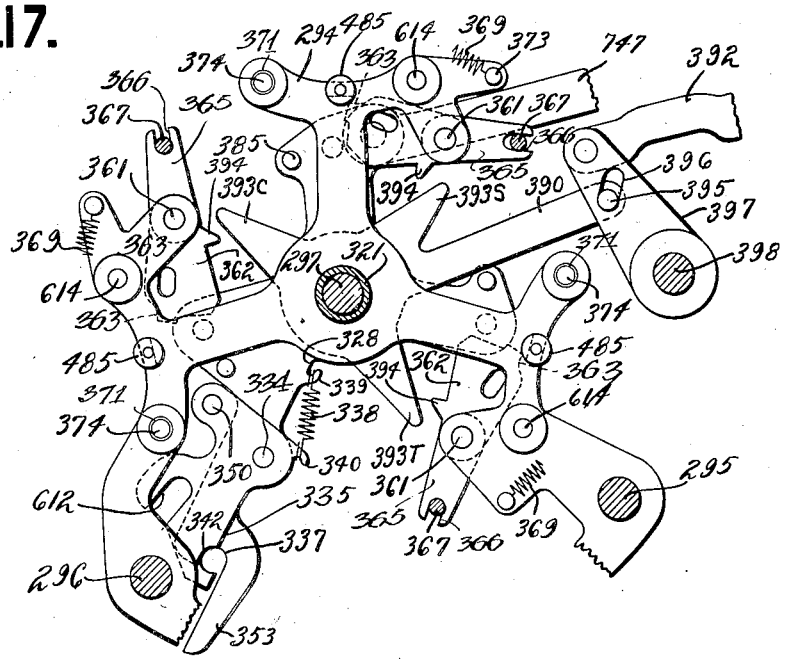

Fig. 17 is a full sized detail view of one of the frames supporting the devices controlling transfers from totalizer pinions of lower order to totalizer pinions of next higher order and the devices controlled by the totalizer pinions during total and subtotal printing operations.

Figure 18:
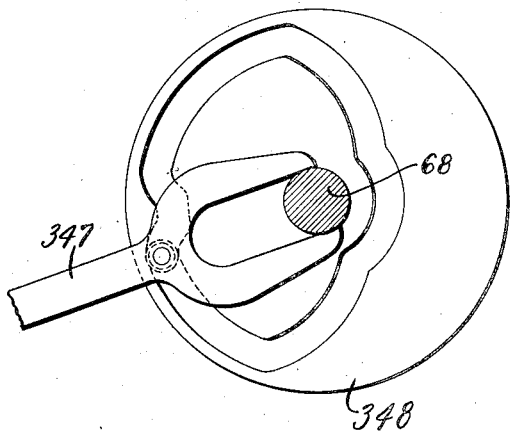

Fig. 18 is a full sized detail view of the cam for driving one of the amount differential units of the machine.

Figure 19:
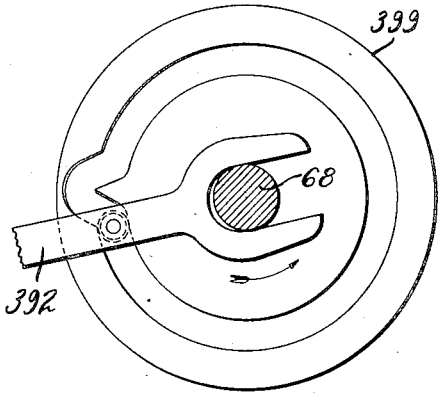

Fig. 19 is a full sized detail view of the cam for operating the mechanism constructed to restore the transfer controlling devices to normal position.

Fig. 20 is a detail top plan view showing the arrangement of the totalizers and their supporting means.

Fig. 21 is a detail sectional view showing a part of the means for shifting the group of special totalizers.

Fig. 22 is a detail sectional view taken through two denominational groups of totalizer pinions.

Fig. 23 is a full sized detail sectional view taken on the line C—C of Fig. 20, the means supporting the right-hand ends of the shiftable shafts being omitted.

Figure 24:
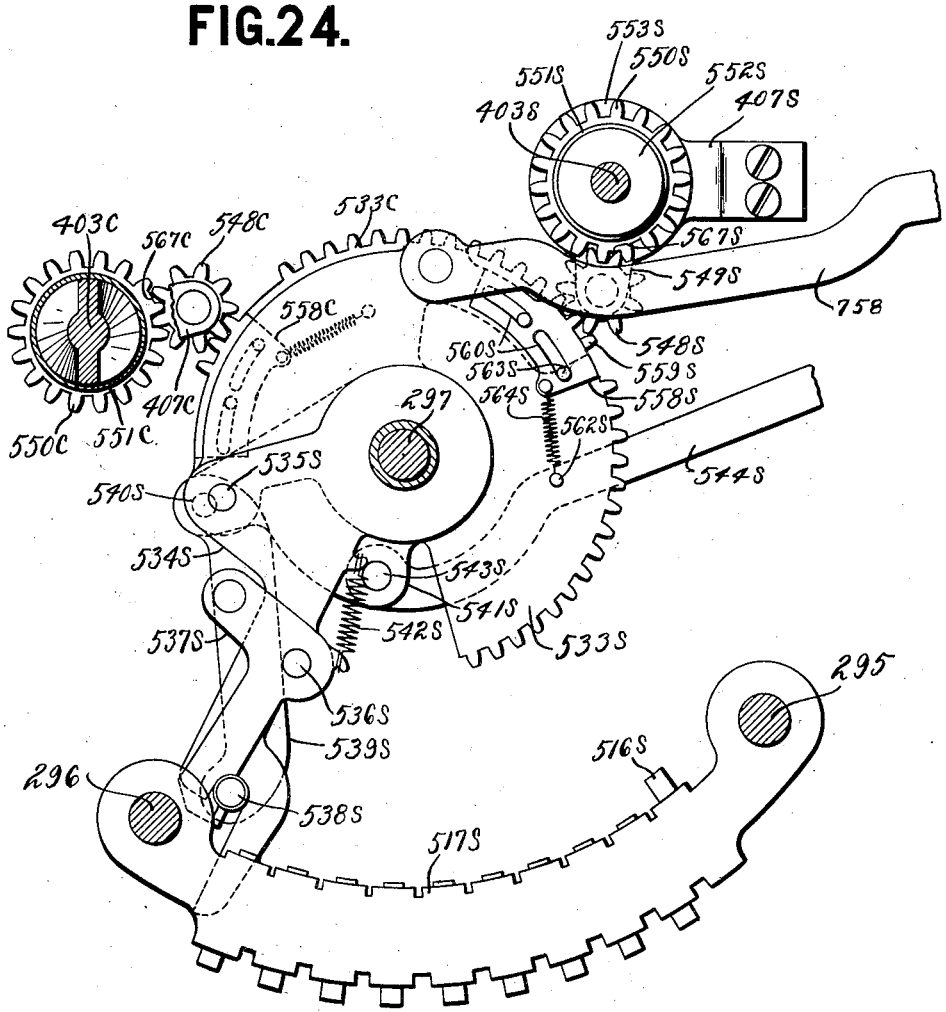

Fig. 24 is a full sized detail sectional view taken along the side of the differential mechanism controlling the shifting of the groups of totalizers.

Figure 25:
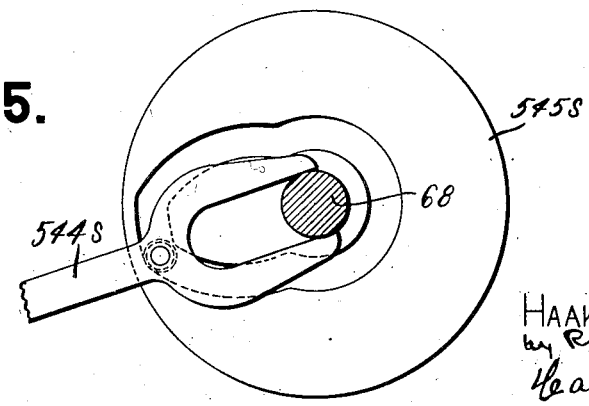

Fig. 25 is a full sized detail view of the cam for operating the differential mechanism shown in Fig. 24.

Figure 26:
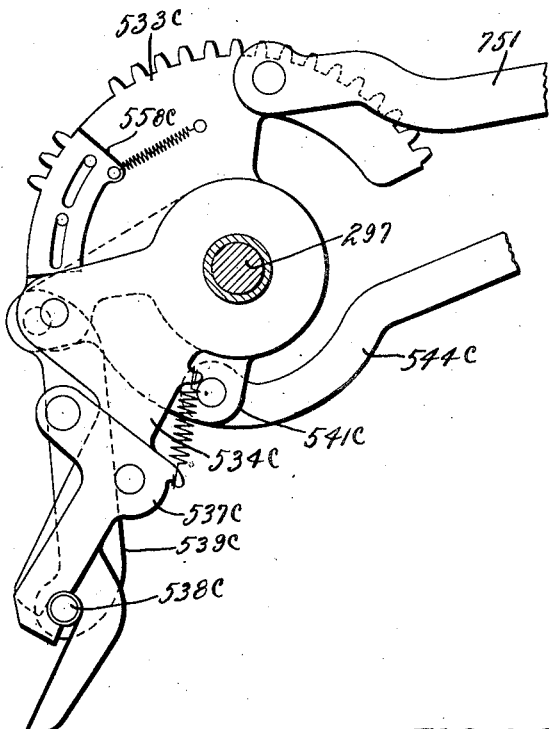

Fig. 26 is a full sized detail side view of part of the differential mechanism for shifting the group of clerks' totalizers.

Figure 27:
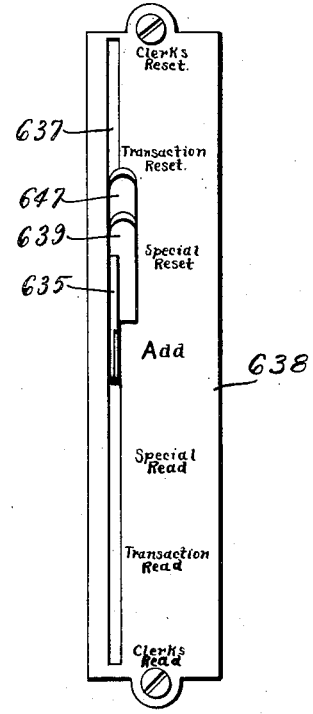

Fig. 27 is a full sized detail front view of the total lever and its index plate, the total lever being employed for controlling the machine in total and subtotal printing operations.

Figure 28:
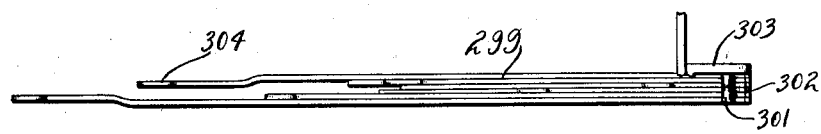

Fig. 28 is a full sized detail top plan view of a set of lifting arms for a longitudinal row of amount stop pins of the same value in the various denominations.

Figure 29:
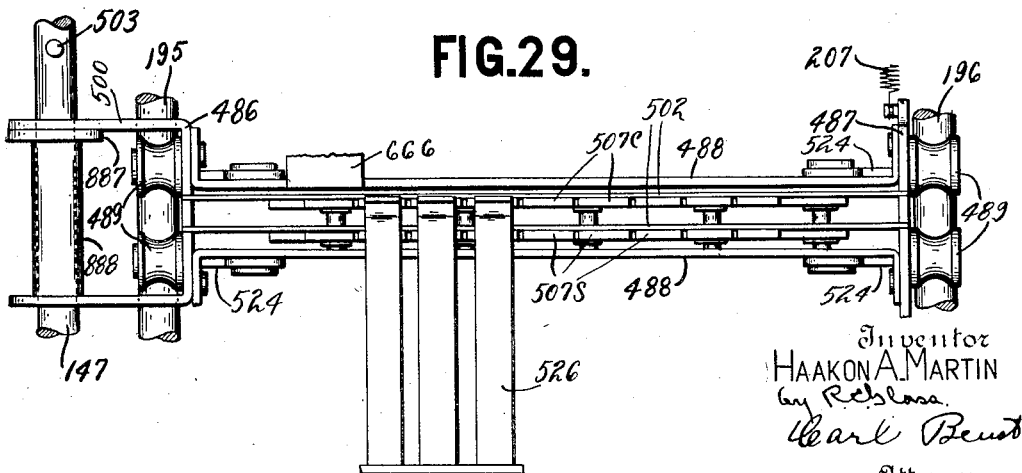

Fig. 29 is a full sized detail top plan view of the special carriage.

Figure 30:
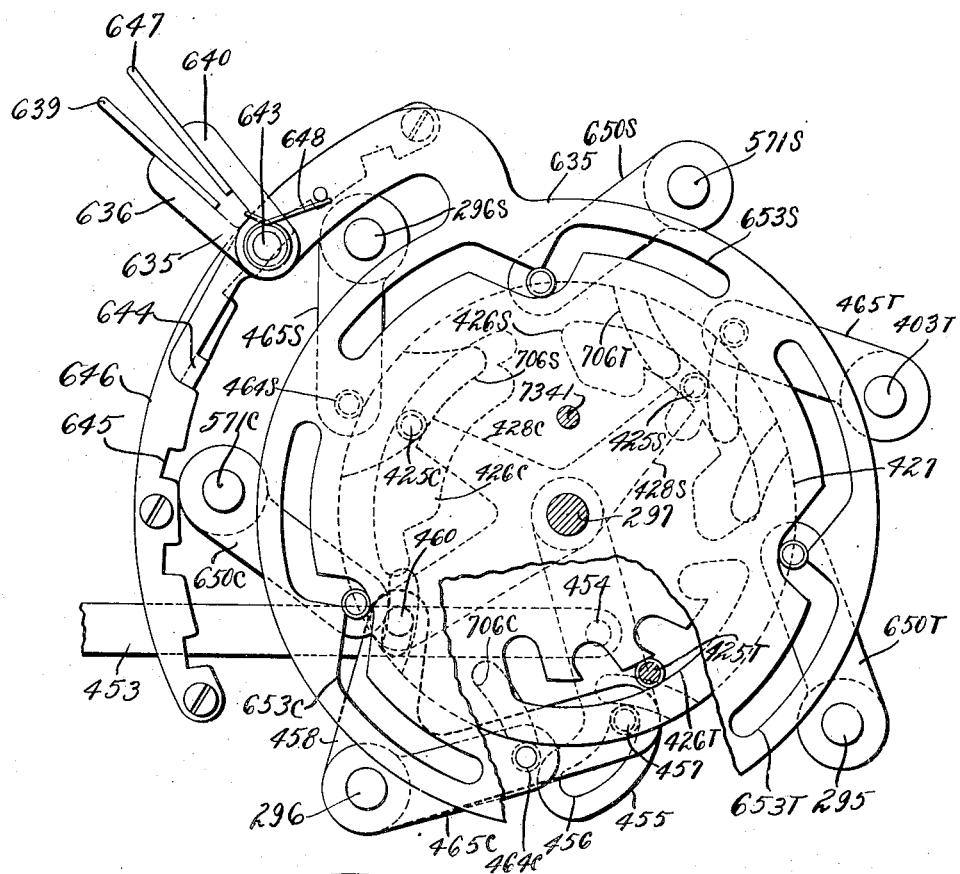

Fig. 30 is a full sized detail sectional view showing in right-hand elevation the mechanism for controlling the machine for recording totals and subtotals.

Figure 31:
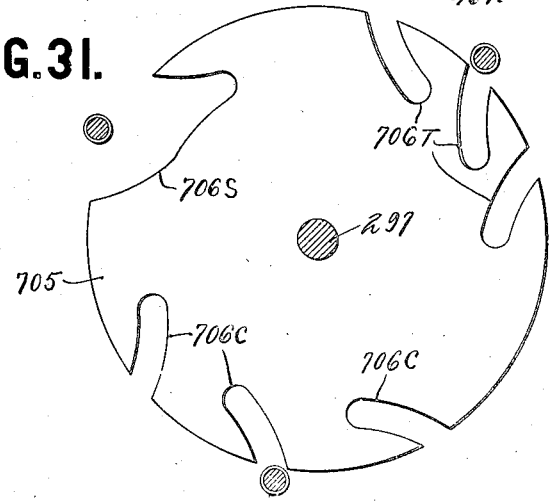

Fig. 31 is a full sized detail side view of a disk operated by the total lever to permit engagement of only the selected totalizer during total and subtotal printing operations.

Figures 32, 33:
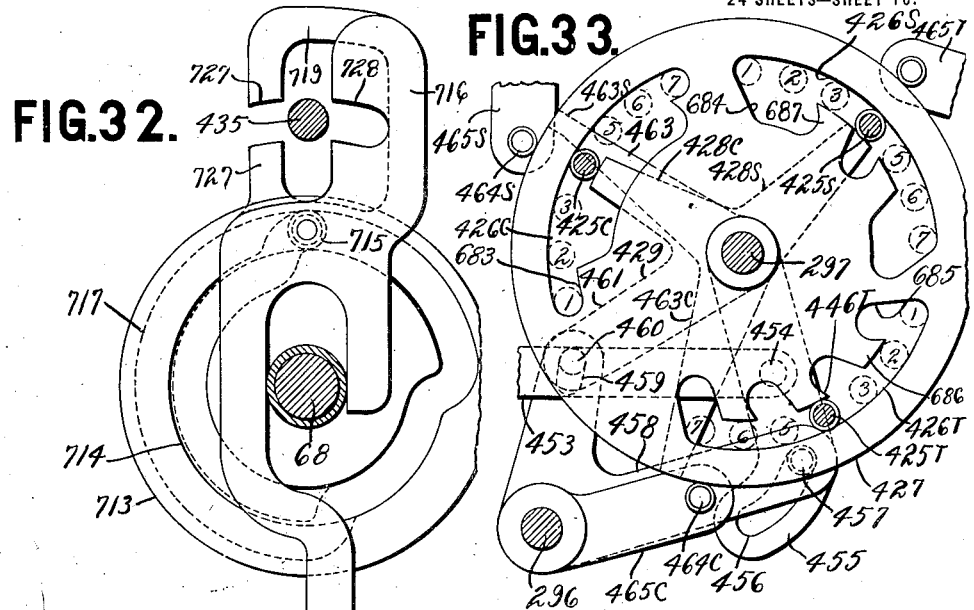

Fig. 32 is a full sized detail view of the cams and pitmen for operating the totalizer engaging mechanism during total and subtotal printing operations.

Fig. 33 is a full sized detail side view of a disk, controlled by the total lever, and the means, controlled by the special key, for controlling the engagement of the totalizers.

Figures 34, 35:
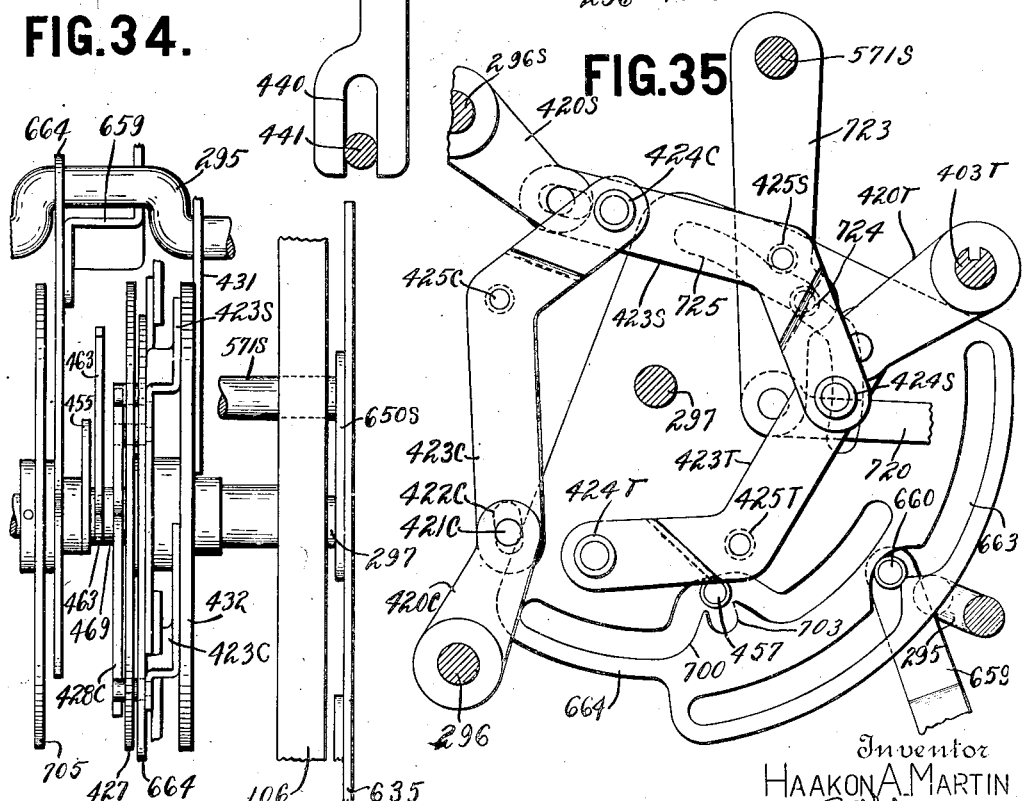

Fig. 34 is a full sized detail top plan view of the mechanism shown in Fig. 30.

Fig. 35 is a full sized detail side view of the levers and arms operated to move other parts of the totalizer engaging mechanism to effect engagement of the totalizers with the amount differential mechanism.

Figure 36:
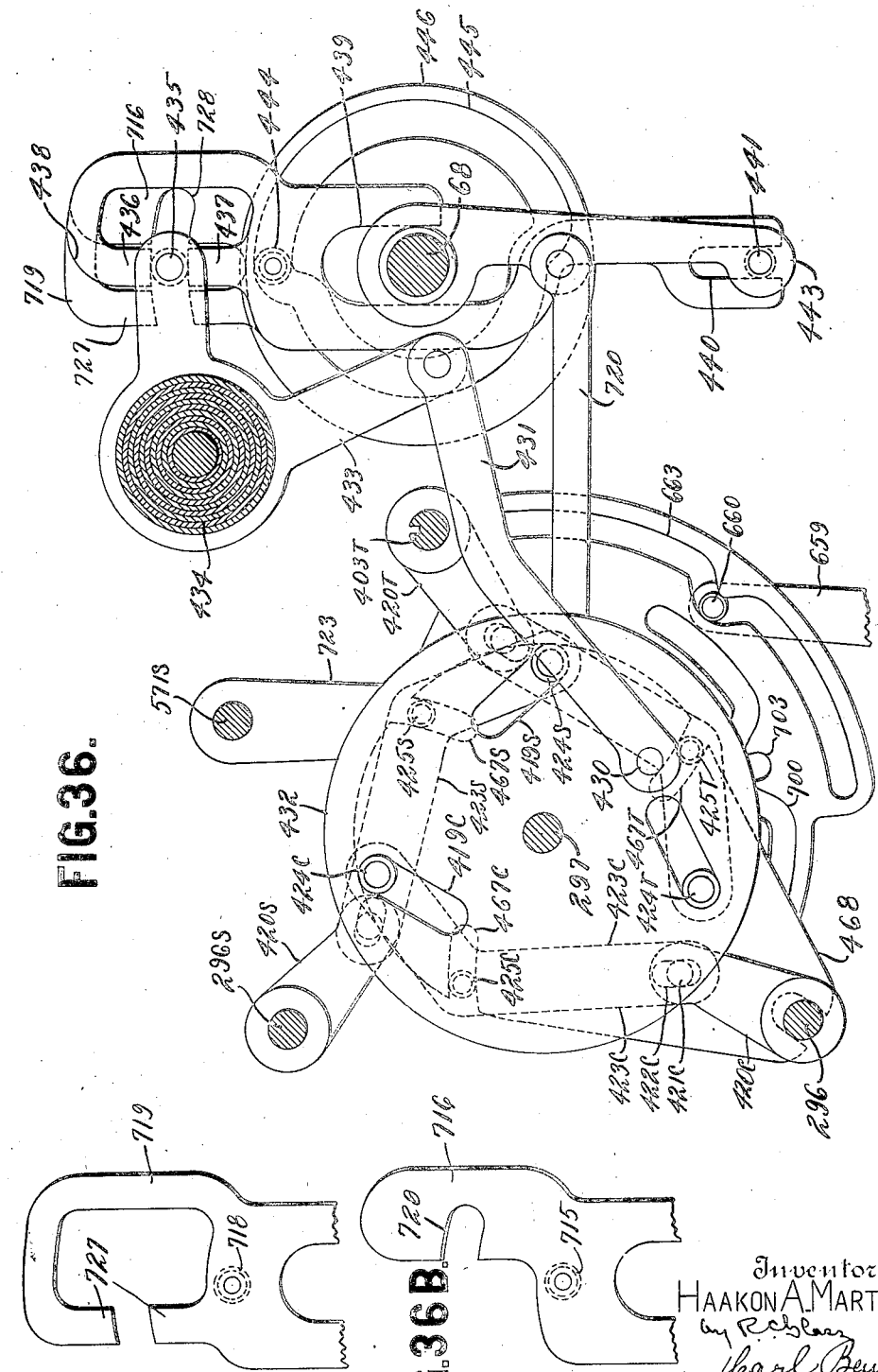

Fig. 36 is a full sized detail sectional view of the mechanism shown in Fig. 35 and the means for operating the levers and arms shown in Fig. 35.

Figs. 36$^A$ and 36$^B$ are full sized detail partial views of the pitmen operated to effect engagement of the selected totalizer during total and subtotal printing operation respectively.

Figure 37:
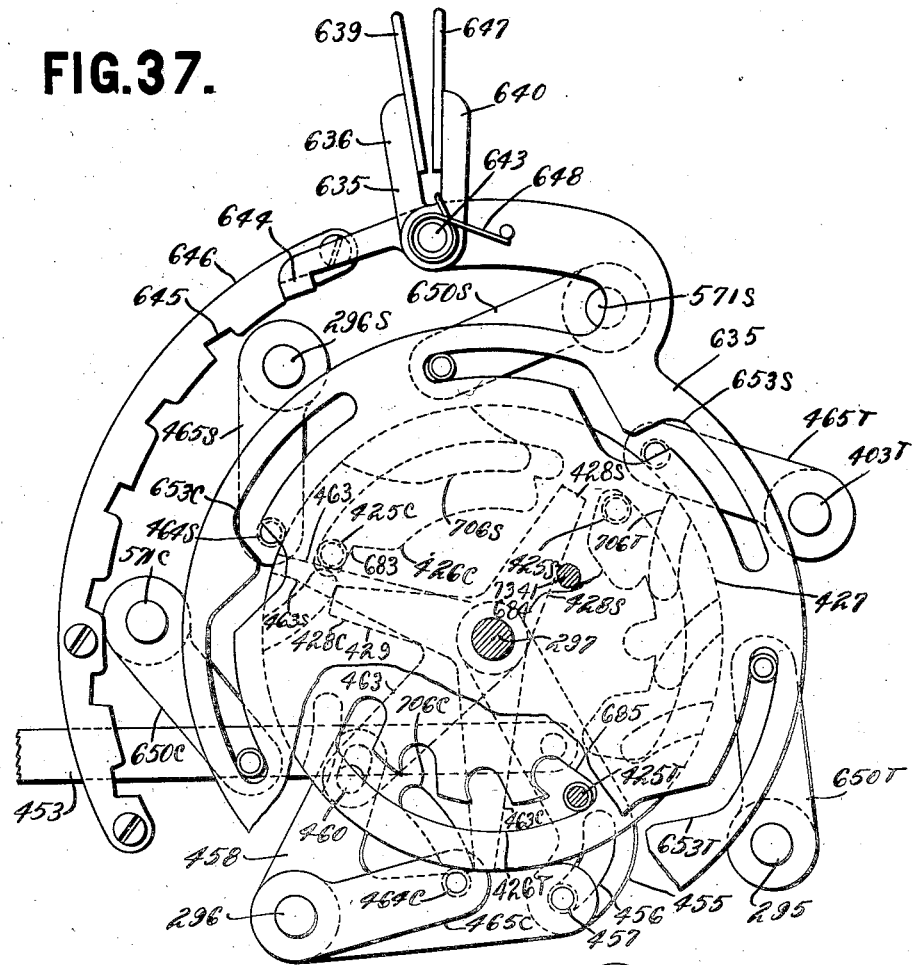

Fig. 37 is a detail sectional view similar to Fig. 30 but showing the mechanisms in position to control the machine for printing a total from the selected clerks' totalizer.

Figure 38:
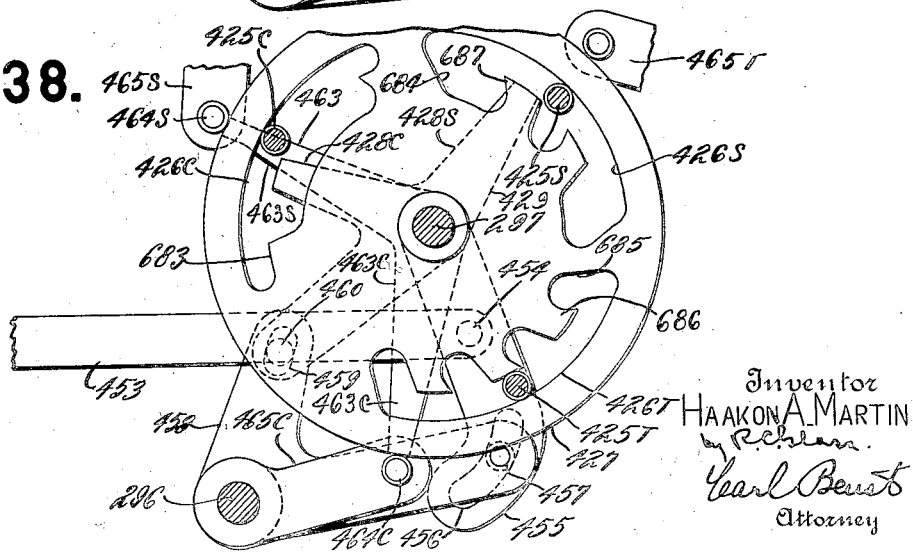

Fig. 38 is a detail sectional view similar to Fig. 33 but showing some of the mechanism in the position to which it is moved by the special key.

Figure 39:
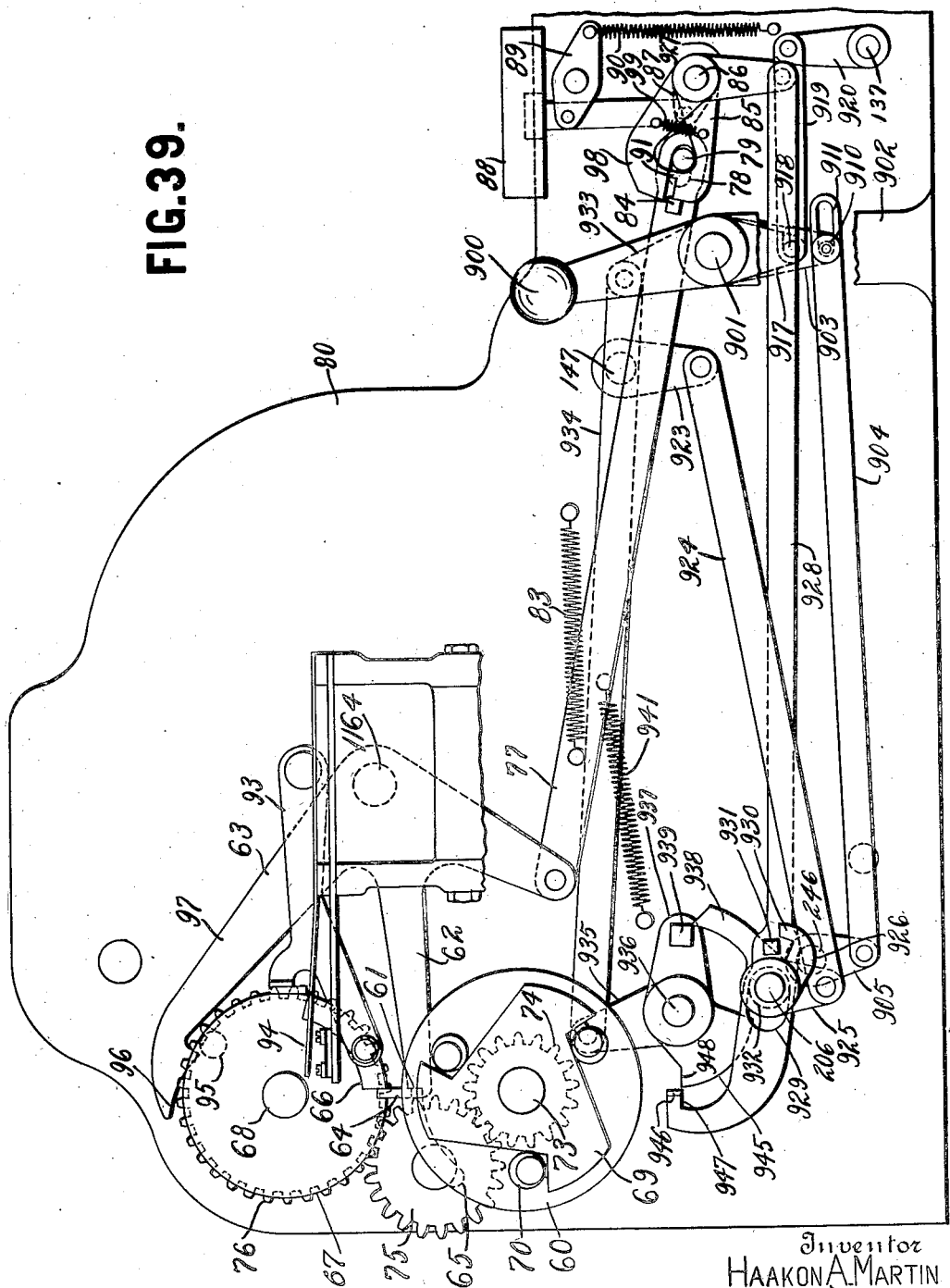

Fig. 39 is a left-hand side elevation of the machine with the hood or cabinet omitted and the electric driving device broken away.

Figure 40:
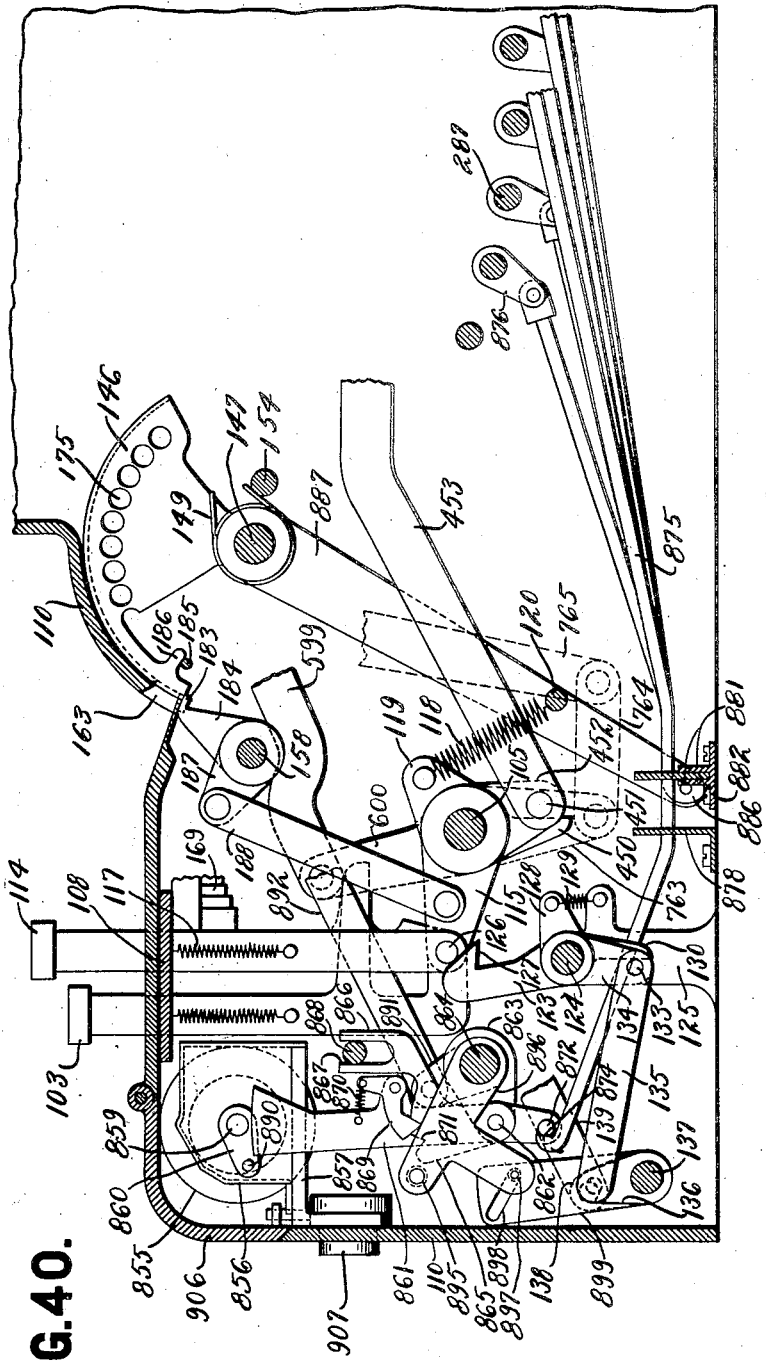

Fig. 40 is a full sized transverse sectional view showing one of the clerks' consecutive counters and the operating mechanism therefor together with various other parts of the machine.

Figure 41:
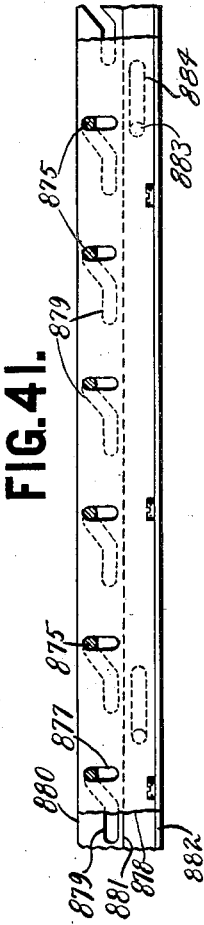

Fig. 41 is a full sized detail view showing the plates for raising the links of the actuating mechanisms for the clerks' consecutive counters.

Fig. 42 is a full sized detail top plan view of the means operated by the keys for elevating the selecting plates in the amount and special carriages and two of the clerks' consecutive counters and the operating mechanisms therefor.

Figure 43:
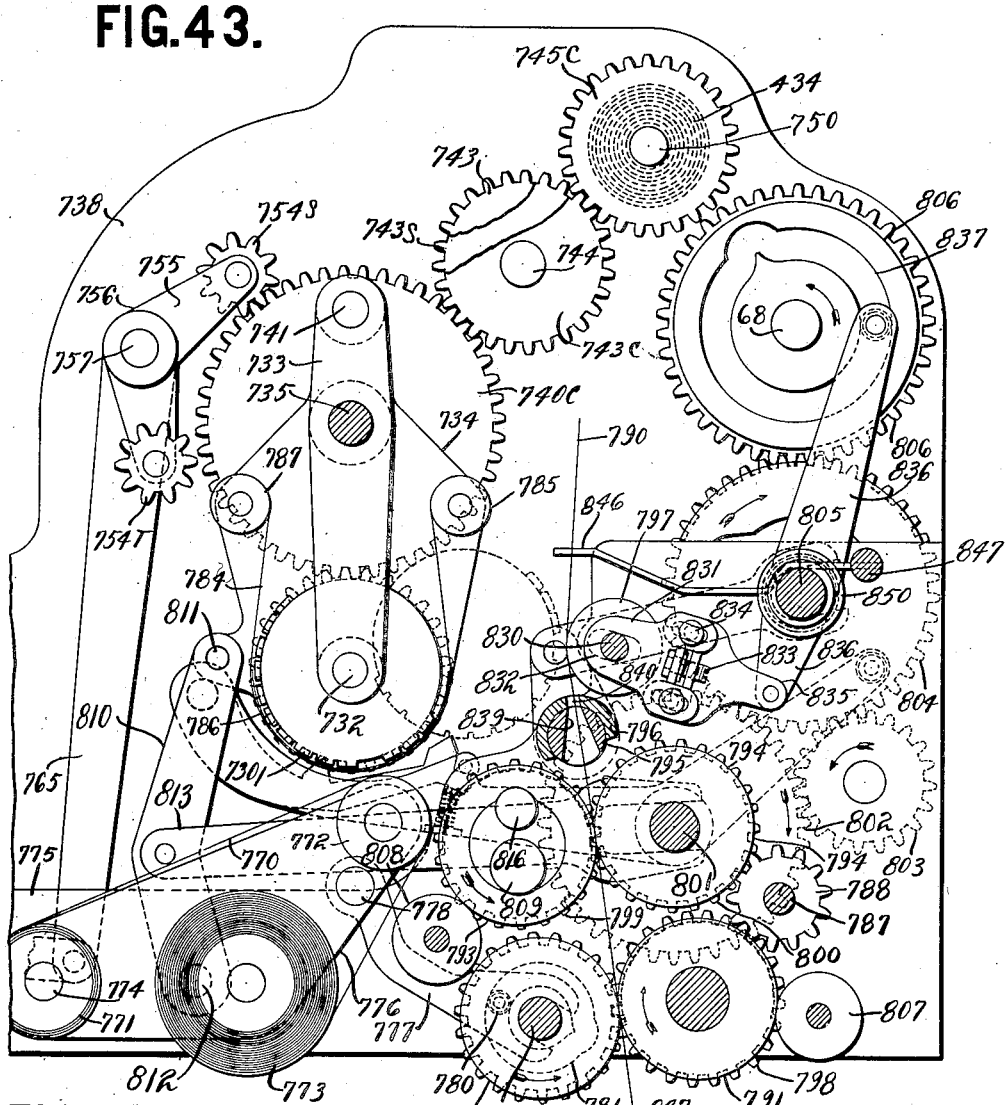

Fig. 43 is a detail sectional view taken along the side of the printing mechanism and just within the right-hand side frame of the machine.

Figure 44:
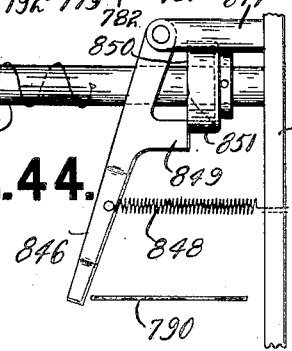

Fig. 44 is a full sized detail top plan view of the check ejecting mechanism.

Figure 45:
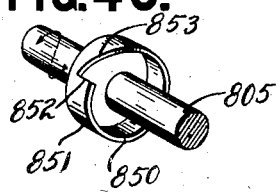

Fig. 45 is a full sized detail perspective view of the cam comprising one of the members of the check ejecting mechanism.

Fig. 46 is a full sized detail view in front elevation of the type carriers and the gear and sleeve connections thereto.

Fig. 46$^A$ is a detail view of a portion of the detail strip showing records printed by the type carriers.

Fig. 47 is a full sized detail perspective view of the arms of the yokes operated by the amount keys to limit the movement of the indicating item segments.

Fig. 48 is a full sized detail top plan view of the indicating item segments, the segments being partly broken away to show their construction more clearly.

Fig. 49 is a full sized detail perspective view of the item segments for indicating the classes of transactions and the classes or kinds of provisions or commodities sold.

Fig. 50 is a full sized detail perspective view of the item segment for indicating the classes of transactions.

Figure 51:
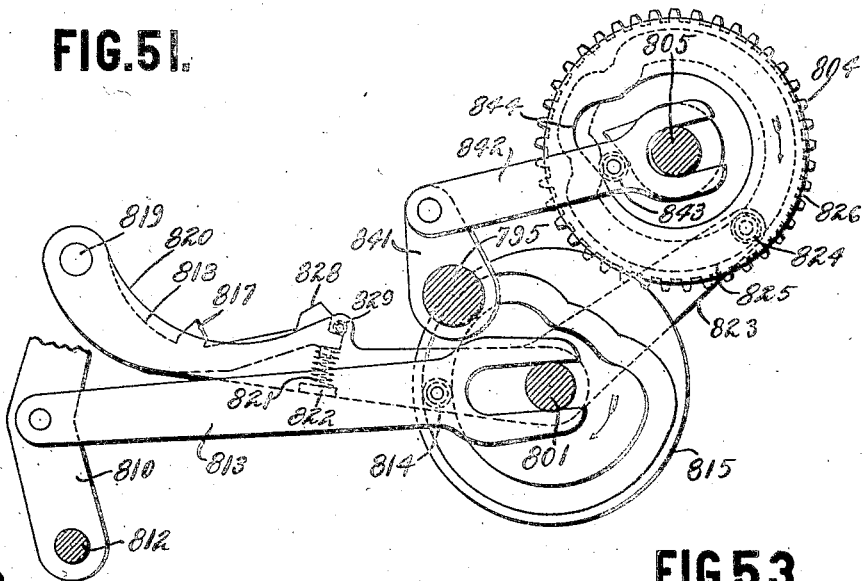

Fig. 51 is a detail side view of the alining mechanism for the type carriers, the cam and connections for rocking the type carriers and the cam and connections for operating the check severing mechanism.

Figure 52:
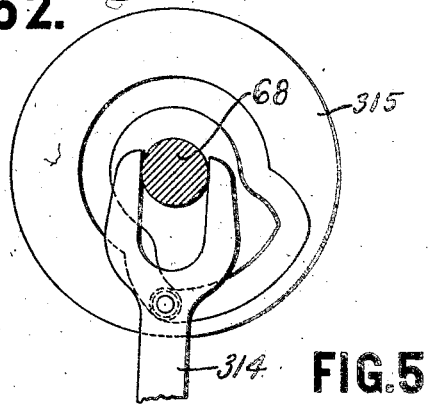

Fig. 52 is a full sized detail side view of the cam for operating the carriage lifting mechanism.

Figure 53:
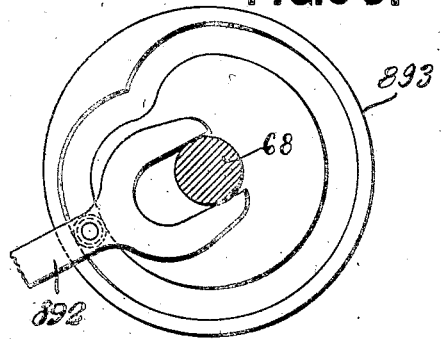

Fig. 53 is a full sized detail view of the cam for operating the actuating mechanism for the clerks' consecutive counters.

Figure 54:
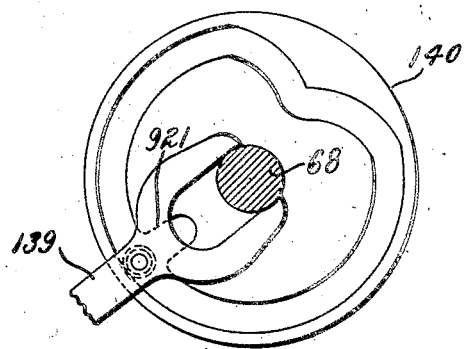

Fig. 54 is a full sized detail side view of the cam for operating the mechanism for restoring the amount carriage to normal position.

In order that the detailed description may be followed to better advantage a general statement will be given here of the operation of the specific embodiment of the invention shown and the machine will be described as being adapted more particularly for use in groceries and the like but it is to be understood that the invention may, with equal facility, be used in any other commercial establishments and in many other relations. The invention as a whole or any part thereof is therefore capable of use in other embodiments without constituting a departure from the scape of the present invention.

The machine is provided with three sets or groups of totalizers. One group comprising the special totalizers is utilized for accumulating the cash sales of the various kinds of provisions sold such as eggs, butter, lard, meat, etc. Another group is used for segregating the totals of cash sales made by the individual clerks. The third group comprises a grand cash totalizer for accumulating amounts of all cash transactions and a plurality of transaction totalizers for accumulating amounts of different classes of transactions such as paid out, charge, C. O. D., goods delivered, bank deposits, in the place thereof "checks drawn, bills paid and checks received." The cash totalizer is called the grand totalizer herein as it accumulates all the amounts entered in the clerks' and the special totalizers.

Each of the amount keys "2" to "9," inclusive, is employed not only to control the differential mechanism for entering amounts in the totalizers but is designed to select a totalizer in each group for operation. The "1" key in the preferred form of embodiment selects the received on account totalizer which is included in the group of special totalizers and the "0" key is not employed to select any totalizer. When a cash transaction is to be registered, the clerk first depresses the amount key assigned to represent his initial, then the amount key representing the kind of provisions sold and finally he presses the keys representing the amount of the transaction. Depression of the first and second keys sets up means which upon operation of the main operating mechanism controls the extent of sliding movement of the clerks' totalizers and the special totalizers, respectively, so that the desired clerks' totalizer and special totalizer will be in position to be actuated by the amount differential mechanism. The keys depressed after the first two keys have been depressed represent the amount, and set up means which during the operation of the machine control the amount differential mechanism. The grand totalizer which accumulates the amounts of all cash transactions entered on the clerks' and special totalizers is associated with the transaction group of totalizers and is moved into engagement with the amount differential mechanism when a clerks' totalizer and a special totalizer are moved into engagement therewith.

When a transaction other than a cash sale or received on account transaction is to be registered, a special key is depressed. This special key controls the totalizer engaging mechanism so that a clerk's and a special totalizer will not be moved into engagement with the amount differential mechanism and this key also serves to operate a device for coupling the group of transaction totalizers and the group of special totalizers together so that the shifting movement of the latter is imparted to the former, the grand totalizer being moved out of operative relation with the amount differential mechanism and the desired transaction totalizer being moved into operative relation therewith. After the special key is depressed the amount key, representing the clerk and then the key representing the class of transactions and finally the keys representing the amount of the transaction are depressed. As the group of special totalizers and the group of transaction totalizers are coupled together by operation of the special key they are shifted together so that the desired transaction totalizer is brought into operative relation with the amount differential mechanism under the control of the second amount key depressed.

Indicating means are employed to indicate preliminarily to the operation of the machine the keys depressed so that if the operator has made a mistake in setting the transaction upon the keys he can place the machine in normal position by the operation of an error lever. This indicating means comprises a plurality of indicating item segments which are moved into position, under the control of the depressed keys, to display characters corresponding to the keys depressed in order that the clerk may see if he has depressed the proper keys before he operates the machine. The item segment for indicating the classes of transactions, when a transaction other than a cash or received on account transaction is entered in the machine, and the special item segment for indicating the kinds of provisions sold, are so constructed that only the former indicates when the special key is depressed and only the latter when the special key is not depressed.

In total and subtotal printing operations but one totalizer is moved into engagement with the amount differential mechanism. The time of engagement of the selected totalizer is controlled by a total lever and associated mechanism. This total lever also determines the group including the totalizer to be reset while the keys select the desired totalizer of the group.

A plurality of consecutive counters, one for each clerk, is provided separately to accumulate the number of sales made by each clerk. These counters are selected for operation under the control of the first amount key depressed which, as above stated, represents the clerk's initial.

Printing mechanism is provided for printing the items entered in the machine and also totals and subtotals in subtotal and total printing operations.

*Operating mechanism.*

The machine for illustrative purposes is shown as equipped with an electric motor but it is to be understood that other driving means such as a manually operable crank may be employed. The motor mechanism which it is desirable to use in connection with the present invention is of a form which is old and well known in the art and described in Letters Patent of the United States 1,144,418, issued June 29, 1915, to Charles F. Kettering and William A. Chryst, and reference may be had thereto for a detailed description of the same.

Only part of the clutch through which the motor is connected to drive the machine is shown. This clutch includes a disk or member 60 (Fig. 39) which is adapted to be given a slight preliminary movement under the control of a coil spring (not shown) to render the clutch effective. The member is normally restrained from such movement by the engagement of a projection 61 formed on the horizontal arm 62 of a lever 63, pivoted at 1164 to the frame of the machine, with a block or flange 65 mounted on the member 60. The arm 62 also carries a flange 64 which engages a shoulder or block 66 on a disk 67 fast on the main drive shaft 68 of the machine. When the lever 63 is rocked counter clockwise (Fig. 39) as will be described presently the flanges 61 and 64 are carried out of engagement with their respective blocks 65 and 66 whereupon the member 60 is given a slight preliminary movement to couple a clutch member 69 by means of rollers 70 to a clutch member (not shown) driven positively by the motor. The clutch member 69 is fast on the stub shaft 73 upon which is also rigidly mounted a gear 74 meshing with an intermediate gear 75 which in turn meshes with a gear 76 fast on the main drive shaft 68. The motor through this gearing and clutch imparts to the main drive shaft 68 one complete rotation in a clockwise direction (Fig. 39) upon each operation of the machine.

The downwardly and rearwardly extending arm of the lever 63 is pivotally connected to the rear end of a link 77 which at its forward end is provided with a slot 78 through which a pin 79 mounted on the left-hand side frame 80 of the machine projects, the link being guided at its forward end by this slot and pin connection. A spring 83 connected at its rear end to the link 77 and at its forward end to a pin on the frame 80 tends to move the link forwardly to rock the lever 63 out of normal locking position. This movement of the link 77 and the lever 63 is normally prevented by the engagement of a stud 84 on the link 77 with the rear end of an arm 85 rigidly mounted on a stub shaft 86. Fast on the shaft 86 is an arm 87 which is pivotally connected to the lower end of a motor key 88. The motor key is supported at its upper end by a lever 89 pivoted in the frame 80 of the machine. A spring 90 connected at its upper end to the lever 89 and at its lower end to the frame 80 serves to retain the motor key in normal undepressed position. When the motor key is depressed it rocks the shaft 86 and arm 85 counter clockwise (Fig. 39) thereby lowering the rear end of the arm 85 out of engagement with the stud 84 whereupon the spring 83 operates the link 77 and the lever 63 to unlock the machine and render the motor clutch effective. When the lever 63 is rocked to release the machine, an arm 93 is operated by means (not shown) to close the switch 94 for the purpose of completing a circuit through the motor armature.

Near the end of the operation of the machine a pin 95 on the gear 76 engages the curved surface 96 of the arm 97 of the lever 63 thereby rocking the lever 63 clockwise (Fig. 39) to normal locking position to render the motor clutch ineffective and break the motor circuit to stop the machine. Movement of the lever 63 to normal position moves the link 77 rearwardly to normal position and thereby withdraws the stud 84 from above the end of the arm 85 and the spring 90 immediately restores the motor key 88 and therefore the arm 85 to normal position.

In order to prevent the operator from retaining the motor key in depressed position until at the end of the operation of the machine and thereby permit the spring 83 to operate again the link 77 and the lever 63 for the purpose of causing an immediate second operation of the machine, an arm 98 loosely mounted on the shaft 86 is provided. A spring 99 is connected at one end to the arm 98 and at its opposite end to the arm 85 and the arm 98 normally engages a projection 91 on the arm 85. The arm 98 projects slightly over the stud 84 so that when the motor key is depressed to rock the arm 85 from in front of the stud 84 the latter passes between the arms 98 and 85 into engagement with the projection 91. When the link 77 is drawn rearwardly during operation of the machine it is moved slightly past normal position so that if the motor key is retained in depressed position the stud 84 is moved from under the arm 98 whereupon the spring 99 rocks the arm 98 counter clockwise so that its rear end is in front of the stud 84. With the arm 98 in this position the link 77 cannot move forwardly and therefore the machine cannot be released by retaining the motor key in depressed position. When the operator finally removes his finger from the motor key and permits it to be elevated to normal position the arm 98 is raised out of engagement with the stud 84 and the rear end of the arm 85 is moved to its normal position in front of the stud 84.

*Keyboard.*

As above stated, there is provided a series of nine keys 100 (Figs. 1^A, 1^B, 2, 4 and 5) representing the digits "1" to "9", inclusive, and a "0" key 103. The "0" key 103 is in the form of an ordinary typewriter spacing bar and is positioned in front of the keys 100. Each of the keys 100 is pivotally mounted at its lower end on a corresponding arm 104 (Fig. 2) loosely mounted on a shaft 105 supported at its left-hand end in the frame 80 and at its right-hand end in a frame 106 (Fig. 1^B) of the machine. The keys are retained in normal position and are restored to such position after being depressed by springs 107 connected at their lower ends to pins on the keys and at their upper ends to a plate 108 through openings in which the keys pass. The horizontal bar of the key 103 is carried by two vertical arms 109, which at their lower ends are pivotally mounted on two of the arms 104 provided for this key.

Figures 4, 5:
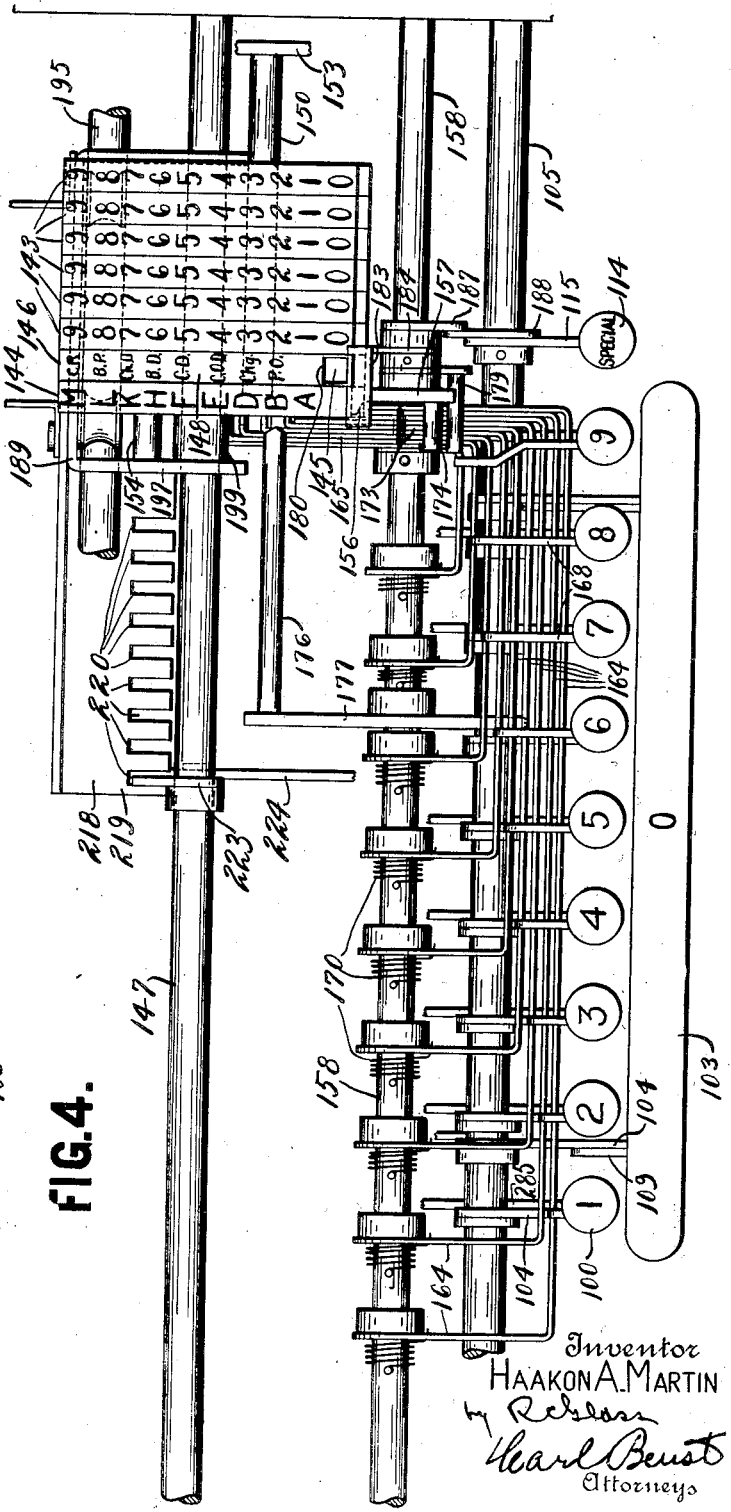
Fig. 4 is a full sized detail top plan view of the keyboard and the indicating item segments controlled thereby.
Fig. 5 is a full sized detail top plan view of the keyboard showing the keys and the index plates designating the totalizers selected by each key.

Mounted on the cabinet 110 (Fig. 5) of the machine and directly behind the keys 100 are index plates 113, one plate being provided for each key. Each plate is provided with a letter of the alphabet representing the clerks' initials, with words or abbreviations representing the various kinds of commodities, and characters representing the various classes of transactions, these designations representing the corresponding totalizers which are adapted to be selected by the amount keys. For example, the "1" key selects clerk A's totalizer and the received on account totalizer for operation but it is not adapted to select a transaction totalizer for reasons to be described later. The "2" key is adapted to select clerk B's totalizer, the totalizer for accumulating the total value of eggs sold and a totalizer for accumulating the amounts paid out. In like manner the other amount keys 100 select the corresponding totalizers designated by their appropriate index plates 113.

When a cash sale has been made or money has been received on account the clerk first depresses the key representing his initial, then depresses the key representing received on account or the class of provisions sold and finally depresses the amount keys representing the amount of the transaction. For example, if clerk B sells a five cent cigar, he first depresses the "2" key to represent his initial "B", then the "7" key to represent "cigars" and finally the "5" key to represent five cents. When a transaction of a class other than cash or received on account is to be entered in the machine, the clerk first depresses a special key 114 (Figs. 4, 5 and 40) then depresses the amount key representing his initial, then the amount key representing the class of transactions and finally the amount keys representing the amount. For example, if clerk E makes a charge transaction of 45 cents, he first depresses the special key 114, then the "4" key to represent his initial "E", then the "3" key to represent a charge transaction and finally the "4" and the "5" keys successively to represent 45 cents.

The special key 114 (Fig. 40) is pivotally mounted at its lower end on an arm 115 fast on the shaft 105. A spring 117 connected at one end to the key 114 and at its opposite end to the plate 108 and a spring 118 connected at one end to a pin on an arm 119 fast on the shaft 105 and at its opposite end to a stud 120, serve to retain the shaft 105 and the special key 114 in the normal position shown in Fig. 40 and to restore the key and the shaft to normal position during the operation of the machine if the special key has been depressed.

The amount keys when depressed are immediately restored to normal positions by their springs 107 when the operator removes his finger therefrom but the special key 114 is locked in depressed position until released during the operation of the machine. The mechanism for locking the special key in depressed position is shown in Fig. 40, and will now be described. A latch 123 is loosely mounted on a rod 124 supported at one end in the frame 106 and at its opposite end in a bracket 125 mounted on the base of the machine. A pin 126 by which the special key is pivoted on the arm 115 projects laterally to the right of this key and engages the upper inclined edge of a nose 127 on the latch 123. A rearwardly extending arm 128 fast to the latch 123 is connected to one end of a spring 129 which at its opposite end is connected to a pin on the bracket 125. This spring normally serves to retain the nose 127 in engagement with the pin 126. When the special key is depressed the pin 126 through its engagement with the nose 127 rocks the latch 123 counter clockwise (Fig. 40) until the pin has moved out of engagement with the upper inclined edge of the nose whereupon the spring 129 restores the latch to normal position so that the nose engages over the pin 126 and locks the special key in depressed position.

A downwardly extending finger 130 of the latch 123 engages a pin 133, which pivotally connects the lower end of a downwardly extending arm 134 loose on the rod 124, with the rear end of a link 135. The forward end of the link 135 is pivotally connected to an arm 136 fast on a shaft 137. An arm 138 is also rigidly mounted on the shaft 137 and is pivotally connected to the forward end of a pitman 139 which at its rear end (Fig. 54) is forked to straddle the main drive shaft 68. The pitman 139 near its rear end carries a roller projecting into a cam groove formed in the face of the disk 140 rigidly mounted on the main drive shaft 68. The cam groove is so constructed that during the operation of the machine the pitman 139 is moved rearwardly thereby rocking the arm 138, the shaft 137, and arm 136 clockwise (Fig. 40). Such movement of the arm 136 moves the link 135 rearwardly whereupon the pin 134 through its engagement with the finger 130 rocks the latch 123 counter clockwise to release the special key and permit the springs 117 and 118 to restore the key and shaft 105 to normal position.

*Indicating item segments.*

In order to enable the operator to determine whether the proper keys have been depressed before he causes an operation of the main operating mechanism, a plurality of indicating item segments comprising amount segments 143 (Figs. 2, 4 and 48), a clerk's segment 144, a special segment 145 (Figs. 48, 49 and 50) and a transaction segment 146 (Figs. 4, 48, and 49) are provided. These item segments are moved into indicating positions under the control of the keys, as will now be described, so that in case the operator finds he has depressed one or more of the keys by mistake he can restore the item segments to normal position and place the machine in normal condition by operating an error lever, as will be described later.

The item segments are loosely mounted on a shaft 147 journaled in the frames 80 and 106 of the machine end. The transaction segment 146 is loosely mounted on the shaft 147 between the special segment 145 and the amount segments 143 and has a peripheral flange 148 (Figs. 4 and 49) which is of greater radius than the periphery of the special segment, and projects over the special segment so as normally to cover the latter. The peripheries of amount segments carry the digits from "0" to "9", inclusive, the clerk's segment 144 carries the clerk's initials and the special segment 145 and the transaction segment have characters and words designating the classes of provisions and the various classes of transactions, respectively.

When the machine is in normal condition, that is, before any key has been depressed, all of the item segments are prevented from being rocked counter clockwise (Fig. 2) under the influence of their springs 149 by a bar 150 (Figs. 2, 4, and 48) projecting from an arm 153 (Fig. 8) loosely mounted on the shaft 147. The springs 149 are coiled about the hubs of the item segments and at one of their ends engage a cross rod 154 (Fig. 2), to be described later, while their opposite ends are bent to engage the rear edges of the item segments. Each of the item segments except the transaction segment, has a shoulder 155 and the shoulder on the clerk's segment normally engages a shoulder 156 on a lever 157 loosely mounted on a cross bar 158. The downwardly extending arm 159 of the lever 157 is connected to a spring 160 which tends to rock the lever 157 clockwise (Fig. 2) and thereby normally retains the shoulder 156 in engagement with the shoulder 155 on one of the item segments. Upon each operation of a key, the segments are slid as a unit on the shaft 147, one step toward the left, the segments being shifted a part of the step during depression of the key, another part during the initial return movement of the key, and the remaining part of the step near the end of the return movement of the key as will be described later. In this manner the segments are successively brought into the position at which the clerk's segment normally stands, the shoulder 155 on the segment in such position being in engagement with the shoulder 156 on the lever 157. During the depression of a key the lever 157 is rocked counter clockwise (Fig. 2) and the item segments are shifted the first part of their step of movement so that the item segment which was engaging the lever 157 before the key was depressed is moved out of engagement with the rod 150 whereupon the item segment is rocked counter clockwise by its spring 149 under the control of the key so that the character corresponding to the key depressed moves to a common reading line. The characters at the reading line may be viewed through an opening 163 (Fig. 40) cut in the cabinet 110 of the machine.

Figure 2:
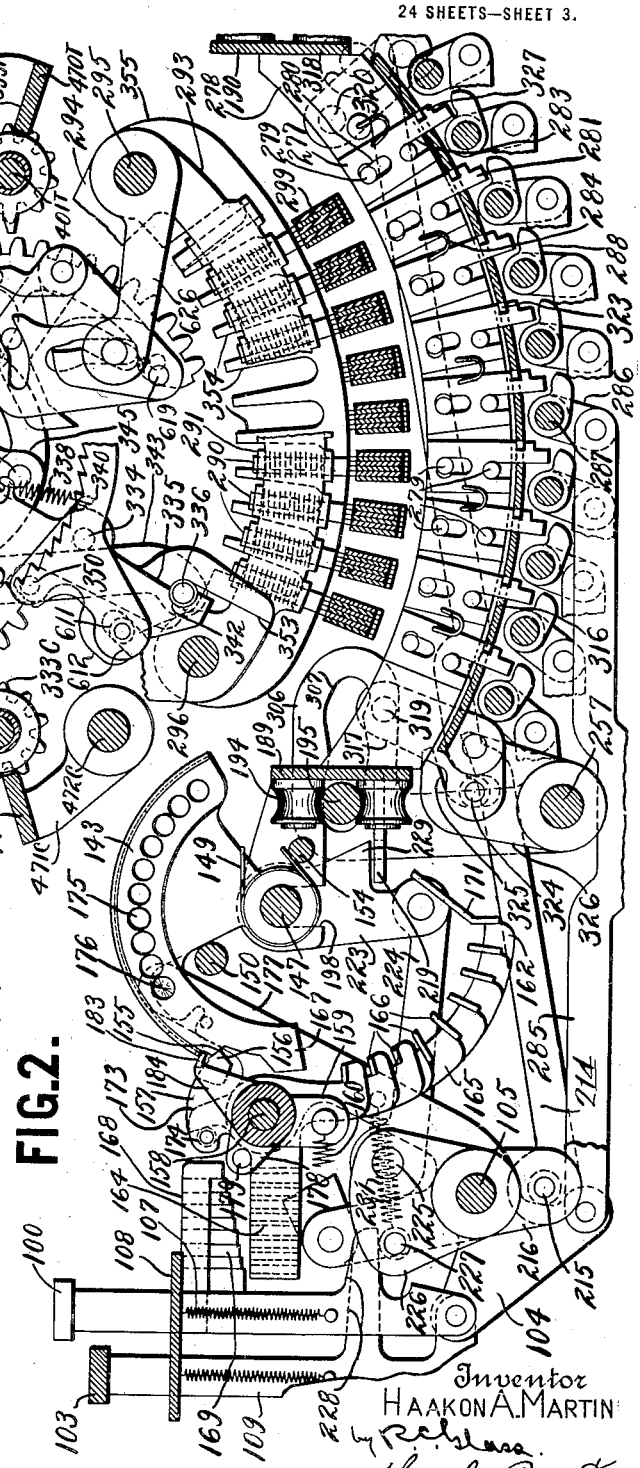
Fig. 2 is a full sized transverse vertical section taken through the machine being taken on the line A—A of Fig. 1ᴮ.

The following described devices are operated by the depressed keys to control the extent of rocking movement of the item segments so that the item segments move extents commensurate to the value of the keys depressed. Nine yokes 164 (Figs. 2 and 4) one for each of the amount keys except the "0" key, are loosely mounted on the cross rod 158. The side arms of the yokes 164 project laterally from the cross rod 158 and are parallel and the longitudinal portions of the yokes are parallel with the cross rod 158 and are varying distances from the cross rod, the yokes being graduated in size so as to extend one within the other. Integral with the right-hand side arms of the yokes for the "1" to "8" keys inclusive, are downwardly and rearwardly extending curved arms 165 (Figs. 2 and 47). An arm 162 for the "9" key is fast on the rod 158. The length of these arms vary proportionately to the value of the keys, the arm 162 for the "9" key being longest while the arm 165 of the yoke operated by the "1" key is the shortest. The arms 165 have flanges or stops 166 and when a key is depressed the corresponding yoke 164 and arm 165 are rocked counter clockwise (Fig. 2) to move the flange 166 into the path of movement of a projection 167 on the lower forward end of the released item segment so that the item segment is arrested thereby. The stationary arm 162 appropriate to the "9" key has a flange 171 which is always in position to arrest the released item segment when the "9" key is depressed. Each item segment with the exception of the transaction segment 146 is provided with a projection 167.

To rock the yokes 164, each amount 100 key carries an arm 168 having a downwardly extending projection 169 at its rear end. The arms 168 are of varying lengths and the projections 169 are immediately above the corresponding yokes 164 so that when a key is depressed the projection 169 on its arm 168 engages the corresponding yoke and thereby rocks the latter counter clockwise (Fig. 2) against the influence of its corresponding spring 170 (Fig. 4) coiled about the cross rod 158. The right-hand side arms of the yokes have vertically extending fingers 173 (Figs. 2 and 4) which normally engage a pin 174 projecting laterally from the lever 157 so that when a yoke is rocked by depression of an amount key 100 the lever 157 is also rocked to carry its shoulder 156 out of engagement with the shoulder 155 on the item segment in operative relation with the lever 157 before the key is depressed.

It can be seen from the above description that when a key is depressed the lever 157 is moved to permit an item segment to be rocked by its spring 149 and at the same time the flange 166 on the arm 165 of the operated yoke 164 is moved into the path of movement of the projection 167 on the released item segment to limit the movement of the latter. During the initial return movement of the depressed amount key to normal position the item segments are shifted the second part of their step of movement as will be described later. During this second part of the step of movement one of the holes 175 in the item segment moved differentially under the control of the key depressed, passes over a rod 176 (Figs. 2 and 4) projecting laterally from a stationary arm 177 loosely mounted on the shaft 105 and rigidly mounted on the cross rod 158. Each of the item segments has ten holes 175 and a hole is in alinement with the rod 176 when the segment is in any one of its ten positions so that when the item segments are shifted the hole in the item segment last moved and in alinement with the rod passes over the rod, the rod in this manner serving to retain the operated item segments in their differentially moved positions. In order to prevent the yokes 164 from being rocked clockwise (Fig. 2) past their normal positions, an arm 178 fast on the cross rod 158 carries a pin 179 which projects over the right-hand side arms of the yokes 164, these arms being in engagement with the pin when the yokes are in normal position.

When the "0" key 103 is operated the item segments are shifted one step as when one of the amount keys 100 is operated and as the lever 157 is not operated the shoulder 155 on the item segment in operative relation therewith slides on the shoulder 156 of the lever 157. Therefore the item segment is not rocked out of "0" position and the foremost or "0" hole 175 in the segment passes over the rod 176.

As above stated, when a cash or received on account transaction is entered in the machine the second key depressed is employed to represent the class of provisions and when a special transaction, that is, a transaction other than a cash or received on account transaction is to be entered in the machine, the second amount key is employed to represent the class of transactions. When a cash or received on account transaction is entered in the machine, the special indicating segment 145 (Figs. 48, 49, and 50) is moved under the control of the second depressed amount key to indicate through an opening 180 which is cut in the transaction segment 146 and normally at the common reading line. When a transaction other than a cash or received on account is entered in the machine the transaction segment 146 moves with the special segment 145 so that the character on the transaction segment corresponding to the second amount key depressed is moved to the common reading line.

To retain the transaction segment 146 from being rocked when the second amount key is depressed if the special key 114 has not been depressed a flange 183 (Figs. 2, 4, and 40) on an arm 184 loose on the cross rod 158 engages under the forward end of the peripheral flange of the transaction segment 146. When the second amount key is depressed the forward end of the peripheral flange of the segment 146 slides along the flange 183 when the item segments are shifted and the special segment 145 is permitted to be rocked by its spring 149 to the position corresponding to the key depressed. When a transaction other than a cash or received on account is entered in the machine, the arm 184 is rocked counter clockwise (Fig. 2), by depression of the special key 114 to carry the flange 183 from out of engagement with the segment 146. The special segment 145 carries a pin 185 engaged by a finger 186 (Fig. 49) on the transaction segment 146 so that when the special segment is moved differentially the spring 149 for the transaction segment moves the latter with the special segment if the arm 184 has been operated. For the purpose of rocking the arm 184 to carry the flange 183 out of engagement with the transaction segment 146 an arm 187 (Figs. 4 and 40) rigid on the hub of the arm 184 is pivotally connected to the upper end of a link 188 which at its lower end is pivotally connected to the arm 115 to which the lower end of the special key is pivoted. From this construction, it can be seen that the arm 184 is rocked to permit operation of the transaction segment 146 when the special key is operated.

*Escapement mechanism for shifting the indicating item segments.*

The item segments, as above stated, are slid toward the left on the shaft 147 one step, when an amount key is depressed. This movement is effected by the movement of an amount carriage which is controlled by escapement mechanism and the carriage and its escapement mechanism will now be described. The amount carriage carries means which, as will be described later, operates means for controlling the extent of movement of the amount differential mechanism during the operation of the machine.

The amount carriage (Figs. 2, 4, 6, 8, 11, and 14) comprises a front bar 189 and a rear bar 190 which are connected by side bars 193. The bar 189 carries two pairs of rollers 194 engaging opposite sides of a rod 195 and the bar 190 carries two pairs of rollers 192 engaging opposite sides of a rod 196, so that the carriage may be slid on the rods. The front plate 189 of the carriage is U-shaped (Figs. 4 and 11) to form forwardly extending side arms 197. The cross rod 154 engaged by the springs 149 is mounted in these side arms. The arms 197 have recesses 198 (Figs. 2 and 8) engaging over the shaft 147. The left-hand side arm 197 engages the left-hand end of a sleeve 199 (Figs. 4 and 48) loose on the shaft 147 between the arm and the clerks' item segment 144 and the right-hand side arm engages the hub of the right-hand amount item segment 143 so that when the carriage is shifted the item segments are shifted therewith.

The rear bar 190 of the amount carriage has an arm 200 (Figs. 8, 9, and 14) which is inclined downwardly and rearwardly. The lower edge of the arm 200 has a series of ratchet teeth 203 and the upper edge is provided with a series of ratchet teeth 204. Normally the first or left-hand tooth 203 engages the side of an arm 205 loosely mounted on a shaft 206 journaled at its ends in the frames 80 and 106 of the machine. A spring 207 (Fig. 14) connected at its right-hand end to the bar 190 of the amount carriage tends to move the carriage toward the left but such movement is normally prevented by the arm 205. A spring 208 (Figs. 9 and 14) is connected at its lower end to a pin on the arm 205 and at its upper end to a pin 209 on an arm 210 loosely mounted on the shaft 206. The upper end of the arm 205, as best shown in Fig. 14, is bent behind the arm 210 so that the right-hand side of the bent portion is slightly to the right of the right-hand side of the arm 210. The arms 205 and 210 are prevented from sliding on the shaft 206 by collars 213. The arm 210 is pivotally connected to the rear end of a link 214 which at its forward end is mounted on a cross rod 215 (Fig. 2) supported at its ends in two arms 216 loosely mounted on the shaft 105. The rear edges of the arms 104 which are loosely mounted on the shaft 105 and support the amount keys, normally engage the cross rod 215 so that when a key is depressed the rod 215 and therefore the link 214 is moved rearwardly. This movement of the link 214 rocks the arm 210 counter clockwise as viewed in Fig. 9 and the pin 209 which normally engages the arm 205 rocks the arm 205 in the same direction to carry it out of engagement with one of the teeth 203 on the arm 200 of the amount carriage. As the arm 205 moves out of engagement with one of the teeth 203 a shoulder 217 on the arm 210 moves into the path of movement of one of the teeth 204 on the arm 200 and at the same time the spring 207 moves the carriage a part of a step toward the left, the movement of the carriage being arrested by the shoulder 217. During the initial return movement of the key to normal position, the shoulder 217 is rocked out of engagement with the tooth 204 and the arm 205 is moved into the path of movement of one of the teeth 203 whereupon the spring 207 moves the carriage another part of a step toward the left. The carriage at the end of this second part of a step of movement is not arrested by the arm 205 however as the following device is employed for this purpose.

A bar or plate 218 (Figs. 4 and 11) is rigidly mounted on the front bar 189 of the amount carriage and has a horizontal portion 219 with slots 220 formed in its forward edge. An arm 223 (Figs. 2 and 4) is rigidly mounted on the shaft 147 and its lower end is pivotally connected to the rear end of a link 224 which at its forward end is supported by a cross rod 225 supported at its ends in two arms 226 loosely mounted on the shaft 105. A cross rod 227 (Fig. 2) also supported at its ends in the arms 226 is normally engaged by rearwardly extending projections 228 on all the amount keys 100 and 103. When a key is depressed engagement of its projection 228 with the rod 227 rocks the arms 226 counter clockwise (Fig. 2) against the influence of a spring 231 thereby rocking the arm 223 clockwise through the link 224. When the arm 223 is rocked in this manner a projection 229 thereon passes through the slot 220 under the projection at the beginning of the operation of the key so that when the spring 207 (Fig. 14) moves the carriage at the time that the shoulder 217 (Fig. 9) on the arm 210 is moved out of engagement with one of the teeth 204 upon initial return movement of the key, the right-hand side of the slot 220 engages the projection 229 thereby arresting the carriage. During this second movement of the carriage the item segment positioned under the control of the number key depressed is shifted so that one of its holes 175 (Fig. 2) passes over the rod 176. Near the end of the return movement of the depressed key to normal position, the projection 229 is moved out of the recesses 220 so that the spring 207 is permitted to move the carriage the remaining portion of the step of movement, the carriage then being arrested by the arm 205. The purpose for giving the carriage the intermediate movement instead of permitting it to be moved immediately until arrested by the arm 205 when the shoulder 217 on the arm 210 is moved out of engagement with one of the teeth 204 will be described later.

From the above description it can be seen that as the amount carriage is shifted its first portion of a step of movement the item segments are also shifted so that one of them slides off of the rod 150 and is permitted to be rocked by its spring under the control of the depressed key. Then the segments are shifted their second portion of one step of movement so that one of the holes 175 of the positioned segment engages over the rod 176 and finally the segments are shifted the remaining portion of the step of movement so that the item segment of next higher order is moved into engagement with the lever 157. The number of steps of shifting movement of the carriage and the item segment depends of course upon the number of amount keys depressed, each key serving to effect one step of movement.

*Amount carriage restoring mechanism.*

Near the end of the operation of the machine the amount carriage is moved toward the right to normal position and the arms 197 of the front bar 189 of the carriage at the same time slide the item segments to normal position. This restoring mechanism comprises a gear 230 (Figs. 8 and 10) loosely mounted on a vertical shaft 233 supported in brackets 234 mounted on the frame of the machine. The rear bar 190 of the amount carriage has an arm 235 (Figs. 8, 10, 11, and 14) which is bent to form a horizontal rack portion 236 which meshes with the gear 230. It can be seen that as the carriage is moved toward the left the gear 230 is rotated a corresponding extent by the rack portion 236. Rigidly mounted on the shaft 233 is a bevel gear 237 meshing with a bevel gear 238 rigidly mounted on a suitable mounted stub shaft 239. Also rigidly mounted on the shaft 239 is a gear 240 meshing with an intermediate gear 243 loosely mounted on a stud 244. The gear 243 in turn meshes with a segment gear 245 fast on a shaft 246 journaled in the frames 80 and 106 of the machine. An arm 247 is also fast on the shaft 246 and is pivotally connected to the lower end of a pitman 248 which at its upper end is forked to straddle the main drive shaft 68. The pitman near its upper end carries a roller 249 projecting into a cam groove formed in the face of a disk 250 fast on the main drive shaft 68. This cam groove is so constructed that near the end of the operation of the machine the pitman is elevated and through the above described connections rotates the shaft 233 counter clockwise as viewed in Fig. 10 one complete rotation and then rotates the shaft clockwise to normal position. During this counter clockwise movement of the shaft 233 a pin 253 mounted in the shaft engages a vertical pin 254 (Fig. 10) mounted on the gear 230 and rotates the gear 230 to normal position. This movement of the gear wheel through its engagement with the rack portion 236 moves the amount carriage toward the right to normal position.

*Restoring mechanism for the item segments.*

As above stated, when the amount carriage is moved to normal position the item segments are shifted with the carriage to normal position. Before the carriage and item segments are shifted toward the right the rod 150 (Figs. 2, 4, and 8) is lowered. After the item segments are slid to normal position on the shaft 147 the rod 150 is raised thereby rocking the item segments clockwise (Fig. 2) to normal position.

The arm 153 supporting the rod 150 (Fig. 8) carries a stud 255 normally in engagement with the end of an arm 256 loosely mounted on a shaft 257. The arm 256 is pivotally connected to the forward lower end of a link 258 which at its opposite end (Figs. 8 and 23) is forked to straddle the shaft 239. A spring 259 is connected at one end to a pin on the arm 256 and at its opposite end to a stud 260, the spring serving to retain the arm 256 and the link 258 in the normal position shown in Fig. 8. A spring 263 which is connected at its upper end to a pin on the arm 153 and at its lower end to the frame of the machine, tends to rock the arm 153 counter clockwise (Fig. 8) but such movement is normally prevented by engagement of the pin 255 with the arm 256. Pivotally mounted at 264 on the link 258 is a pawl 265 (Figs. 8 and 23) a nose 266 of which normally engages a pin 267 projecting from the gear 240. The nose is normally retained in engagement with the pin 267 by a spring 268 and a pin 269 on the link 258 engages the pawl to prevent clockwise movement of the pawl past normal position.

When the pitman 248 (Fig. 8) is elevated by the cam groove in the disk 250, as above described, the gear wheel 240 is rotated in a counter-clockwise direction and as the pin 267 is in engagement with the pawl 265 the link 258 is moved forwardly in the direction of its length to rock the arm 256 out of engagement with the pin 255 on the arm 153 whereupon the spring 263 rocks the arm 153 to lower the rod 150. This movement of the arm 153 is limited by the engagement of a projection 251 on the arm with a stud 252 (Fig. 8) projecting from the frame 106. After the item segments have been shifted to normal position the arm 153 is rocked back to normal position to raise the rod 150 and thereby rotate the item segments to normal position. To this end the arm 153 is pivotally connected to the forward end of a link 270 which at its rear end is pivotally connected to the lower end of an arm 271 pivotally mounted on a stud 272. When the arm 153 is rocked counter clockwise (Fig. 8) as above described, the arm 271 is rocked clockwise through the link 270. Near the end of the clockwise movement of the gear 243 a stud 275 on the gear engages a projection 276 on the arm 271 thereby rocking the arm 271, the link 270 and the arm 153 to raise the rod 150 and therefore the item segments to normal position. When the arm 153 is raised to normal position in this manner the spring 259 restores the arm 256 to normal position whereupon the free end of the arm 256 is again brought into engagement with the pin 255 on the arm 153 to retain the latter in normal position. When the gear 240 is rotated in a clockwise direction to normal position, the stud 267 engages under the nose 266 of the pawl 265 thereby rocking the pawl, against the action of its spring 268, the pawl being pivoted to permit the pin to be moved to its normal position.

*Selecting plates for the amount differential mechanism.*

The amount keys upon depression operate devices carried by the amount carriage and adapted to operate means for controlling the extent of movement of the amount differential mechanism during the operation of the machine.

These devices consist of rows or series of plates 277 (Figs. 2, 6, and 11) there being one row of plates for each amount differential unit adapted to be controlled by the keys. Each row of plates is carried by curved bars 278 mounted at their ends in the front and rear bars 189 and 190 of the amount carriage. The plates 277 are mounted on the bars 278 by pins 279 (Fig. 2) the plates being provided with slots 280 and 283 through which the pins 279 project so that the plates may be elevated. Springs 284 are mounted at their ends in the plates 277, as shown in Fig. 2, so that when one of the plates is raised as will be described presently, the spring connected to the plate swings about its end mounted in the adjacent unmoved plate thereby serving to retain the elevated plate in such position, as is well known in the art.

The means for selectively elevating these plates will now be described. The arms 104 (Figs. 2 and 42) upon which the amount keys "1" to "9" inclusive, are mounted are pivotally connected to the forward ends of links 285 which at their rear ends are pivotally connected to arms 286 rigidly mounted on shafts 287 there being one shaft for each of these keys. One of the arms 104 for the "0" key is also connected by its link 285 and arm 286 to its corresponding shaft 287. In this manner the "0" key is connected to the foremost shaft, the "1" key to the second shaft, and so on, the "9" key being connected to the rearmost shaft. Each of the shafts 287 with the exception of the rearmost or "9" shaft carries a lifting arm 288, the arms being arranged one back of the other so they are in the same plane.

The amount carriage is normally in such a position relative to the arms 288 that the plates 277 in the left-hand row are moved over the arms 288 when the carriage has been moved two steps by the operation of the first and second depressed amount keys so that when the third amount key is depressed the arm 288 operated by the key through the shaft 287, arm 286, link 285 and arm 104 engages the projection 281 on the corresponding plate 277 to elevate the latter. When the first and second keys are depressed the corresponding arms 288 are rocked idly as these keys represent the totalizers to be selected but when the third key and the keys thereafter are operated the corresponding arms 288 engage the plates 277 above the arms thereby elevating the plates. The amount is set up on the keys in the same manner as an amount is set up on the keyboard of a typewriter, that is, the digits in the amount are taken from left to right successively. When the third key representing the digit in the highest denomination is operated the carriage is moved one more step toward the left and the second row of plates 277, from the left, are positioned over the arms 288 so that when the second key representing the second digit of the amount is depressed the corresponding plate in the second row is elevated and so on, the rows of plates 277 from left to right being moved successively over the row of arms 288 a plate in each row being elevated if a key other than the "9" key is operated. Upon return movement of a key to normal position the arm 288 is restored to normal position before the amount carriage is moved the third and last portion of its step of movement so that the plate 277 in the next row to the right and of the same value as the plate operated by the key does not engage the side of the arm 288, the carriage being arrested at the end of the second portion of the step of movement in order to prevent such engagement.

Upon operation of the machine the amount carriage is elevated by means to be described presently to raise stop pins 290 (Figs. 2 and 6) into position to control the extent of movement of the amount differential mechanism. The stop pins 290 are arranged in transverse rows each row being appropriate to the corresponding differential unit. The pins 290 are mounted in curved bars 293 forming part of frames 294 (Figs. 2, 6 and 15) mounted on shafts 295, 296, and 297. The pins 290 pass through apertures in horizontal lugs 291 on the bars 293 and are adapted to be elevated into operative position against the influence of their compressed springs 298 which are coiled about the pins 290 between the lugs 291 and pins 292 (Fig. 6) on the pins 290. The rearmost or "9" pin in each row is stationary and in elevated operative position these pins serving to arrest the differential mechanism when the "9" key is depressed. As the "9" pins are always in operative position no plates 277 operated by the "9" key are provided.

Bars 299, arranged in groups, (Figs. 2, 6, and 28) are operated by the elevated plates 277 to raise the corresponding stop pins 290 into operative position. There is one group of bars appropriate to each of the digits from "0" to "8" inclusive, and there is one bar in each group for each denominational row of stop pins 290. The bars 299 of a group are loosely mounted at their right-hand ends on a pin 300 projecting from a corresponding bracket 303. The brackets 303 are rigidly mounted on the bar 293 (Fig. 6) carrying the stop pins 290 for controlling the extent of movement for the units differential mechanism. Pins 301 on the brackets 303 are engaged by vertical fingers 302 on the bars 299 to retain the bars in their horizontal position shown in Fig. 6. The bars 299 are arranged and constructed as shown in Fig. 28 so that curved projections 304 (Fig. 6) on their upper edges engage the lower ends of their corresponding stop pins 290. On their lower edges the bars 299 are provided with projections 305 which are arranged in transverse rows, the projections in each row being on the bars of the same denomination.

Upon operation of the third depressed amount key the first row of plates 277 counting from the left, is moved under the first row of projections 305 counting from the right, the projections of this row being on the bars 299 appropriate to the units denomination. The left-hand row of plates 277 is normally three steps to the right of the right-hand row of projections 305 so that these rows of plates and projections are only brought into operative relation upon depression of the third depressed amount key. When the fourth amount key, which represents the digit of second highest denomination in the amount, is operated the left-hand row of plates 277 is moved under the second or tens row of projections and the next row of plates 277 is moved under the units row of projections 305 and so on, the rows of plates 277 after passing from above the operating arms 288 being moved successively under the rows of projections 305 upon depression of the keys representing the amount. To illustrate, let it be assumed that clerk "A" made a cash sale of $1.25, cigars being the commodity purchased. The clerk first depresses the "1" key to represent his initial and then the "7" key to represent cigars and during operation of these keys the corresponding arms 288 (Fig. 2) are idly rocked and the amount carriage is moved two steps toward the left. The clerk then depresses the "1" key to represent one dollar and depression of this key raises the "1" plate 277 in the left-hand row of plates and causes the third step of movement of the carriage to bring this row of plates under the projections 305 on the units bars 299. When the clerk next depresses the "2" key the "2" plate 277 in the second row of plates is elevated and the carriage shifted one more step which brings the first row of plates under the projections 305 on the tens bars 299 and the second row of plates under the projections 305 on the units bars 299. Then when the "5" key is depressed the "5" plate 277 in the third row of plates counting from the left is elevated and the carriage shifted one step which brings the first row of plates 277 under the projections 305 on the hundreds of dollars bars 299, the second row of plates 277 under the projections 305 on the tens bars and the third row of plates 277 under the projections 305 on the units bars.

During operation of the machine the amount carriage is raised so that the elevated plates 277 rock the bars 299 with which they are in operative relation to raise the corresponding stop pins 290 against the action of their springs 298 into position to control the amount differential mechanism. To lift the carriage four cam arms 306 (Figs. 2, 9, and 14) are provided, two of the arms being rigidly mounted on the shaft 206 and the other two on the shaft 257. The cam arms 306 have cam slots 307 through which the ends of the rods 195 and 196 project. The amount carriage is slidably mounted on these rods as already described. Fast on the shaft 257 (Fig. 8) is an arm 308 which at its upper end is pivotally connected to the forward end of a link 309. At its rear end the link 309 is pivotally connected to the upper end of an arm 310 rigidly mounted on the shaft 206. Fast on the shaft 206 is a rearwardly extending arm 313 pivotally connected to the lower end of the pitman 314 which at its upper end (Fig. 52) is forked to straddle the main drive shaft 68. The pitman also carries a roller projecting into a cam groove formed in the face of a disk 315 fast on the main drive shaft 68. This cam groove is so constructed that the pitman is elevated near the beginning of the operation of the machine and lowered to normal position near the end of the operation of the machine. When the pitman is elevated the arm 313 and therefore the shaft 206 and arm 310 and the cam arms 306 fast on the shaft, are rocked counter clockwise (Fig. 8) and the arm 310 through the link 309 rocks the arm 308, shaft 257 and the cam arms 306 fast on this shaft in the same direction and to the same extent. The cam slots 307 in the arms 306 are so constructed that when the arms are rocked in this manner, the cross rods 195 and 196 and therefore the amount carriage is elevated. The ends of the cross rods 195 and 196 project into vertical grooves (not shown) in the frames 80 and 106 and these grooves serve to guide the rods when the latter are raised.

In order to lock the plates 277 which have been elevated by the depression of the keys in such position when the carriage is lifted so that the springs 284 are not depended upon to retain the plates in elevated positions to rock the arms 299 and raise the stop pins 290, a plate 316 (Figs. 2, 6, and 8) is provided. The plate is concentric with the curved edges of the bars 193 and 278 of the carriage and is hung under these bars on arms 317 and 318 there being two arms 317 pivotally mounted at 319 near the forward ends of the side bars 193 while the two arms 318 are pivotally mounted at 320 near the rear ends of the bars 193. The plate 316 has slots 323 (Fig. 2) through which the projections 281 on the plates 277 project. The left side arm 317 carries a rod 324 (Figs. 2 and 6) which projects through a recess 325 (Fig. 2) formed in an arm 326 rigidly mounted on the shaft 257. When the cam arms 306 are rocked to lift the carriage, the arm 326 is rocked with the shaft 257 and the slot 325 is so constructed as to rock the arms 317 and 318 and thereby swing the plate 316 forwardly. The plate when moved forwardly engages under projections 327 formed on the projections 281 of the elevated plates 277 to lock them in elevated position and at the same time the plate engages over the projections 327 on the plates not in elevated position positively to lock them against movement.

When the amount carriage is moved toward the right to normal position, as above described, the elevated plates 277 engage the left-hand inclined ends of horizontal arms 331 (Figs. 6, 8, and 11) and are forced down by the arms to normal position. The arms 331 are integral with a bar 332 mounted on the rods 195 and 196 carrying the amount carriage. When the rods 195 and 196 are raised to elevate the carriage, the inclined ends of the arms 331 pass into recesses 341 (Fig. 6) formed in the lower sides of the arms 299 so that the latter are not raised thereby.

*Amount differential mechanism.*

Differentially movable members 328 (Figs. 2, 15, and 17) one for each denominational row of stop pins 290 are loosely mounted on hubs 321 on the frames 294. Each member carries three curved actuating racks. The front racks 329C on the members actuate the totalizer pinions 333C of the clerks' totalizers, the upper racks 329S actuate the totalizer pinions 333S of the special totalizers, and the rear racks 329T actuate the pinions 333T of the transaction totalizers.

Pivotally mounted at 334 on each member 328 is a pawl 335 which has a recess 342 (Fig. 17) in which normally engages a roller 336 (Fig. 2) which is also in engagement with a recess 337 formed in the member 328. A spring 338, connected at its upper end to a projection 339 on the member 328 and at its lower end to a projection 340 on the pawl 335 normally serves to retain the pawl 335 in the position shown in Fig. 2 so that its recess engages over the roller 336. The roller 336 is mounted on the lower end of a link 343 which at its upper end is pivotally connected by a pin 344 to a corresponding driving arm 345 (Fig. 7<sup>A</sup>) also loosely mounted on the hub 321. Each of the driving arms 345 is pivotally connected at 346 to the forward end of a corresponding pitman 347.

Each of the pitmen 347 is forked at its rear end (Fig. 18) to straddle the main drive shaft 68 and carries a roller projecting into a cam groove formed in the face of a corresponding disk 348 there being one disk for each pitman. The cam grooves in the disks 348 are so constructed that the pitmen 347 are moved forward at the same time and to the same extent but are successively moved from lower to higher orders rearwardly to normal position each pitman being returned a few degrees to normal position before the pitman of next higher order. These pitmen are restored successively to normal position for the purpose of providing sufficient time for the accomplishment of transfers from the totalizer wheels of lower order to the totalizer wheels of higher order.

Movement of the pitmen 347 rock the driving arm 345 first counter clockwise (Fig. 2) an invariable extent and then clockwise to normal position. With the rollers 336 seated in the notches in the pawls 335 the clockwise movement of the driving arms 345 will through the links 343 move the differentially movable members 328 in the same direction. During such movement of these members 328 the lower rear ends of the pawls 335 engage the elevated stop pins 290 in their corresponding rows of stop pins. Such engagement of a pawl 335 serves to move the pawl clockwise about its pivot and carries its notch away from the roller 336. Such movement of the pawl frees the roller 336 and its link 343 for movement away from the shaft 297 and further movement of the driving arm 345 causes only the straightening of the link 343 and arm 345 as a toggle with no further driving of the differentially movable member 328.

A pin 350 on the pawl 335 projects in front of the forward side of the differentially movable member 328 so that when the pawl 335 is rocked by its engagement with the elevated pin 290 the pin 350 is moved into engagement with the member 328 positively to arrest the movement of the latter. During the further movement of the driving arm 345 after the freeing of the roller 336 the roller moves outwardly along a finger 353 on the member 328 and into a corresponding one of a series of slots 354 formed in a corresponding bar 355 carried by the shafts 295 and 296. Upon return movement of the driving arm 345 to normal position, it first withdraws the roller 336 from the slot 354 in which it is located, into engagement with the recess 337 in the differentially movable member 328, so that the member 328 is carried to normal position with the driving arm. From the above described position it can be seen that the differentially movable members 328 and their actuating racks are moved differentially from normal position, the extent of movement of the members being controlled by the elevated stop pins 290 which in turn have been elevated under control of the amount keys operated to represent the amount as above described.

It is obvious that it is necessary to raise all of the "0" stop pins 290 in all the denominations not represented in the amount to be registered. For example, if $3.25 is to be entered in the machine it is necessary to raise the three "0" stop pins 290 in three rows of stop pins to the left of the hundreds or dollars stop pins in order to arrest the differential movement of the members 328 controlled by these rows of stop pins of higher orders in zero position. For this purpose the left-hand side bar 193 (Figs. 6 and 11) of the amount carriage has a horizontal plate or arm 356 which projects under the projections 305 on the "0" lifting bars 299. The plate 356 has rectangular slots 357 and the strips 358 between the slots are normally under the projections 305 of the "0" lifting bars 299. Upon depression of the third amount key, which is depressed to represent the digit of highest denomination in the amount to be entered in the machine, the plate 356 moves from under the projection 305 on the units "0" lifting bar 299 the left-hand row of selecting plates 277 then being moved under the row of projections 305 on the units bars. Then upon operation of each succeeding amount key the plate 356 moves from under the projection 305 on the "0" lifting bar 299 of next higher order, the rows of plates 277 being successively brought under the rows of projections 305 as the keys are operated. It can be seen from this construction that when the amount carriage is lifted as above described, the strips 358 between the slots 357 in the plate 356 engage the projections 305 under which the plate projects thereby rocking the corresponding lifting "0" arms 299 to elevate the "0" stop pins 290 of the corresponding rows of stop pins 290 of denominations not represented in the amount being entered in the machine.

*Transfer mechanism.*

After the differentially movable members 328 have been differentially positioned as above described and before they begin their return movement to normal position the desired totalizers are moved into engagement with the corresponding sets of actuating racks 329C, 329S, 329T so that upon return movement of the differentially movable members to normal positions the amount set up on the keys is added on the engaged totalizers.

The differentially movable members are always moved an additional step from their normal to their zero position before they are in position to be arrested by the "0" stop pins 290. This extra step of movement from zero to normal position upon return movement of the differentially movable members to normal position is employed to effect transfers from one totalizer pinion to the totalizer pinion of next higher order when the pinion of lower order passes from its "9" to its "0" position. When a transfer is not required the actuating rack for the pinion of lower order is rocked clockwise (Fig. 2) about its pin 360 by which it is pivotally mounted on the differentially movable member to the position shown in Fig. 2 during the last step of return movement of the member 328 to normal position. When a transfer is required, however, the rack for the pinion of higher order is not rocked about the pin 360 and therefore the totalizer pinion is moved one additional step to accomplish the transfer.

The devices for controlling actuation of the actuating racks to effect transfers for the special totalizers only will be described as the corresponding devices for the actuating racks for the clerks and transaction totalizers are the same as those for the actuating racks for the special totalizers.

Figure 3:
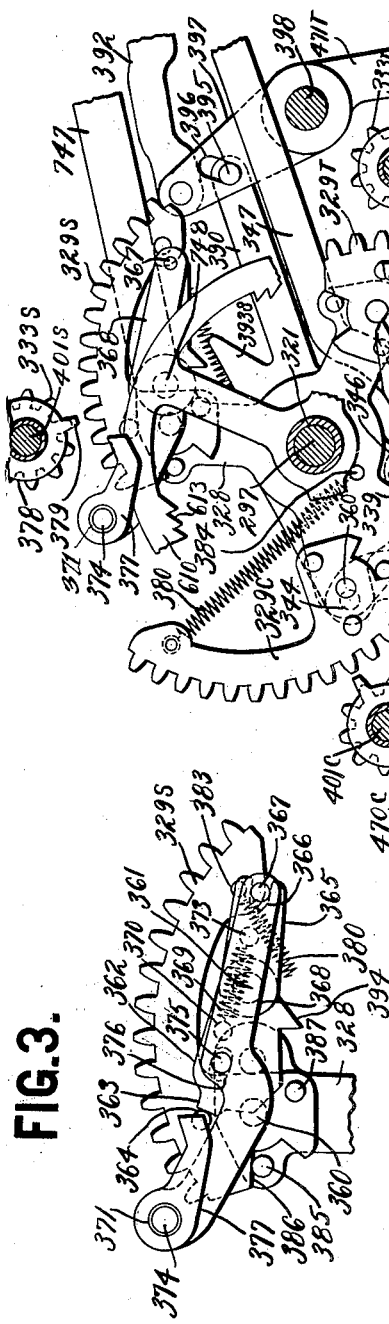
Fig. 3 is an enlarged detail side view of one of the totalizer actuating segments and the transfer mechanism associated therewith.

Loosely mounted on a pin 361 (Figs. 3, 13, and 17) projecting from the corresponding frame 294 (Fig. 17) is an arm 362 and a shoulder 363 on the forward end of the arm normally engages a pin 364 projecting laterally from the corresponding actuating rack 329S. When the differentially movable member 328 is moved from its normal position to its zero position a spring 380 connected at one end to a pin 383 on the rack 329S and at its opposite end to a pin 384 (Fig. 2) on the member 328 rocks the rack clockwise (Figs. 2 and 3) the movement of the rack being limited by the engagement of the lower wall of a recess 386 (Fig. 3) in the rack with a pin 385 on the member 328. A rearwardly extending arm 365 also loose on the pin 361 has a recess 366 at its rear end and a pin 367 projecting from an arm 368 fast on a collar 371 (Figs. 2, 3, and 17) on a stub shaft 374 projects into this recess. A spring 369 (Fig. 3) is connected at its forward end to a pin 370 on the arm 362 and at its rear end to a pin 373 on the arm 365, and the spring is normally above the center of the pin 361 so that the arms 362 and 365 are retained in the position shown in Fig. 3. A pin 375 also projecting from the arm 368 projects into a slot 376 formed in the arm 362. The stub shaft 374 upon which the arm 368 is mounted is journaled in a sleeve or bearing 372 mounted in the frame 294, as best shown in Fig. 13, and this stub shaft on its right-hand end rigidly carries a pawl 377. Rigidly connected with each totalizer pinion 333S is a transfer disk 378 having a tooth 379 (Figs. 2 and 15). As the totalizer pinion passes from its "0" to its "9" position or beyond the tooth 379 engages the pawl 377 thereby rocking the stub shaft 374 and the arm 368 clockwise (Fig. 3). This movement of the arm 368 through the engagement of its pin 367 in the recess 366 in the arm 365 rocks the latter clockwise and the arm 368 through the engagement of its pin 375 in the slot 376 in the arm 362 rocks the latter counter clockwise. These movements of the arms 362 and 365 move the spring 369 below the center of the pin 361 the spring then being effective to retain the arms in their moved positions. If a totalizer pinion is not moved from its "0" to "9" position the arm 362 for the actuating rack 329S for the pinion of next higher order remains in normal position with its shoulder 363 in the path of movement of the pin 364 on the actuating rack. Then when the actuating rack reaches normal position the pin 364 engages the shoulder 363 on the arm 362 and continued movement of the differentially movable member 328 to normal position causes the actuating rack to be rocked counter clockwise (Fig. 3) about its pin 360 and against the action of its spring 380 to the position shown in Fig. 3. During this counter clockwise movement of the actuating rack 329S which occurs during the last step of movement of the differentially movable member 328 to normal position the totalizer pinion meshing therewith is not rotated so that the pinion is moved one less step than the differentially movable member 328. When the arm 362 has been rocked out of normal position, as above described, by the movement of the totalizer pinion of next lower order from its "0" to its "9" position its shoulder 363 is moved out of the path of movement of the pin 364 on the actuating rack so that the rack is not rocked about its pivot 360 during the last step of movement of the differentially movable member 328.

Therefore the pinion of higher order is moved an additional step during the movement of the differentially movable member 328 from its zero to its normal position to carry "1" from the pinion of lower order.

The pin 385 on the differentially movable member 328 engages the upper wall of the recess 386 on the rack to limit the rocking movement of the rack past normal position when the rack is rocked during its last step of return movement to normal position. When the arm 362 is rocked counter clockwise (Fig. 3) to effect a transfer the forward vertical edge of the arm below its shoulder 363 is engaged by a pin 387 on the actuating rack so that the actuating rack is positively prevented from being rocked counter clockwise during the last step of movement of the differentially movable member 328 to normal position.

For the purpose of restoring the tripped transfer devices to normal position near the beginning of the next succeeding operation of the machine members 390 (Fig. 17) one for each differentially movable member 328 are loosely mounted on the hubs 321 on the frames 294. Each member 390 has three projections 393S, 393C and 393T which are normally out of engagement with fingers 394 on their corresponding arms 362. The rear ends of the members 390 are connected by a cross rod 395. The ends of the cross bar project into slots 396 formed in two arms 397 loosely mounted on a shaft 398. One of these arms 397 is shown in Fig. 17. The arms 397 are pivotally connected at their upper ends to the forward ends of corresponding pitmen 392 which at their rear ends (Fig. 19) are forked over the main drive shaft 68. The pitmen 392 carry rollers projecting into cam grooves formed in the faces of corresponding disks 399 fast on the main drive shaft. The cam grooves in the disks 399 are so constructed that the arms 397 are rocked counter clockwise (Fig. 17) near the very beginning of the operation of the machine. This movement of the arms 397 because of the inclination of their slots 396 raises the rod 395 to rock the members 390 counter clockwise. During such movement of the members 390 their projections 393S, 393C and 393T engage the fingers 394 on their corresponding arms 362 thereby restoring the arms 362, 365 and 368 and the pawls 377 to normal position.

It can be seen from Fig. 3, that if the members 390 were rocked while the differentially movable members 328 were in normal position the upper edges of the arms 362 out of normal position would strike their pins 364 on the actuating racks and hence prevent restoration of the transfer devices to normal position or break some of the parts. In order to move the pins 364 from over the moved arms 362 before the arms are restored to normal position the cam grooves in the disks 348 (Fig. 18) are so constructed that the differentially movable members 328 are moved from their normal to their zero positions before the transfer devices are restored to normal positions and then immediately after the transfer devices have been restored to normal positions the differentially movable members are restored to their normal positions.

Totalizers.

As already stated, there are three rows of totalizers and each row comprises nine totalizers. The totalizer pinions of a row of totalizers are arranged in denominational groups each totalizer consisting of one pinion in each group as is well known in the art.

The totalizer pinions 333S of the eight special totalizers and the received on account totalizer (Figs. 2, 15, 20, and 22) are loosely mounted on a sleeve 400S (Fig. 22) slidably mounted on a shaft 401S. The sleeve 400S is connected by arms 402S (Figs. 20, 22, and 23) to a longitudinally shiftable shaft 403S. Spacing disks 404S are loosely mounted on the sleeve 400S between the denominational groups of pinions and the arms 402S are loosely mounted on the hubs of these disks. The end arms 402S are mounted so that they cannot move longitudinally on the shaft 403S and are mounted on the shaft 401S so that the sleeve 400S is shifted with the shaft 403S. As shown in Fig. 21 the rear ends of the arms 402S which at their forward ends are between the denominational groups of totalizer pinions are loosely mounted on a sleeve 405S fast on the shaft 403S and spacing sleeves 406S between the arms prevent relative longitudinal movement between the arms. These arms 402S are arranged and mounted in this manner to prevent any longitudinal movement or play between the denominational groups of totalizer pinions. The shaft 403S is supported near its left-hand end in a bracket 407S (Figs. 20 and 21) as will be described later, and near its right-hand end is engaged on opposite sides by two rollers 408S (Fig. 20) mounted on a bracket 409S fast on the frame 106. The shaft 403S is differentially shifted by means to be described later and through the arms 402S slides the sleeve 400S and the groups of totalizer pinions 333S on the shaft 401S to bring the totalizer pinions of the desired totalizer into position to be moved into engagement with the actuating racks 329S.

The nine clerks' totalizers (Figs. 2, 15, 20, and 23) are mounted on a sleeve 400C surrounding a shaft 401C and the totalizer pinions 333C are arranged in groups in the same manner as the pinions 333S of the special totalizers. Arms 402C are loosely mounted on a shaft 403C and at their lower ends are positioned between the groups of totalizer pinions 333C in the same manner as the arms 402S are positioned between the groups of totalizer pinions 333S. The shaft 403C is mounted near its left-hand end in a bracket 407C in a manner to be described later and near its right-hand end is engaged on opposite sides by roller 408C carried by a bracket 409C fast to the frame 106. The shaft 403C is also shifted differentially under the control of the amount keys, as will be described later, the groups of totalizer pinions 333C through the arms 402C being shifted to the same extent longitudinally of the shaft 401C to bring the pinions of the desired totalizer into coöperative relation with the actuating racks 329C.

The totalizer pinions of the eight transaction totalizers and the grand totalizer are mounted in denominational groups on a sleeve 400T (Figs. 15 and 20) mounted on a shaft 401T. The sleeve 400T is connected by arms 402T (Figs. 20 and 23) to a shaft 403T in the same manner as the sleeves 400C and 400S supporting the groups of special and clerks' totalizers are connected to the corresponding shafts 403C and 403S. The shaft 403T at its right-hand end is mounted to slide between two rollers 408T carried in a bracket 409T and at its left-hand end the shaft is mounted to slide in the frame 80. The shaft 403T and therefore the totalizer pinions 333T are shifted differentially under the control of the second depressed amount key if the special key 114 has been depressed as will be described later, to move the totalizer pinions of the grand totalizer out of normal operative relation with the actuating racks 329T and to move the pinions of the desired transaction totalizer into operative relation therewith.

Totalizer engaging mechanism.

When a cash or received on account transaction is to be entered on the machine the special key 114 is not depressed and the selected clerk's totalizer, the selected special totalizer and the grand totalizer are all rocked into engagement with their corresponding actuating racks so that the amount set up on the amount keys is added on these totalizers. When a transaction other than cash or received on account is to be entered on the machine the special key 114 is depressed and only the selected transaction totalizer is moved into engagement with its actuating racks, the amount in such cases being entered only on the selected transaction totalizer. The means for moving the totalizers into engagement with the actuating racks and the mechanism controlled by the special key for permitting engagement only of a transaction totalizer when other than a cash or received on account transaction is to be entered in the machine will now be described.

Loosely mounted on three studs 410C, 410S and 410T (Fig. 23) projecting from the frame 106 are cam plates 413C, 413S and 413T respectively. Each of the plates 413C, 413S and 413T has a slot 414 through which a roller 415 mounted on the right-hand end of the corresponding shaft 401C, 401S and 401T projects. Three cam plates 413C, 413S and 413T are also mounted on studs projecting from the frame 80 of the machine and rollers on the left-hand ends of the shafts 401C, 401S and 401T project in the slots 414 in these plates. The slots 414 are so formed that when the plates in which the slots are formed are rocked clockwise (Fig. 23) the rollers 415 move toward the ends of the slots opposite the ends in which the rollers are normally located thereby swinging the arms 402C, 402S and 402T about their corresponding shafts 403C, 403S and 403T to move the selected totalizers into engagement with the corresponding actuating racks.

The devices for rocking each pair of plates 413C, 413S and 413T are similar and therefore the devices for the pair of plates 413C only will be described in detail and the corresponding reference numerals for the devices for operating the plates 413S and 413T will be applied to the drawings. The plates 413C carry pins 416C (Fig. 23) engaging in recesses 417C formed in corresponding arms 418C rigidly mounted on the shaft 296. Fast on the shaft 296 (Figs. 35 and 36) is an arm 420C which carries a pin 421C projecting into a slot 422C formed in the lower end of a link 423C. The upper end of a link 423C carries a roller 424C projecting into a slot 419C formed in a disk 432 loosely mounted on the shaft 297. Intermediate its ends the link 423C carries a roller 425C projecting into a slot 426C (Figs. 30 and 33) formed in a disk 427 fast on the shaft 297. The roller 425C normally engages the end of an arm 428C of a lever 429 fast on a sleeve 469 (Fig. 34) loose on the shaft 297.

The disk 432 (Fig. 36) is pivotally connected at 430 to the forward lower end of a link 431 which at its opposite end is pivotally connected to the downwardly and rearwardly extending arm of a lever 433 loosely mounted on the outermost of a series of nested sleeves 434. The rearwardly extending arm of the lever 433 carries a roller 435 normally projecting between two oppositely extending projections 436 and 437 on a pitman 438. The pitman 438 has a recess 439 engaging over the main driving shaft 68 and at its lower end is provided with a recess 440 engaging over a stud 441 projecting laterally from the lower end of an arm 443 loosely mounted on the shaft 68. The pitman 438 carries a roller 444 projecting into a cam groove 445 formed in the face of a disk 446 rigidly mounted on the main drive shaft 68. The cam groove 445 is so constructed that after the driving arms 345 (Fig. 2) for the differentially movable members 328 have reached the limit of their counter clockwise movement and before they begin their return movement to normal position the pitman 438 is lowered on the shaft 68 and pin 441 thereby rocking the disk 432 clockwise (Fig. 36) through the lever 433 and link 431. The slot 419C in a disk 432 is so constructed that when the disk 432 is rocked clockwise as just described the roller 424C will move inwardly toward the shaft 297, and as the roller 425C (Fig. 33) engages the arm 428C the lever 423C is rocked clockwise (Figs. 35 and 36) with the arm 428C as the fulcrum. This movement of the lever 423C rocks the arm 420C, shaft 296 and arms 418C (Fig. 23) counter clockwise to move the plates 413C clockwise for the purpose of moving the selected clerks' totalizer into engagement with the actuating racks 329C. After the differentially movable members 328 have been restored to normal position the disk 432 is rocked counter clockwise to effect disengagement of the selected totalizer.

The arms 418T (Fig. 23) and the arm 420T (Figs. 35 and 36) for the transaction totalizers are splined on the shaft 403T so that the shaft may be shifted independently of the arms 418T and 420T to shift the transaction totalizers and so that the arms are rocked with the shaft to rock the plates 413T. The roller 425T (Figs. 33 and 35) on the link 423T engages a projection 446T (Fig. 33) projecting into the slot 426T formed in the disk 427. When the lever 423T is moved by the disk 432 (Fig. 36) in the same manner as the lever 423C is rocked the projection 446T constitutes a fulcrum for the lever 423T so that the lever is rocked to operate the arm 420T, shaft 403T, arms 418T and plates 413T and thereby effect engagement of the selected transaction totalizer if the special key is depressed and the grand totalizer if the special key is not depressed.

The arms 418S (Fig. 23) for the special totalizers are fast on a shaft 296S and the arm 420S (Figs. 35 and 36) is also fast on this shaft. The roller 425S on the lever 423S engages the end of an arm 428S of the lever 429, so that the lever 423S is rocked about the arm 428S as a fulcrum to effect an engagement of the selected special totalizer in the same manner as the lever 423C is rocked about the arm 428C as a fulcrum to effect engagement of the selected clerks' totalizer.

From the above description it can be seen that when the disk 432 (Fig. 36) is operated during an operation in which a cash or received on account transaction is to be registered the levers 423C, 423T and 423S rock their corresponding cam plates 413C, 413T, and 413S (Fig. 23) to rock the grand totalizer and the selected special and transaction totalizers into engagement with the corresponding actuating racks.

If the special key 114 has been depressed the second amount key depressed represents the class of transactions and during the operation of the machine only the selected transaction totalizer is rocked into engagement with the actuating racks as already stated. In order to prevent engagement of a special totalizer and a clerk's totalizer during such operations the lever 429 (Fig. 33) is rocked by the special key to the position shown in Fig. 38 to move its arms 428C and 428S out of engagement with the rollers 425C and 425S respectively. A downwardly extending arm 450 (Fig. 40) is fast on the shaft 105 which is rocked counter clockwise when the special key is depressed through the arm 115 fast on the shaft as above described. The rear edge of the arm 450 engages a pin 451 which pivotally connects an arm 452 loose on the shaft 105 to the forward end of a link 453. The link 453 at its rear end (Figs. 30, 33 and 38) is pivotally connected at 454 to an arm 455 loosely mounted on the shaft 297. The lower end of the arm 455 is provided with a slot 456 into which projects a roller 457 mounted on the rearwardly extending and nearly horizontal arm of a lever 458, loosely mounted on the shaft 296. The nearly vertical arm of the lever 458 is provided with a slot 459 through which projects a roller 460 mounted on the arm 461 of the lever 429.

From the above description it can be seen that when the special key is depressed the arm 455 is rocked counter clockwise from the position shown in Fig. 33 to the position shown in Fig. 38 and the lever 458 is rocked clockwise by the coöperation of its roller 457 in the slot 456. This movement of the lever 458 rocks the lever 429 counter clockwise thereby moving its arms 428C and 428S out of operative relation with the rollers 425C and 425S. With the lever 429 in this position the levers 423C and 423S (Figs. 35 and 36) are rocked idly about the pins 421C and 421S respectively when the disk 432 is operated to effect engagement of the selected transaction totalizer. As the levers 423C and 423S are idly rocked about their pins 421C and 421T respectively the arms 420C and 420S are not rocked and therefore the clerks' and special totalizers are not swung to move a clerk's or a special totalizer into engagement with the corresponding actuating racks.

Depression of the special key 114 also operates means for positively preventing the engagement of a special totalizer and a clerk's totalizer with the actuating racks.

This means comprises a lever 463 (Figs. 33 and 38) which is rigidly mounted on the sleeve 469 (Fig. 34) carrying the lever 429. When the lever 429, and therefore the lever 463, is rocked by depression of the special key to the position shown in Fig. 38 the outer end of the arm 463S of the lever 463 moves into engagement with a roller 464S mounted on an arm 465S (Figs. 30 and 33) which is fast on the shaft 296S. At the same time the outer end of the arm 463C of the lever 463 is moved into engagement with the roller 464C mounted on an arm 465C fast on the shaft 296. As these arms 463C and 463S are in engagement with the corresponding rollers on the arms 465C and 456S the shafts 296 and 296S and therefore the arms 418C and 418S (Fig. 23) are locked against rocking movement so that the cam engaging arms 413C and 413S are not rocked to move a special or a clerk's totalizer into engagement with their actuating racks.

In order to prevent any movement of the levers 423C, 423S and 423T (Fig. 36) in the direction of their lengths during rocking movements of the levers about their rollers 425C, 425S and 425T respectively or idly about the pins 421C, 421S and 421T respectively, the rollers 425C, 425S and 425T project into slots 467C, 467S and 467T respectively (Fig. 36) formed in a stationary plate 468 loosely mounted on the shafts 296 and 297. The levers 423C and 423S are rocked idly about the pins 421C and 421S respectively during adding operations if the special key has been depressed as above described and two of the levers 423C, 423S and 423T are idly rocked about their corresponding pins 421C, 421S and 421T in total and subtotal printing operations when the third lever is rocked to move the corresponding group of totalizers for the purpose of effecting engagement of the selected totalizer as will be described later.

*Alining mechanisms for totalizer pinions.*

The alining devices for the three groups of totalizers are similar and therefore the following description of the alining mechanism for the special totalizers will be sufficient for the understanding of the alining devices for the transaction and clerks' totalizers.

The alining mechanism for the special totalizers comprises an alining plate 470S (Figs. 15, 20 and 23) carried by arms 471S loosely mounted on a shaft 472S. The arms 471S carry pins 473S which project through recesses 474S (Fig. 23) formed in arms 475S fast on the shaft 472S. Rigidly mounted on the shaft 472S near its ends are two arms 476S which at their lower ends carry pins 477S projecting through slots 478S formed in the plates 413S. The alining plate 470S is normally in engagement with the totalizer pinions 333S and the cam slots 478S are so constructed that the arms 476S, the shaft 472S, the arms 475S, and the arms 471S are rocked clockwise (Fig. 23) when the plates 413S are rocked to move the selected special totalizer into engagement with the actuating racks, so that the plate 470S remains in engagement with the totalizer pinions until the teeth of the selected totalizer pinions have begun to mesh with the actuating racks when the plate is moved no farther. The plate 470S is retained in this position until after the totalizer pinions have been moved out of engagement with the actuating racks and into engagement with the alining plate when the latter is returned to normal position with the group of totalizers.

Two of the arms 402S have extensions 479S which have recesses 480S through which projects the shaft 472S. As shown in Fig. 20 the right-hand extension 479S engages the right-hand end of the hub 483S of the right-hand arm 471S and the left-hand extension 479S engages the left-hand end of the hub 483S of the left-hand arm 471S so that when the totalizer pinions are shifted the alining plate is shifted therewith. The pins 473S are long so that they remain in engagement in the recesses in the arms 475S when the group of totalizers and alining plate are shifted from one extreme position to the other.

The arms 471T (Fig. 23) carrying the alining plate 470T for the transaction totalizers are mounted on the shaft 398, and the arms 471C supporting the alining plate 470C for the clerks' totalizers are mounted on a shaft 472C. Two of the arms 402T have slots 480T engaging over the shaft 398 to shift the alining plate 470T with the transaction totalizers.

When a row of totalizers is rocked to engage one of the totalizers with the actuating racks the totalizer pinions of the other totalizers of the row engage pins or studs 485 (Figs. 12, 13 and 15) on the frames 294 to lock these totalizer pinions against movement when out of engagement with their corresponding alining plates 470S, 470T or 470C.

*Totalizer selecting mechanism.*

When a cash or received on account transaction is to be entered in the machine the group of transaction totalizers is not shifted the grand cash totalizer associated with this group being normally in position to be moved into engagement with the actuating racks 329T. The group of clerks' totalizers, however, is shifted differentially under the control of the first amount key depressed and the group of special totalizers is shifted differentially under the control of the second depressed amount key. The group of transaction totalizers are coupled with the group of special totalizers when the special key is depressed so that the desired transaction totalizer is shifted into operative relation with the actuating racks 329T. The means for coupling these two groups of totalizers will be described later. The differential mechanisms for shifting the groups of totalizers are somewhat similar to the amount differential mechanism above described and the means for controlling the movement thereof is similar to that above described for controlling the movement of the amount differential mechanism.

The means for controlling the differential mechanisms for shifting the groups of totalizers comprises a special carriage (Fig. 29) consisting of a front bar 486 and a rear bar 487 (Fig. 29) connected by side bars 488 (Figs. 6 and 29). The bars 486 and 487 carry pairs of rollers 489 engaging opposite sides of the cross rods 195 and 196, so that the carriage may be slid on the rods and elevated with the rods when the amount carriage is elevated. The spring 207 (Figs. 14 and 29) which is connected at its right-hand end to the amount carriage is connected at its left-hand end to a pin on the rear bar 487 of the special carriage, the special carriage being shifted one step by the spring upon operation of the first depressed amount key and one step upon operation of the second depressed amount key. The escapement mechanism for the special carriage is somewhat similar to part of that for the amount carriage and is designed to permit movement of the special carriage to the right whereas the escapement mechanism for the amount carriage permits movement of the latter toward the left. The escapement mechanism for the special carriage comprises an arm 490 (Fig. 14) loosely mounted on the shaft 206 and coöperating with teeth 493 on the upper edge of an arm 494 of the rear bar 487 of the carriage. An arm 495 is also loosely mounted on the shaft 206 and the arms 490 and 495 are connected by a spring 497 which is secured at one end to a pin 496 on the arm 490 and at its opposite end to a pin on the arm 495. The upper end of the arm 495 is bent to project behind the arm 490 and coöperates with the teeth 498 formed on the lower edge of the arm 494. The arm 490 at its upper end is connected to the upper end of a link 499 (shown in section in Fig. 14) which is like the link 214 connected to the escapement arm 210 for the amount carriage. The forward end (not shown) of the link 499 is loosely mounted on the rod 215 (Fig. 2) so that when the rod 215 is swung rearwardly by depression of an amount key the link 499 rocks the arm 490 into the path of movement of one of the teeth 493 and at the same time the pin 496 moves the arm 495 out of engagement with one of the teeth 498 to permit the spring 207 to move the special carriage toward the right until the tooth 493 engages the arm 490. Then, near the end of the return movement of the key to normal position the arm 490 is moved out of engagement with the tooth 493 and the arm 495 moves into the path of movement of the next tooth 498, whereupon the spring 207 shifts the carriage the remaining portion of one step the carriage being arrested by the engagement of the tooth 498 with the arm 495. The forward bar 486 of the special carriage (Fig. 29) has forwardly extending arms 500 which have recesses (not shown) engaging over the shaft 147. At the end of the second step of movement of the special carriage the right-hand arm engages a pin 503 on the shaft 147 thereby preventing shifting movement of the carriage upon depression of an amount key after two amount keys have been depressed.

For the purpose of restoring the special carriage to normal position near the end of the operation of the machine the arm 494 (Fig. 14) of the bar 487 carries a roller 505 adapted to be engaged by an arm 506 (Fig. 14) rigidly mounted on the shaft 246. The free end of the arm 506 is bent to form a cam surface and is so constructed that when the shaft 246 is rocked counter clockwise (Fig. 8) by the cam 250 through the pitman 248 and arm 247 it engages the roller 505 and shifts the special carriage toward the left past normal position. Then when the arm is moved clockwise the spring 207 moves the special carriage toward the right to normal position.

The special carriage carries a row of lifting plates 507C (Figs. 6 and 29) and a row of lifting plates 507S which are like the lifting plates 277 in the amount carriage and are mounted in the same manner on bars 502 mounted in the special carriage. Arms 508 (Fig. 42) are mounted in a transverse row on the shafts 287 operated by the amount keys "0" to "8" inclusive, as above described. The arms 508 are like the arms 288 and are normally under the plates 507C so that when one of the keys "0" to "8" inclusive is depressed the corresponding plate 507C is elevated and the carriage moved one step to move the row of plates 507S over the arms 508. Then when the second key is depressed the corresponding plate 507S is elevated and carriage is shifted one more step. Upon each operation of the first two depressed amount keys the special carriage is shifted toward the right one step as above described so that after the second key is depressed the row of plates 507C is under the row of projections 509C (Fig. 6) on lifting bars 510C and the row of plates 507S is under the row of projections 509S on bars 510S. The bars 510C and 510S are similar to the bars 299 and are mounted in pairs on pins 511 projecting from brackets 512 mounted on the bar 293 of one of the frames 294. Fingers 513 on the bars 510C and 510S normally engage pins 514 on the brackets 512 to retain the bars in normal horizontal position. The curved projections 515S on the upper left-hand ends of the bars 510S engage the lower ends of corresponding stop pins 516S mounted in a row on a bar 517S (Figs. 6 and 24) loosely mounted on the shafts 295 and 296. The projections 515C on the arms 510C engage pins 516C mounted in a bar 517C.

From the above description it can be seen that when the special carriage is elevated the elevated plates 507C and 507S engage projections 509C and 509S on the corresponding arms 510C and 510S thereby rocking the arms 510C and 510S to raise the corresponding stop pins 516C and 516S into operative position against the tension of their springs.

An arm 520 (Fig. 6) which is like the arm 326 (Figs. 2 and 6) is fast on the shaft 257 and a stud 523 projecting from one of the arms 524 supporting a plate 525 projects through a slot (not shown) in the arm 520. The plate 525 has recesses or slots through which the lower ends of the plates 507C and 507S project so that when the special carriage is raised the arm 520 swings the plate 525 forwardly to lock the elevated plates in elevated position and the unmoved plates against movement in the same manner as the plate 316 (Figs. 2 and 6) locks the plates 277 in the amount carriage in elevated or normal positions.

When the special carriage is shifted toward the left past normal position during operation of the machine as above described the elevated plates 507C and 507S engage the right-hand inclined ends of restoring arms 526 (Fig. 6) which are like the restoring arms 331 and serve to force the elevated plates 507C and 507S down to normal position.

The differential mechanism for shifting the special totalizers and controlled by the row of stop pins 516S is shown in Fig. 24 and the differential mechanism for shifting the clerks' totalizers and controlled by the row of stop pins 516C is shown in Figs. 24 and 26. As shown in Fig. 24 a segment gear 533S is loosely mounted on the shaft 297 and is rigidly connected by a pin 535S to an arm 534S also loose on the shaft 297. The arm 534S pivotally carries at 536S a pawl 537S. A recess in the pawl 537S normally is retained in engagement with a roller 538S by a spring 542S. The roller 538S is mounted on the lower end of a link 539S which at its upper end is pivoted by the pin 540S on a driving arm 541S also loose on the shaft 297. The driving arm 541S is pivotally connected at 543S to the forward end of a pitman 544S which at its rear end is forked to straddle the main drive shaft 68 (Fig. 25). The pitman 544S carries a roller projecting into a cam groove formed in the face of a disk 545S fast on the main drive shaft. This cam groove is so constructed that the arm 541S is rocked counter clockwise (Fig. 24) an invariable distance near the beginning of the operation of the machine and is restored to normal position near the end of the operation of the machine. This movement of the arm 541S through the link 539S moves the arm 534S and segment gear 533S until the pawl 537S engages the elevated stop pin 516S, when movement of the arm 534S and the segment 533S is arrested in the same manner as the differentially movable members 328 are arrested by the elevated stop pins 290.

The differential mechanism for shifting the clerks' totalizers comprises a segment gear 533C (Fig. 26) rigidly connected to an arm 534C loosely mounted on the shaft 297. A pawl 537C pivotally mounted on the arm 534C coöperates with the roller 538C in the same manner as the pawl 537S coöperates with the roller 538S. A link 539C carrying the roller 538C is pivotally mounted at its upper end on a driving arm 541C. A cam (not shown) which is like the cam 545S (Fig. 25) operates a pitman 544C pivoted to the driving arm 541C to move the arm 534C and segment gear 533C differentially under the control of the stop pins 516C.

One of the "0" stop pins 516C and 516S is elevated only in total and subtotal printing operations as will be described later but the "0" key is not adapted to select totalizers for operation. The "9" stop pins 516C and 516S are always in elevated operating position so that these pins arrest the corresponding segment gears 533C and 533S when the "9" key is operated to select the corresponding totalizers.

The segment gear 533S is adapted to mesh with a pinion 548S (Figs. 23 and 24) pivotally mounted on a projection 549S on the bracket 407S. The pinion 548S in turn meshes with a gear 550S (Figs. 20, 21, 23 and 24) which is rigidly mounted on a sleeve 551S loosely mounted on a collar 552S (Fig. 21) fast on the shaft 403S. The sleeve 551S is adapted to rotate within a circular or ring portion 553S of the bracket 407S. The ring portion 553S encircles the smaller portion of the sleeve 551S and fits in a groove formed between an enlarged portion 554S of the sleeve and the gear 550S.

The left-hand end of the shaft 403S is enlarged and has two diametrically opposite spiral grooves 555S formed in this enlarged portion. Rollers 556S which are mounted diametrically opposite each other on pins 557S mounted in the enlarged portion 554S of the sleeve 551S project into their corresponding grooves 555S.

From the above description it can be seen that when the segment 533S is moved differentially the sleeve 551S is also rotated differentially. The grooves 555S are so constructed that when the sleeve 551S is rotated in this manner the revolution of the rollers 557S causes the shaft 403S to be shifted differentially to the right from normal position to move the pinions of the selected special totalizer opposite the actuating racks 329S. The frame 106 has a slot (not shown) in alinement with the right-hand end of the shaft 403 so that when the shaft is shifted the shaft passes through the slot.

The pinions of the received on account totalizer are normally opposite the actuating racks 329S. As shown in Fig. 24, the segment 533S is moved two steps from normal position before it is arrested by the second stop pin 516S (counting from the front) which is elevated by the "1" key when the latter is operated to represent the received on account totalizer. In order to prevent shifting movement of the special totalizers during these first two steps of movement of the segment 533S the following device is employed. A rack 558S (Fig. 24) having three teeth 559S is provided with slots 560S through which pins 563S mounted on the segment 533S project. A spring 564S is connected at one end to the rack 558S and at its opposite end to a pin 562S on the segment 533S. During the first two steps of movement of the segment 533S from normal position the plate 558S is not moved the spring 564S serving to retain the plate in normal position until the pins 563S engage the forward ends of the slots 560S in the rack 558S. Then upon continued movement of the segment 533S the teeth 559S cause rotation of the pinion 548S. When the segment 533S is in normal position there is a space equal to two teeth between the last tooth 559S on the rack 558S and the first tooth on the segment 533S but after the segment 533S is moved two steps the distance between these teeth is the same as that between adjacent teeth on the rack or segment so that the pinion 548S may rotate out of engagement with the teeth 559S into engagement with the teeth on the segment 533S. During the return movement of the segment 533S to normal position and when the segment is in the position in which it is arrested by the foremost stop pin 516S one of the teeth of the pinion 548S engages an obstruction 567S formed between two teeth on the gear 550S so that rotation of the pinion 548S is positively arrested. Then during the continued movement of the segment 533S to normal position the pinion 548S restrains movement of the rack 558S.

The segment gear 533C is adapted to mesh with a pinion 548C (Figs. 20, 23 and 24) which is pivoted on a projection 549C on the bracket 407C. The pinion 548C meshes with a gear 550C which is mounted on a sleeve 551C (Fig. 20) loose on a collar on the shaft 403C in the same manner as the gear 550S is mounted on the sleeve 551S. The sleeve 551C carries two rollers 556C (Fig. 20) coöperating in spiral grooves 555C formed in the enlarged left-hand end of the shaft 403C. Through this mechanism the segment gear 533C shifts the shaft 403C and therefore the clerks' totalizers under the control of the first depressed amount key to select the desired clerks' totalizer for operation. The segment 533C (Figs. 24 and 26) is also moved two steps from normal position before it is adapted to be arrested by the stop pin 516C operated under the control of the "1" key. To this end a plate 558C, which is like the plate 558S, is mounted on the segment 533C in the same manner as the plate 558S is mounted on the segment 533S so that during the first two steps of movement of the segment 533C the clerks' totalizers are not shifted.

The shafts 403S and 403C are positively prevented from rotating by arms 570S and 570C respectively (Fig. 23) rigidly mounted on the shafts. The arm 570S has a recess engaging over the shaft 571S and the arm 570C has a recess engaging over a shaft 571C, so that the arms 570S and 570C can be shifted with the shafts 403S and 403C and at the same time serve to prevent rotation of these latter shafts.

In order to aline the shafts 403C and 403S in their differentially shifted positions alining arms 574C and 574S (Fig. 23) loosely mounted on the shafts 571C and 571S respectively are provided. The arm 574S has an alining projection 575S which is adapted to be moved into engagement with a gear 576S (Figs. 20 and 21) rigidly mounted on the left-hand end of the sleeve 551S and the arm 574C carries an alining projection 575C which is adapted to be moved into engagement with a gear 576C fast on the right-hand end of the sleeve 551C. The arms 574C and 574S carry pins 577C and 577S respectively projecting through slots 578C and 578S respectively formed in a plate 579 loosely mounted on the shaft 297. The plate 579 is pivotally connected at 580 to the forward end of a link 583 which at its rear end is pivotally connected to the upper end of an arm 584 loosely mounted at its lower end on a stud 585. The arm 584 carries a roller 586 projecting into a cam groove 587 formed in the face of a disk 588 fast on the main drive shaft 68. The cam groove 587 is so constructed that immediately after the groups of totalizers have been differentially positioned and before they are rocked to engage the selected totalizers with the actuating racks the plate 579 is rocked clockwise (Fig. 23). The cam slots 578C and 578S are so constructed that when the plate is rocked in this direction the arms 574C and 574S are rocked to move their alining projections into engagement with the gears 576C and 576S respectively. After the selected totalizers have been actuated and before the shifting movements of the groups of totalizers to normal position are begun the plate 579 is rocked back to normal position to rock the aligning arms 574C and 574S out of alining positions.

As above stated when the special key 114 is depressed the second depressed amount key selects a corresponding transaction totalizer for operation and the clerks' and special totalizers are not rocked into engagement with the actuating racks during such operations. For the purpose of shifting the transaction totalizers differentially during the operation of the machine if a special key has been depressed, the shaft 403T (Figs. 20 and 23) is coupled to the shaft 403S so that the differential movement of the shaft 403S under the control of the second depressed amount key, as above described, is imparted to the shaft 403T and thereby to the transaction totalizers to select one of the transaction totalizers for operation.

This coupling means comprises two arms 590 (Figs. 20 and 23) which are loosely mounted on the shaft 403S but are mounted so that they shift with the shaft. These two arms are rigidly connected together by a rod 591 which is supported at its ends in the arms. The left-hand arm 590 carries a pin 594 projecting into a cam slot 595 formed in an arm 596 fast on a shaft 597. Also fast on the shaft 597 is an arm 598 which is pivotally connected to the rear end of a link 599 which at its forward end is pivotally connected to an arm 600 (Fig. 40) fast on the shaft 105 rocked by the depression of the special key, as already described. When the special key is depressed the arm 596 is rocked counter clockwise (Fig. 23) through the above connections between the shafts 105 and 597. The cam slot 595 is so constructed that when the arm 596 is rocked counter clockwise it moves the roller 594 toward the lower end of the slot thereby rocking the arms 590 clockwise about the shaft 403S. When the arms 590 are rocked in this manner their recesses 603 engage over the shaft 403T and the arms 590 engage the ends of the sleeve fast on the shaft 403T. With the arms in this position it can be seen that when the shaft 403S is shifted differentially under the control of the second depressed amount key the shaft 403T and the transaction totalizers are shifted a like extent to move the totalizer pinions of the selected transaction totalizer into operative relation with the actuating racks 329T.

As the shaft 403T is not shifted when a cash or received on account transaction is entered in the machine the grand totalizer being moved into engagement with the actuating racks 329T during such operations the group of transaction totalizers is normally locked against shifting movement. For this purpose an arm 607 (Figs. 20 and 23) is fast on the shaft 597 and its free end normally engages in a groove 608 (Fig. 20) formed in a disk 604 fast on the shaft 403T thereby locking the shaft 403T against shifting movement. When the shaft 597 is rocked counter clockwise (Fig. 23) by the depression of the special key as above described, the arm 607 is rocked out of the groove 608 to permit shifting movement of the shaft 403T and the transaction totalizers.

*Control of amount differential mechanism during total and subtotal printing operations.*

To print a subtotal from any desired totalizer the totalizer is moved into engagement with its actuating racks near the beginning of the operation of the machine and retained in engagement therewith while the actuating racks are moved differentially from normal position under the control of the totalizer wheels and then returned to normal position. In total printing operations the desired totalizer is moved into engagement with its actuating racks at the same time as in subtotal printing operations but as the totalizer is to be left at zero it is disengaged from the actuating racks after the latter have been differentially positioned and before they begin their return movement to normal position. The operation of the totalizer wheels and their control over the differentially movable members 328 carrying the actuating racks will now be described. The mechanism for determining which group of totalizers is to be rocked to engage the selected totalizer and for controlling the time of engagement of the selected totalizer will be described later.

The devices controlled by the totalizer pinions of the various groups of totalizers are alike in construction and operation and therefore the description of only one of the devices controlled by the special totalizers will be given. Loosely mounted on the shaft 297 (Figs. 2 and 15) and beside each differentially movable member 328 is a corresponding plate 610 having three sets of teeth 613. The plate 610 carries a stud 611 projecting into a recess 612 formed in the corresponding pawl 335 so that the plate 610 moves with the differentially movable member 328. Loosely mounted on a stub shaft 614 journaled in a sleeve or bearing 621 (Fig. 13) mounted in the frame 294 is a pawl 615 having a nose 616 (Figs. 15 and 16) normally out of engagement with the corresponding set of teeth 613. Fast on the stub shaft 614 is a pawl 617 and also fast on the shaft 614 is an arm 618. An arm 620 is pivotally mounted by a pin 619 on the arm 618. The arm 618 has a slot 623 and the arm 620 has a slot 624 through which projects a pin 625 mounted on the lower end of an arm 626, fast on the shaft 571S. The arm 620 also has a slot 627 through which a pin 628 mounted on the pawl 615 projects. The above described parts are shown in normal position in Fig. 16.

When a total or subtotal is to be printed from a special totalizer the shaft 571S as will be described later, is rocked clockwise (Fig. 15) rocking the arm 626 to move the pin 625 forwardly in the slots 623 and 624 to the position shown in Fig. 15. The slot 623 is so formed that when the pin 625 is moved forwardly therein the arm 618 stud shaft 614 and pawl 617 are rocked slightly clockwise to move the pawl 617 into the path of movement of the tooth 379 on the transfer disk rigid with the totalizer pinion meshing with the corresponding actuating rack 329S. The slot 624 in the arm 620 is so shaped that the arm 620 is raised when the pin 625 moves forwardly so that its slot 627 through its co-operation with the pin 628 rocks the pawl 615 slightly counter clockwise against the tension of its spring 629 which is connected at one end to a pin 630 on the arm 631 of the pawl and at its opposite end to the frame 294.

As the totalizer pinions of the selected totalizer are moved into engagement with the corresponding actuating rack 329S before the latter begin their movement from normal position the totalizer pinions are rotated backwardly by such movement of the actuating racks. As a totalizer pinion passes from its "1" to its "0" position the tooth 379 on its transfer disk 378 engages the corresponding pawl 617 thereby rocking the pawl, shaft 614 and arm 618 counter clockwise (Fig. 16). As the arm 620 is pivoted on the arm 618 counter clockwise movement of the arm 618 moves the arm 620 rearwardly thereby rocking the pawl 615 about the shaft 614 to carry its nose 616 into engagement with one of the teeth of the corresponding set 613. In this manner the movement of the plate 610 is arrested and as the pin 611 on the plate 610 engages in the recess 612 in the pawl 335 the pawl is rocked to release the roller 336. When the pawl 335 is rocked in this way movement of the differentially movable member is arrested and the driving arm 345 is permitted to continue its movement as in adding operations.

The arms 626 (Fig. 15) for the transaction totalizers are fast on the shaft 295 and the arms 626 for the clerks' totalizers are fast on the shaft 571C.

Preliminarily to a total or subtotal printing operation the shafts 571C, 571S and 295 are rocked clockwise (Fig. 15) to move the corresponding devices controlled by the totalizer pinions as above described to the positions shown in Fig. 15. These shafts are rocked by the adjustment of a total lever 635 (Figs. 1B, 27, 30, 34 and 37) which is in the form of a plate having an arm 636 projecting through a slot 637 (Fig. 27) formed in an index plate 638 rigidly mounted on the cabinet of the machine. The arm 636 carries a finger piece 639. A thumb latch 640 (Figs. 30 and 37) is pivotally mounted on the total lever at 643 and has a projection 644 engaging in one of the recesses 645 in a plate 646 mounted on the frame 106 when the total lever is in one of its seven predetermined positions. When the total lever is to be adjusted from one position to another the operator grips the finger piece 639 and the thumb piece 647 of the latch thereby rocking the latch against the tension of its spring 648 to move the projection 644 on the latch out of engagement with one of the notches 645 in the plate 646 and then the operator moves the total lever to the desired position.

The shafts 571C, 571S and 295 carry arms 650C, 650S and 650T respectively which at their free ends carry rollers projecting into cam slots 653C, 653S and 653T respectively formed in the total lever. When the total lever is in its central position, in which position the machine is prepared for addition, the rollers and their corresponding arms 650C, 650S and 650T are in the positions shown in Fig. 30. The slots 653C, 653S and 653T are so constructed that when the total lever is moved in either direction out of "add" position the corresponding arms 650C, 650S, and 650T and shafts 571C, 571S and 295 are rocked clockwise (Figs. 30 and 37) to the position shown in Fig. 37 to move the corresponding arms 626 and the associated parts to the positions shown in Fig. 15.

As the amount differential mechanism is controlled by the totalizer pinions of the selected totalizer in total and sub-total printing operations it is obviously necessary that the "0" stop pins 290 should not be elevated to their operative positions during such operations. In order to prevent the plate 356 (Figs. 6 and 11) on the amount carriage from engaging the projections 305 on the "0" lifting bars 299 when the amount carriage is elevated in such operations the carriage is shifted one-half step toward the right by the adjustment of the total lever out of adding position so that the strips 358 (Fig. 11) between the slots 357 in the plate 356 are moved from under the projections 305. With the amount carriage in this position the slots 357 pass over the projections 305 when the carriage is raised and therefore the "0" stop pins 290 are not elevated.

To move the carriage one-half step toward the right by the adjustment of the total lever out of "add" position the arm 200 (Figs. 8 and 14) on the rear bar 190 of the amount carriage carries a roller 655 adapted to coöperate with an arm 656 fast on the left-hand end of a sleeve 657 loosely mounted on the shaft 246. The right-hand end of the sleeve 657 is rigidly connected to a vertical arm 658 of a lever 659, the lower end of the lever 659 being U-shaped to form the arm 658. The lever 659 is loosely mounted on the shaft 246 and carries at its upper end a roller 660 (Figs. 34, 35 and 36) which projects into a cam slot 663 formed in a plate 664 fast on the shaft 297 on which is rigidly mounted the total lever 635. The slot 663 is so constructed that when the total lever 635 and plate 664 are moved out of "add" position the lever 659 and therefore the sleeve 657 (Fig. 14) and the arm 656 are rocked counter clockwise as viewed in Fig. 8. As shown in Figs. 34 and 35 the shaft 295 has a U-shaped bend therein to provide proper clearance with the plate 664 and the lever 659. The free end of the arm 656 is bent to form a cam surface and is so designed that when the arm is rocked as above described it engages the roller 655 on the amount carriage and shifts the latter one-half step toward the right. When the amount keys are operated to select a desired totalizer for operation it can be seen that the arm 655 prevents the amount carriage from shifting.

As is usual in the art, there is provided additional totalizer pinions for which no rows of pins 290 are provided these pinions being of highest order denominations and operated in adding operations only when transfers to them are necessary. In the illustrative embodiment disclosed herein there are two additional totalizer pinions in each totalizer. These additional totalizer pinions are operated by differential units like that shown in Figs. 2 and 3, these additional differential units being used to effect transfers to the two totalizer pinions of highest denominations in adding operations and to be controlled by these totalizer pinions in total and subtotal printing operations. The differential units for these additional totalizer pinions are not shown in the drawings as they are identical to the amount differential units above described. In adding operations these additional differential units are moved from normal to zero positions and are arrested in zero positions by "0" stop pins 665 (Fig. 6). There is only one stop pin 665 for each additional differential unit and these pins are mounted in the cross bars 293 of the frames 294 for the corresponding differential units.

These stop pins 665 are normally in lower inoperative positions and in order to elevate them to operative positions in adding operations the following device is employed. The right-hand side bar 488 (Figs. 6 and 7) of the special carriage has a horizontal arm or flange 666 provided with a slot 672 through which the stop pins 665 project. A U-shaped plate or bar 667 is pivotally mounted by pins 668 on the bar 488 and the arm 666. When the special carriage is elevated in adding operations the plate 667 engages the lower ends of the stop pins 665 thereby elevating them to operative position so that they arrest the additional differential units in zero position.

In total and subtotal printing operations these additional differential units are controlled by the additional totalizer elements and therefore the stop pins 665 are not to be elevated to their operative positions. To this end an arm 669 (Figs. 6, 7 and 8) is loosely mounted on a stud 670 (Fig. 8) projecting from a standard 671 mounted on the base of the machine. The upper end of the arm 669 projects through a slot 674 (Fig. 7) formed in the plate 667. The arm 669 is pivotally connected to the forward end of a link 675 (Fig. 8) which at its rear end is pivotally connected to an arm 676 (Figs. 8 and 14) fast on a shaft 677. An arm 678 rigidly mounted on the shaft 677 carries a pin 679 projecting into a recess formed in the free end of an arm 680 integral with the cam arm 656. When the arm 656 is rocked counter clockwise (Fig. 8) as above described the arm 669 is rocked clockwise through the above described connections to the arm 656. This movement of the arm 669 swings the plate 667 (Figs. 6 and 7) about the pins 668 to move the plate from under the stop pins 665 so that when the special carriage is raised during the operation of the machine the stop pins 665 remain in normal inoperative positions. The slot 672 through which the stop pins 665 project and the slot 674 through which the upper end of the arm 669 projects are sufficiently long to permit two steps of movement of the special carriage toward the right when the first and second amount keys are operated, as above described.

*Operation of the totalizer engaging mechanisms in total and subtotal printing operations.*

In total and subtotal printing operations only one group of totalizers is moved to engage the selected totalizer of the group with the corresponding actuating racks. To determine which group of totalizer pinions is to be rocked the disk 427 (Figs. 30, 33, 37 and 38) is fast on the shaft 297 operated by the total lever 635 and is constructed to effect the engagement of but one totalizer when the total lever is out of adding position.

The positions of the rollers 425C, 425S and 425T relative to their respective slots 426C, 426S and 426T in the disk 427 when the total lever is in the "clerks' reset" (Fig. 27), "transaction reset," "special reset," "special read," "transaction read" and "clerks' read" positions are indicated by the dotted circles 1, 2, 3, 5, 6, and 7 respectively in Fig. 33. As can be seen from this figure and Fig. 37 when the toal lever is in the "clerks' reset" position the roller 425C on the lever 423C is in engagement with a shoulder 683 in the slot 426C so that when the disk 432 (Fig. 36) is rocked by the reset cam to be described later the lever 423C is rocked with the roller 425C as a center to move the selected clerks' totalizer into engagement with the corresponding actuating racks 329C. At the same time the roller 425S is free to move in a set-off 684 in a slot 426S and the roller 425T is free to move in a set-off 685 in the slot 426T so that when the disk 432 is operated the levers 423S and 423T are rocked idly about their corresponding pins 421S and 421T. Therefore, the special totalizers and the transaction totalizers are not rocked to engage totalizers of the groups with the corresponding actuating racks.

When the total lever is in its "transaction reset" position the roller 425T engages a projection 686 (Fig. 33) in the slot 426T and the rollers 425S and 425C are free to move idly toward the shaft 297 when the disk 432 is operated so that only the transaction totalizers are rocked to engage the selected transaction totalizer with the actuating rack 329T.

When the total lever is in its "special reset" position a projection 687 in the slot 626S is engaged by the roller 425S and the rollers 425C and 425T are free to move idly toward the shaft 297 when the disk 432 is operated so that only the special totalizers are rocked to engage the selected special totalizer with the actuating racks 329S.

In like manner when the total lever is in its "special read" position only the special group of totalizers is rocked to engage the selected special totalizer with the actuating racks 329S, when the disk 432 is operated by the read cam to be described later. When the total lever is in its "transaction read" position only the transaction totalizers are rocked to move the selected transaction totalizer into engagement with the actuating racks 329T. With the total lever in the "clerks' read" position only the group of clerks' totalizers is rocked to engage the selected clerk's totalizer with the actuating racks 329C.

In order to select the desired totalizer from which a total or subtotal is to be printed the amount keys are operated as in adding operations. Only the group of totalizers selected by the total lever is rocked to engage the selected totalizer of the group with the corresponding actuating racks. If a clerk's totalizer is to be operated during a total or subtotaling operation the "0" key is depressed after the first amount key has been depressed. It is necessary to depress a second amount key so that the first depressed key may select a clerk's totalizer as the row of lifting plates 507C (Fig. 6) moves under the projections 509C on the bars 510C coöperating with the stop pins 516C upon operation of the second key. When a total or subtotal is to be printed from a transaction totalizer or a special totalizer the "0" key first is depressed and then the amount key representing the desired transaction or special totalizer is depressed. The "0" key instead of another key is depressed in total and subtotal printing operations so that only a character appropriate to the totalizer selected by the other depressed amount key is printed as will be described later.

When a total or subtotal is to be printed from the grand totalizer the total lever is adjusted to "transaction reset" position or the "transaction read" position depending on whether a total or subtotal is to be printed. In order to print a symbol designating that the printed total or subtotal is taken from the grand totalizer as will be described later the special key 114 is depressed after the total lever is adjusted. Then the "0" key and finally the "1" key is depressed. The depression of the special key couples the groups of special and transaction totalizers together but as the "1" key operates the second stop pin 516S from the front these groups of totalizers are not shifted, and the grand totalizer is moved into engagement with the actuating racks 329T as it is normally in operative relation therewith.

It is obviously necessary to operate the lever 429 to move the arms 428C and 428S (Fig. 33) of the lever 429 out of engagement with the corresponding rollers 425C and 425S when the total lever is moved out of "add" position so that only the group of totalizers selected by the total lever is rocked to engage the desired totalizer of the group with the corresponding actuating racks. To disable the lever 429 the roller 457 (Figs. 30, 33 and 35) projects through a cam slot 700 (Fig. 35) formed in the plate 664 which as above described is fast on the shaft 297 operated by the total lever.

When the total lever is in "add" position the roller 457 is normally in the position in the slot shown in Fig. 35. When the special key is depressed the arm 455 (Figs. 30, 33 and 38) is rocked counter clockwise and the slot 456 moves the roller 457 near the center of the slot 456 as shown in Fig. 38 and as above described. When the roller 457 moves to this position it engages in a set-off 703 (Fig. 35) in the slot 700 thereby locking the plate 664 and the total lever against operation. The slot 700 is so constructed that when the total lever is moved in either direction out of "add" position the roller 457 is moved into engagement with the lower end of the slot 456, as shown in Fig. 37 thereby rocking the arm 455 further counter clockwise than when the special key is depressed. As the forward end of the link 453 is pivotally connected to the arm 452 (Fig. 40) loose on the shaft 105 movement of the arm 455 by the adjustment of the total lever out of "add" position does not rock the shaft 105 and therefore does not effect the depression of the special key. Movement of the lever 458 by the adjustment of the total lever rocks the lever 429 further counter clockwise than when the special key is depressed. Such movement of the lever 429 carries its arms 428C and 428S out of engagement with the rollers 425C and 425S respectively to the position shown in Fig. 37. The lever 429 is rocked further when the total lever is adjusted out of adding position than when the special key is depressed so that the arms 463C and 463S of the lever 463 which is rigid with the lever 429 are moved past the rollers 464S and 464C mounted on the arms 465S and 465C.

It will be recalled that the lever 463 is operated by the depression of a special key to move its arms 463S and 463C under the rollers 464S and 464C positively to prevent engagement of a special or a clerk's totalizer when a transaction totalizer is to be operated. In total and subtotal printing operations a disk 705 (Figs. 30, 31, 34 and 37) is provided positively to prevent rocking of the two groups of totalizers when the third group is rocked to engage the actuating racks with the totalizer from which a total or subtotal is to be printed. This disk 705 is fast on the shaft 297 so that it is moved with the total lever. The disk has three slots 706C and the central slot is normally above the roller 464C as shown in Fig. 30 so that when the special group of totalizers is rocked in adding operations the roller moves in the slot. When the total lever is in the "clerks' reset" position as shown in Fig. 37 or the "clerks' read" position the roller 464C is free to move in the foremost slot 706C or the rearmost slot 706C. When the total lever is in any one of its other four positions the roller 464C engages the periphery of the disk between the slots thereby locking the special group of totalizers against rocking movement.

In the same manner three slots 706T are positioned in the disk 705 so that the roller 464T is free to move in one of the slots only when the total lever is in its "add," "transaction reset," or "transaction read" positions.

When the total lever is in its "special reset," "add," and "special read" positions the roller 464S is free to move in a recess 706S in the disk 705 so that the special group of totalizers may be rocked to engage a special totalizer. When the total lever is in one of its other four positions however, the roller 464S is in engagement with the periphery of the disk 705 to either side of the slot 706S so that the group of special totalizers is locked against rocking movement.

In adding operations the disk 432 (Fig. 36) is operated by the cam groove 445 formed in the disk 446 the groove being so designed that the selected totalizers are moved into engagement with the actuating racks before return movement of the racks to normal position is begun and to move the totalizers out of engagement after the racks have been moved to normal position. To provide for total and subtotal printing operations the cams shown in Fig. 32 are provided. The cam for operating the disk 432 when a subtotal is to be printed comprises a disk 713 fast on the main drive shaft 68 and provided with a cam groove 714 into which projects a roller 715 on a pitman 716 (Figs. 32, 36 and 36B). This pitman 716 is mounted on the shaft 68 and the stud 441 in the same manner as the pitman 438 (Fig. 36). The cam for operating the disk 432 in total printing operations comprises a disk fast on the main drive shaft 68 and having a cam groove 717 partially shown in dotted lines in Fig. 32. A roller 718 (Fig. 36A) mounted on a pitman 719 (Figs. 32, 36 and 36A) projects into the cam groove 717. The pitman 719 is mounted on the shaft 68 and stud 441 in the same manner as the pitmen 438 and 716 are mounted thereon.

The arm 443 (Fig. 36) carrying the stud 441 is pivotally connected to the rear end of a link 720 which at its forward end is pivotally connected to the lower end of an arm 723 (Fig. 35) loosely mounted on the shaft 571S. The arm 723 carries a roller 724 projecting into a cam slot 725 formed in the plate 664 which, as above described, is fast on the shaft 297 operated by the total lever. The cam slot 725 is so constructed that when the total lever is moved out of "add" position to one of its "reset" positions to prepare the machine for printing a total the arm 723 is rocked clockwise (Fig.

35). This movement of the arm 723 through the link 720 rocks the arm 443 and therefore the three pitmen 438, 716 and 719 clockwise about the shaft 68 as a center. When the pitmen have been rocked in this manner the roller 435 on the lever 433 is between oppositely extending projections 727 on the pitman 719, so that during the operation of the machine the pitman 719 when moved by the cam groove 717 rocks the lever 433 and through the link 431 operates the disk 432. The cam groove 717 is so constructed that the disk 432 is rocked clockwise (Fig. 36) near the beginning of the operation of the machine to effect engagement of the selected totalizer with the actuating racks before the latter begin their movement to normal position and to move the disk counter clockwise to normal position after the actuating racks have been differentially positioned and before they begin their return movement to normal position. It can therefore be seen that when the total lever is in one of its "reset" positions the selected totalizer is reset to zero and is permitted to remain in such position.

When the total lever is moved from its "add" to one of its "read" positions to prepare the machine for printing a subtotal the cam slot 725 in the plate 664 rocks the arm 723 counter clockwise (Fig. 35) and through the link 720 rocks the arm 443 and pitmen 438, 716 and 719 counter clockwise (Figs. 32 and 36) about the shaft 68. When the pitmen are locked in this manner a slot 728 in the pitman 716 engages over the roller 435. The cam groove 714 (Fig. 32) is so constructed that when the slot 728 in the pitman 716 engages over the roller 435 the disk 432 is rocked clockwise (Fig. 36) at the same time as in total printing operations but is rocked counter clockwise to normal position after the actuating racks have been returned to normal position so that the totalizer is turned to zero and then turned back to its original position. It is understood of course that when one of the three pitmen 438, 716 and 719 is in position to operate the disk 432 the other two pitmen are operated idly by their appropriate cams, all three of the pitmen being operated at every operation of the machine.

*Printing mechanism.*

Figure 1A:
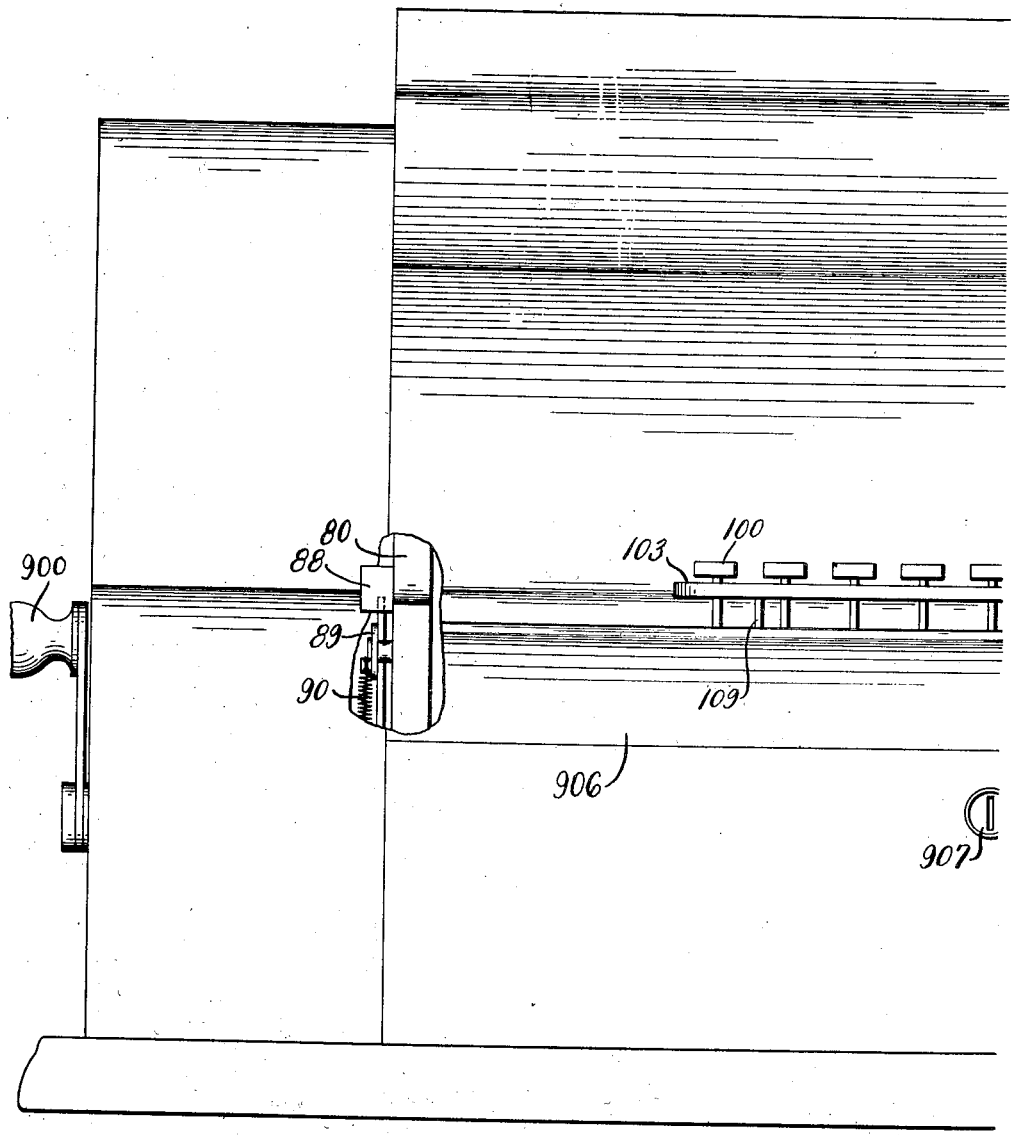

Amount type carriers 730 (Fig. 46), a transaction type carrier 730T for printing characters or symbols representing the classes of transactions, a special type carrier 730S for printing characters or symbols representing the classes of provisions, a clerk's type carrier 730C, and a type carrier 730l controlled by the total lever are rigidly mounted on the right-hand ends of nested sleeves 731. The sleeves 731 are loosely mounted on a cross rod 732 which at its right-hand end is mounted in the lower end of a lever 733 (Figs. 43 and 46). The outermost sleeve 731 is journaled in a plate 734 and therefore this plate serves to support the sleeves and the left-hand end of the cross rod 732. The lever 733 is loosely mounted on a stud 735 projecting from the right-hand side frame 736 of the machine. The plate 734 is loosely mounted on a stud or rod 737 projecting from a frame 738 (Figs. 1ᴮ and 46). The upper ends of the lever 733 and plates 734 are rigidly connected by a cross rod 741.

Rigidly mounted on the left-hand ends of the sleeves 731 carrying the amount type carriers 730 are gears 739 which mesh with gears 740 loosely mounted on the rod 737. The gears 740 mesh with intermediate gears 743 (Figs. 43 and 46) loosely mounted on a stud 744 and the gears 743 in turn mesh with gears 745 rigidly mounted on the left-hand ends of the sleeves 434. On the left-hand ends of the sleeves 434 carrying the gears 745 are rigidly mounted arms 746 (Fig. 23). The arms 746 are pivotally connected to the rear ends of links 747, which at their forward ends (Fig. 2) are pivotally connected at 748 to the corresponding differential movable members 328. From the above description it can be seen that the differential movements of the members 328 are imparted to the corresponding amount type carriers 730 through the links 747, the arms 746, sleeves 434, gears 745, 743, 740 and 739 and the sleeves 731.

The clerk's type carrier 730C (Figs. 43 and 46) is rigidly mounted on the outermost sleeve 731 and this sleeve on its left-hand end carries a gear wheel 739C meshing with a gear 740C. The gear 740C meshes with a gear 743C which in turn meshes with a gear 745C rigidly mounted on the right-hand end of the shaft 750 upon which are mounted the sleeves 434. The shaft 750 near its left-hand end carries an arm (not shown) pivotally connected to the rear end of a link 751 (Fig. 26) which at its forward end is pivotally connected to the segment gear 533C. It can be seen that through these connections between the segment gear 533C and the clerk's type carrier 730C the differential movement of the segment gear 533C under the control of the first amount key depressed is imparted to the clerk's type carrier.

The left-hand end of the sleeve 731 carrying the special type carrier 730S carries a gear 739S meshing with a gear 740S. Loosely mounted on the stud 737 and immediately to the left of the gear 740S is a gear 740ST. The gear 740ST meshes with a gear 743ST meshing in turn with a gear 745S. A broad pinion 754S (Figs. 43 and 46) is mounted on an arm 755 of a lever 756 loosely mounted on a stud 757 projecting from the frame 738. The broad pinion 754S normally meshes with the gears 740S and 740ST so that these two gears move together as a unit. The left-hand end of the sleeve 434, which carries the gear 745S, carries an arm (not shown) pivotally connected to the rear end of a link 758 (Fig. 24) which at its forward end is pivotally connected to the segment gear 533S. Through these connections between the segment gear 533S and the special type carrier it can be seen that when the broad pinion 754S is in mesh with the gears 740S and 740ST the differential movement of the segment gear 533S under control of the second amount key depressed is imparted to the special type carrier 730S.

The sleeve 731 (Fig. 46) upon which the transaction type carrier 730T is mounted rigidly carries at its left-hand end a gear 739T. The gear 739T meshes with a gear 740T on the stud 737. When the special key 114 is depressed the lever 756 (Figs. 43 and 46) is rocked counter clockwise about the stud 757 as will be described later to move the pinion 754S out of engagement with the gears 740S and 740ST and to move a pinion 754T mounted on the downwardly extending arm of the lever 756 into mesh with the gears 740T and 740St. As above stated the gear 740ST is moved differentially through the above described connections to the segment gear 533S. Therefore when a pinion 754T meshes with the gears 740T and 740ST the movement of this segment gear is imparted to the transaction type carrier 730T. As the pinion 754S is out of mesh with the gears 740S and 740ST during such operations the special type carrier is not moved differentially, the second amount key depressed representing in such operations the class of transactions. When the pinion 754T is out of mesh with the gears 740T and 740ST the transaction type carrier is not moved but the special type carrier is moved differentially to represent the class of provisions sold.

A blank space on each of the type carriers 730S, and 730T is normally at the printing line, so that only the one of these two type carriers moved differentially prints a character or symbol opposite the printed amounts on the detail strip 770 (Fig. 46A). On the transaction type carrier the first character "Ca" (Fig. 46A) which represents "cash" is normally two steps from the printing line and is moved to the printing line while the segment 533S moves from its normal to the position in which it is adapted to be arrested by the second stop pin 516S operated by the "1" key. In like manner the special type carrier is moved two steps from normal position before the first symbol "Rc" (Fig. 46A) representing "received on account" is brought to the printing line.

The means for rocking the lever 756 (Figs. 43 and 46) when the special key is depressed to move the coupling pinion 754S out of engagement with the gears 740S and 740ST and to move the coupling pinion 754T into mesh with the gears 740T and 740ST will now be described. Rigidly mounted on the shaft 105 (Fig. 40) is a downwardly extending arm 763 which is connected by a link 764 to the lower end of an arm 765 (Fig. 43) rigidly connected to the lever 756 but loose on the stud 757. The left-hand end of the shaft 105 projects through the frame 738 and the arm 763 is fast on the shaft to the right of the frame and as the sectional view in this figure is taken to the left of the frames 106 and 738 the arm 763, the link 764 and the arm 765 are shown in broken lines in Fig. 40. From the above description it can be seen that when the shaft 105 is rocked by depression of the special key 114 the lever 756 is rocked through the arm 765, link 764 and arm 763 to move the coupling pinion 754T into mesh with the gears 740S and 740ST (Fig. 46).

The sleeve 731 carrying the type carrier 730l has rigidly mounted on its left-hand end a gear 7391 (Fig. 46) meshing with a gear 7401. The gear 7401 is rigidly connected to the total lever by a pin 7341 (Figs 30 and 46). The pin 7341 moves in a slot or opening (not shown) in the frame 738. Through these connections the total lever positions the type carrier 730l. When the total lever is in "add" position a blank space on the type carrier 730l is at the printing line so that no character is printed. When the total lever is in any one of its "reset" positions the type carrier 730l prints the letter "T" and when in any one of its "read" positions prints the letter "S." It can now be seen that the "0" key is the first amount key depressed when a total or sub-total is to be printed from a special or a transaction totalizer and that this key is the second key depressed when a total or sub-total is to be printed from a clerk's totalizer so that only one of the type carriers 730C, 730S or 730T prints a character. Depression of the "0" key in such cases effects movement of the foremost stop pin 516C or 516S into effective position during operation of the machine so that the appropriate type carrier 730C or 730S is moved only one step from normal position. As these type carriers must be moved two steps before they print as above described they do not print when moved but one step and therefore only the type carrier moved under the control of the key operated to select the desired totalizer prints a character and this character represents the selected totalizer.

The detail strip 770 (Fig. 43) upon which the type carriers are adapted to print is fed from a supply roll 771 about a platen roll 772 onto a storage roll 773. The supply roll 771 is mounted on a stud 774 projecting from an auxiliary frame 775 mounted between the frames 736 and 738. The platen roll 772 and the storage roll 773 are mounted on studs projecting from a plate or frame 776 loosely mounted on the stud 774. No means is shown for feeding the detail strip as such means is not essential to the understanding of the present invention and any desired means may be employed for this purpose.

The forward upper end of a pitman 777 is pivotally connected by a pin 778 to the frame 776 and at its opposite end is forked to straddle a shaft 779 journaled at its ends in the frames 736 and 775. The pitman 777 carries a roller 780 projecting into a cam groove 781 formed in the face of a gear 782 fast on the shaft 779. The shaft 779 and the gear wheel 782 are given one complete rotation on each operation of the machine in a manner to be described later. The cam groove 781 is so constructed that immediately after the type carriers have been differentially positioned the frame 776 is rocked to raise the platen roll 772 so that the latter carries the detail strip against the printing line of the type carriers.

An inking ribbon 784 through which the type carriers print on the detail strip is fed from a roll 785 about a semicircular flange or shield 786 on the plate 734 onto a roll 787. The rolls 785 and 787 are also mounted on the plate 734 and the ribbon is fed from one roll onto the other by any desired means. An opening is cut in the shield at the printing line of the type carriers so that the detail strip may be carried against the type carriers.

The check strip 790 (Fig. 43) which is adapted to be printed upon by the type carriers is fed from a supply roll (not shown) positioned under the machine. The check strip passes from the supply roll between an electroroller 791 and an impression roller 792, then between an electroroller 793 and an impression roller 794. These electro and impression rollers are rotated to feed the check strip through the knives 795 and 796 of the severing mechanism and in front of a platen roll 797.

To rotate the electrorollers and impression rollers the gear 782 fast on the shaft 779 meshes with a gear 798 fast on the impression roll 791 and the gear 799 fast on the electroroller 793 meshes with a gear 800 fast on a shaft 801 upon which the impression roll 794 is rigidly mounted. An intermediate pinion 788 loose on a stud 787 projecting from the frame 736 meshes with the gears 798 and 800. Fast on the shaft 801 and to the left of the frame 775 is a gear 802 meshing with a broad pinion 803 which in turn meshes with a gear 804 rigidly mounted on a shaft 805 journaled in the frames 736 and 775. The gear 804 meshes with a gear 806 fast on the main drive shaft 68. It can be seen that through this gearing the impression and electrorollers are given one complete rotation in the direction of the arrows at every operation of the machine. The electrorollers are provided with the usual feeding flanges coöperating with the impression rollers and these flanges are designed to feed the check strip during the first one half rotation of the rolls.

An inking roll 807 inks an electroplate on the electroroller 791 and an inking roller 808 inks an electroplate and the type of a consecutive number device 809 and a dating device 816 on the electroroller 792. The consecutive number and dating devices are not shown in detail in the drawings as they may have any well known construction.

Immediately after the detail strip 770 is carried against the printing line of the type carriers to take an impression the type carriers are rocked bodily to the position indicated by the dotted lines in Fig. 43 to move the printing line opposite the platen roll 797. In order to rock the type carriers to this position an arm 810 is pivotally connected at its upper end by a pin 811 to the plate 734 and its lower end is loosely mounted on a stud 812. The forward end of a pitman 813 (Figs. 43 and 51) is pivotally connected to the arm 810 intermediate its ends. At its rear end the pitman is forked to straddle the shaft 801 and also carries a roller 814 projecting into a cam groove formed in the face of a disk 815 fast on the shaft 801. This cam groove is so constructed that immediately after the detail strip has been carried against the type carriers the arm 810 is rocked clockwise (Fig. 43) about the stud 812 and the plate 734 and arm 733 are rocked counter clockwise to carry the type wheels to the position indicated by the dotted lines. During such rocking movement of the type carriers they are rotated through the meshing of the corresponding gears 7391, 739, 739T, 739S and 739C with the gears 7401, 740, 740T, 740S and 740C to move the printing line of the type carriers in front of the platen roller 797. After the platen roller has been operated, as will be described presently to carry the check strip against the printing line of the type carriers, the type carriers are moved back to normal position.

The type carriers are alined in their differentially moved positions while the detail strip is being carried against the type carriers by the engagement of alining teeth 817 (Fig. 51) on corresponding arms 818 with the gears 7391, 739, 739C, 739S and 739T there being one arm for each gear. The arms 818 are loosely mounted on a cross rod 819 supported by the forward ends of arms 820 loosely mounted on the shaft 801. Springs 821 are compressed between the lower rear ends of the arms 818 and a horizontal flange 822 on one of the arms 820 yieldingly retain the alining teeth 817 in engagement with the corresponding gears to aline the gears and type carriers in normal and moved positions. The upwardly and rearwardly extending arm 823 of one of the arms 820 carries a roller 824 projecting into a cam groove 825 formed in the gear 804 fast on the shaft 805. The cam groove 825 is so constructed that the arms 820 are rocked counter clockwise (Fig. 51) just before differential movement of the type carriers is begun to carry the teeth 817 out of engagement with the gears and then the arms are rocked to normal position so that the alining teeth 817 engage the gears to aline the type carriers in moved positions. The arms 820 are then rocked to permit movement of the type carriers into position to print on the check strip and then the arms 820 are again rocked clockwise to carry alining teeth 828 on the arms 818 into engagement with the gears 7391, 739, 739C, 739S, and 739T to aline the type carriers in such position. Pins 829 on the arms 820 serve to prevent the springs 821 from rocking the arms 818 counter clockwise past the position shown in Fig. 51.

The platen roll 797 (Fig. 43) is mounted on a shaft 830 which is supported in arms 831 and the ends of the shaft project through slots 832 formed in the frames 736 and 775. The arms 831 are adjustably mounted by a screw 833 and pins 834 on a frame 835. The frame 835 is pivotally connected to the lower end of a lever 836 which at its upper end carries a roller projecting into a cam groove 837 formed in the face of the disk 806 fast on the shaft 68. The cam groove 837 is so constructed that after the type carriers have been rocked into position to print on the check strip the lever 836 is rocked clockwise (Fig. 43) for the purpose of moving the platen roll 797 forwardly to carry the check strip against the printing line of the type wheels. During such forward movement of the platen roll, the platen roll the arms 831 and the frame 835 are guided by the movement of the ends of the shaft 830 in the slots 832 in the frames 736 and 775.

After the check strip has been carried against the type carriers the printed check is severed by the knives 795 and 796 and is then ejected from the machine. The knife 795 is in the form of a shaft having a slot 839 through which the check strip passes and this knife is journaled in the frames 736 and 775. The knife 796 is in the form of an approximately semi-circular collar or sleeve rigidly mounted on the frames 736 and 775 and the knife 795 is free to rotate within the knife 796. The knife 796 has a slot 840 through which the check strip passes. An arm 841 (Figs. 43 and 51) is fast on the knife 795 and is pivotally connected to the forward end of a pitman 842 which at its rear end is forked to straddle the shaft 805. The pitman 842 carries a roller 843 projecting into a cam groove 844 formed in the face of a disk 826 fast on the shaft 68. The shape of the cam groove 844 is such that after the check has been carried against the type carriers the knife 795 is rocked counter clockwise to move the upper end of the slot 839 from under the slot 840 whereupon the check is severed.

After the check has been severed from the check strip it is ejected from the machine by an arm 846 (Figs. 43 and 44) pivotally mounted at its rear end on a stud 847 projecting from the frame 736. A spring 848 is connected at one end to the arm 846 and at its opposite end to the frame 736. The arm 846 has a projection 849 engaging the side of a peripheral flange 850 (Figs. 44 and 45) of a cam 851 fast on the shaft 805. Near the end of the operation of the machine and after the check has been printed a notch 852 in the peripheral flange 850 moves opposite the projection 849 whereupon the spring 848 rocks the ejecting arm 846. During such movement of the arm it engages the left-hand edge of the severed check thereby throwing the check out of the machine through openings (not shown) in a side frame 736 and in the cabinet of the machine. Upon the continued movement of the cam 851 the inclined or cam edge 853 of the notch 852 rocks the arm 846 to normal position to permit the check strip to be fed at the next operation of the machine.

*Clerks' consecutive counters.*

There are nine clerks' counters 856 (Figs. 40 and 42) one for each clerk represented by the "1" to "9" keys inclusive. The counters may be of any well known construction and are mounted on separate frames 857 fast on the forward wall of the cabinet 110 of the machine. Each counter consists of a plurality of wheels 858 (Fig. 42) mounted on a shaft 859 (Fig. 40) journaled in the sides of the corresponding frame 857 and carrying an arm 860. When the arm 860 of a counter is rocked the counter wheels are operated to add "1" as is well known in the art. Each shaft 859 carries a turn button or disk 855 having a knurled periphery. When a button 855 is rotated the counter is turned to zero as is well known in the art.

The means for operating each arm 860 comprises a corresponding operating lever 861. The lever 861 for a counter is loosely mounted on a pin 862 projecting from a corresponding arm 863 fast on a shaft 864. An alining arm 865 is also loosely mounted on the pin 862 and the arm 865 has a projection 866 provided with a slot 867 through which projects a cross rod 868. The rod 868 serves to guide the arm 865 when the latter is elevated. A pawl 869 is loosely mounted on the arm 865 and a spring 870, connected at one end to the vertical arm of the pawl and at its opposite end to the lever 861 serves normally to retain the V-shaped nose of the pawl in engagement with the rear notch of the two alining notches 871 formed in the arm 865. The lower end of the lever 861 carries a pin 872 which is engaged by the rear side of a vertical nose 874 on the forward end of an operating link 875. It is understood that there is one of these links 875 for each of the consecutive counters. The links at their rear ends are pivotally connected to arms 876 fast on the appropriate shafts 287. The links 875 project through vertical slots 87 (Fig. 41) formed in a bar or plate 878 (Figs. 40 and 41) fast on the base of the machine. The links also project through cam slots 879 formed in a sliding plate 880. The plate 880 is slidably mounted in a guideway formed by two vertical flanges 881 on a frame 882 also fast on the base of the machine. The plate 880 is provided with pins 883 (Fig. 41) which project through slots 884 formed in the flanges 881. The plate 880 at its left-hand end is provided with a lug 886 (Fig. 40) and a pin connects the lower end of an arm 887 and the lug 886. The upper end of the arm 887 is rigidly mounted on a sleeve 888 (Fig. 29) loosely mounted on the shaft 147 and positioned between the arms 500 of the forward plate 486 of the special carriage so that when the special carriage is shifted upon depression of amount keys the plate 880 is shifted through the arm 887. When the first amount key is depressed to represent the clerks' initial the corresponding shaft 287 is rocked as already described. Such movement of the shaft 287 draws its link 875 rearwardly whereupon the nose 874 on the link through its engagement with the pin 872 on the lever 861 rocks the latter counter clockwise (Fig. 40) about the pin 862. Such movement of the lever moves its upper end under a pin 890 on the corresponding arm 860. The arm 861 is alined in this position by the engagement of the alining nose of the pawl 869 in the front notch 871. Upon depression of the first amount key the plate 880 is slid one step toward the right with the special carriage. During this one step of movement the cam slots 879 in the plate lower the forward ends of the links 875 thereby moving the noses 874 on the links out of engagement with the pins 872 on the levers 861. With the links in this position it can be seen that the operation of an amount key after the first amount key is depressed idly moves a corresponding link 875 rearwardly.

During the operation of the machine the shaft 864 and arms 863 are rocked clockwise (Fig. 40) to elevate the levers 861. As only the upper end of the lever operated by the depression of the amount key representing the clerk's initial is moved under the corresponding pin 890 it can be seen that upon elevation of the levers 861 only the lever operated by the key will operate its corresponding counter. To rock the shaft 864 and the arms 863 an arm 891 is fast on the shaft 864 and is pivotally connected to the lower forward end of a pitman 892. At its upper rear end (Fig. 53) the pitman 892 is forked to straddle the main drive shaft 68 and carries a roller projecting into a cam groove formed in the face of a disk 893 fast on the main drive shaft 68. The configuration of this cam groove is such that the shaft 864 is rocked counter clockwise to elevate the levers 861 as above described.

For the purpose of restoring the operated lever 861 to normal position after the levers have been elevated the following described devices are employed. Arms 896 (Figs. 40 and 42) one for each lever 861 carry studs 895 projecting in front of the corresponding levers 861. The arms 896 which are loose on the shaft 864 carry pins 897 which project into slots 898 formed in corresponding arms 899. The arms 899 are rigidly mounted on the shaft 137 so that when this shaft is rocked clockwise (Fig. 40) during the operation of the machine as already described, the cam slots 898 rock the arms 896 clockwise. During such movement of the arms 896 the stud 895 appropriate to the operated lever 861 engages the forward edge of the latter thereby rocking the lever back to normal position.

When the special carriage is shifted back to normal position as already described the plate 880 is moved with the carriage and the cam slots 879 elevate the forward ends of the operating links 875 to normal position. The slots 879 are so constructed that the special carriage and plate 880 may be shifted toward the left past normal position as already described.

A lid 906 (Figs. 1^A, 1^B and 40) forming part of the cabinet of the machine covers the clerks' counters 856. The lid at its rear edge is hinged on the cabinet and may be raised to expose the amounts on the counters to view. A lock 907 mounted on the cabinet is employed to lock the lid so that only the proprietor or an authorized person having the key to the lock in his possession can gain access to the counters.

*Error lever.*

If the clerk has made a mistake in operating one or more of the keys he can restore all of the parts operated by the keys to normal position before the motor key 88 is depressed by operating an error lever 900 (Figs. 1ᴬ and 39).

The error lever 900 is rigidly mounted on a shaft 901 which is journaled at its right-hand end in the frame 80 and at its left-hand end in a standard 902 mounted on the base of the machine. Rigidly mounted on the shaft 901 is a downwardly extending arm 903 carrying a pin 910 projecting through a slot 911 formed in the forward end of a link 904 which at its rear end is pivotally connected to the lower end of an arm 905 fast on the shaft 246. When the error lever 900 is pulled forwardly the shaft 246 is rocked clockwise as viewed in Fig. 39 and counter clockwise as viewed in Fig. 8 through the arm 903, the link 904 and the arm 905. As the segment gear 245 (Fig. 8) is fast on the shaft 246, as already described, this segment gear is rocked to the same extent and in the same direction by the operation of the error key as it is operated by the cam 250 during the operation of the machine. Therefore this segment gear through the restoring mechanism for the amount carriage and the item segments restores the carriage and item segments to normal position when the error lever is operated. At the same time the restoring arm 506 (Fig. 14) fast on the shaft 246 shifts the special carriage to normal position. When the shaft 246 is rocked by the operation of the error lever 900 the pitman 248 (Fig. 8) is elevated as it is pivotally mounted on the arm 247 fast on the shaft. When the pitman is elevated in this manner its roller 249 is free to move in a radial set-off or groove 908 formed in the cam groove in the disk 250. The slot 911 (Fig. 39) in the link 904 is provided so that when the shaft 246 is operated during the operation of the machine the link 904 may move independently of the arm 903 and error lever.

Fast on the shaft 901 (Fig. 39) is a downwardly extending arm 917 which at its lower end carries a pin 918 which projects into a slot formed in the rear end of a link 919. The link 919 is pivotally connected at its forward end to the upper end of an arm 920 fast on the shaft 137. When the shaft 137 is rocked counter clockwise (Fig. 39) during operation of the machine to effect release of the special key and restoration of the operated lever 861 (Fig. 40) for the selected clerk's counter to normal position the arm 917 and therefore the error lever is not operated because of the slot and pin connection between the arm 917 and link 919. When the error lever is pulled forwardly it rocks the shaft 137 through the link 919 and the arm 920 to effect release of the depressed special key and restoration of the operated arm 861 to normal position in the same manner as during operations of the machine. As the forward end of the pitman 139 is pivotally connected to the arm 138 fast on the shaft 137 the pitman is moved rearwardly by the forward movement of the error lever and during such movement of the pitman its roller moves into a radial set-off or groove 921 (Fig. 54) in the groove formed in the disk 140.

Locking devices.

The motor key 88 (Fig. 39) is locked against operation during operation of one of the amount keys. For this purpose the shaft 147 carries a downwardly extending arm 923 which is pivotally connected to the forward end of a link 924. The rear end of the link 924 is pivotally connected to an arm 925 loosely fastened on a sleeve 932 mounted on the shaft 206. A pawl 926 is also fast on the sleeve 932. Fast on the shaft 86 is a downwardly extending arm 927 which is pivotally connected to the forward end of a link 928 which near its rear end has a slot 929 through which the sleeve 932 projects. When the shaft 147 is rocked counter clockwise (Fig. 39) as above described during depression of an amount key a nose 930 on the pawl 926 moves in front of a stud 931 mounted on the link 928. Therefore when an amount key is out of normal position the pawl 926 locks the motor key against operation, the link 928 being drawn forwardly when the motor key is depressed. When the motor key is depressed the stud 931 is moved over the nose 930 of the pawl 926 thereby preventing operation of an amount key.

An arm 933 is fast on the shaft 901 carrying the error lever and at its upper end the arm 933 is pivotally connected to the forward end of a link 934. The link 934 at its rear end is pivotally connected to an arm 935 which is rigidly mounted on a stub shaft 936 rigidly carrying a lever 937. An arm 938 is rigidly mounted on the sleeve 932 so that when the sleeve is rocked by the operation of an amount key the upper end of the arm 938 is moved under a stud 939 on a lever 937 thereby locking the error lever against operation. When the error lever is drawn forwardly the lever 937 is rocked clockwise (Fig. 39) to move the stud 939 back of the arm 938. Therefore the amount keys are locked against operation during operation of the error lever.

A spring 941 is pivotally connected at its forward end to the link 934 and at its rear end to a stud on the frame 80. This spring serves to retain the error lever in normal position and to return the lever to normal position after being drawn forward.

The clockwise movement of the lever 937 when the error lever is operated moves its rear circular edge 945 in front of a lug or projection 946 mounted on a forwardly extending projection 947 on the rear end of the link 928. Therefore the motor key is locked against operation during operation of the error lever. When the motor key is operated the projection 946 on the link 928 is moved over a shoulder 948 on the lever 937 to lock the error lever against operation.

Operation.

It is thought that the above description is sufficient for a complete understanding of the present invention. However, to recapitulate, the various operations of the machine will be briefly described.

First assume that clerk A has sold two pounds of lard for 25 cents and has received cash payment. The clerk first depresses the "1" key to represent his initial "A", then the "4" key to represent lard and finally the "2" and "5" keys successively to represent 25 cents. The depression of these four keys shifts the amount carriage and the item segments four steps toward the left and the clerk's item segment 144, the special segment 145 and the units and tens amount segments are moved differentially to display the item set up on the keys. After the item has been set up on the keys the motor key 88 is depressed to release the machine.

During the operation of the machine the segment 533C (Fig. 26) is moved two steps but the group of clerks' totalizers is not shifted as the rack 558C is not moved. The clerk's type wheel 730C (Fig. 46) is moved two steps through the connections between the segment 533C and the type wheel to move the initial "A" to the printing line. The segment 533S (Fig. 4) moves six steps under the control of the "4" key to shift the group of special totalizers four steps and to rotate the special type carrier 730S six steps through the corresponding connections, the lard totalizer being brought opposite the racks 329T and the word "Lard" on the special type wheel being brought to the printing line. The units and tens differential units are differentially positioned under the control of the "5" and "2" keys respectively, and the differential units of the higher denominations are arrested in zero position by the "0" stop pins 290 which are elevated into operative position by the arm 356 on the amount carriage. The units and tens amount type carriers 730 are moved by the units and tens differential units corresponding extents through the corresponding connections. After the amount differential mechanism has been differentially positioned and before it begins its return movement to normal position the groups of clerks', special and transaction totalizers are rocked to move clerk A's totalizer, the lard totalizer, and the grand totalizer into engagement with the actuating racks 329C, 329S and 329T respectively so that upon return movement of the amount differential mechanism to normal position 25 cents will be added on each of these totalizers.

After the type carriers have been differentially positioned the detail strip 770 is carried against the printing line. Then the type carriers are rocked bodily into position to print on the check strip. After the check strip has been printed upon the printed check is severed from the strip and ejected from the machine.

When clerk A depressed the "1" key the corresponding link 875 (Fig. 40) rocked the lever 861 for clerk A's counter 856 into operative position. Then during the operation of the machine, when all of the levers 861 are elevated, only clerk A's counter is operated to add "1".

Now assume that clerk A had sold 25 cents' worth of lard and that this amount was to be collected on delivery. In such a case the clerk would first depress the special key 114. He would then depress the "1" key to represent his initial "A" then the "4" key to represent a C. O. D. transaction and finally the "2" and "5" keys successively to represent 25 cents. In such case the operation of the machine would be similar to the above described operation when a cash transaction was entered in the machine with the following exceptions: Instead of the special item segment 145 indicating at the common reading line the transaction segment 146 would be moved to the printing line to indicate a C. O. D. transaction. Depression of the special key couples the group of special totalizers with the group of transaction totalizers so that the main totalizer is shifted out of normal operative relation with the actuating racks 329T and the C. O. D. totalizer is moved into such relation. The depression of the special key also disables the means for effecting engagement of a clerk's and a special totalizer so that during operation of the machine only the group of transaction totalizers is rocked whereby the amount is entered only on the C. O. D. totalizer. Instead of the special type carrier 730S (Fig. 46) being moved differentially under control of the "4" key the transaction type carrier 730T is moved under control of this key to print "C. O. D." to represent a C. O. D. transaction.

When a total is to be printed from a clerk's totalizer, for example, clerk F's totalizer the total lever 635 is to be moved to its uppermost or "clerks' reset" position. This adjustment of the total lever moves the type carrier 730l into position to print the letter "T". The clerk then depresses the key to select his totalizer, the "5" key in the example, and finally depresses the "0" key. The adjustment of the total lever disables the means for effecting engagement of a special totalizer and a transaction totalizer so that during the operation of the machine only clerk F's totalizer is engaged with the actuating racks. The total lever by its adjustment also selects the "reset" cam (Fig. 32) for effective operation so that engagement of the clerk's totalizer with the actuating racks 329C is effected before movement of the racks from normal position is begun and disengagement is effected after the racks have been differentially positioned under the control of the totalizer and before they begin their differential movement to normal position. Differential movement of the racks in such operation positions the amount type carriers so that the total taken from clerk F's totalizer is printed on the detail strip. The type carrier 730T is not moved out of normal position and the type carrier 730S is moved but one step so that neither of these type carriers print.

When a total is to be printed from a special totalizer for example the "meat" totalizer, the total lever is adjusted to its "special reset" position. Then the clerk depresses the "0" key and finally depresses the "5" key to represent "meat." The positioning of the total lever disables the means for effecting engagement of the clerk's and a transaction totalizer with the actuating racks 329C and 329T so that only the "meat" totalizer is engaged with the corresponding actuating racks. In such an operation the type carrier 7301 prints the letter "T" and the type carrier 730S prints a character representing meat but the clerk's and the transaction type carriers do not print.

When a total is to be printed from a transaction totalizer the total lever is first adjusted to its "transaction reset" position. The special key 114 is then depressed; then the "0" key, and finally the key representing the desired totalizer is depressed. The adjustment of the total lever disables the means for rocking the group of clerks' totalizers and the group of special totalizers, and depression of the special key couples the group of special totalizers and group of transaction together. Therefore the desired transaction totalizer is shifted opposite the actuating racks 329T and is the only totalizer engaged with the actuating racks. Depression of the special key also causes the transaction type carrier 730S to be moved differentially under the control of second amount key depressed. The type carrier 7301 prints the letter "T*" and the transaction type carrier 730T prints a character to designate from which transaction totalizer the total has been printed but neither the clerk's nor the special type print.

The operation of the machine when subtotals are taken from the totalizers are the same as those above described when totals are taken from the totalizers with the following exceptions: The positioning of a total lever to a "read" position selects the "read" cam (Fig 32) for operation so that the totalizer selected for operation is moved into engagement with the corresponding actuating racks before movement of the racks from normal position is begun and is disengaged from the racks after the latter have been restored to normal position. In all subtotal print operations the type carrier 7301 prints the letter "S".

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination with a plurality of groups of totalizers, of actuating means therefor, and keys common to the groups of totalizers for selecting any of the totalizers in the groups for actuation and controlling the extent of movement of the actuating means.

2. In a machine of the class described, the combination with a plurality of groups of accounting devices, of actuating means therefor, and keys common to the groups of accounting devices for selecting any of the accounting devices in the groups for actuation and controlling the extent of movement of the actuating means.

3. In a machine of the class described, the combination with a plurality of groups of totalizers, of actuating means therefor, manipulative means common to the groups of totalizers for selecting any of the totalizers in the groups for operation and for controlling the actuating means therefor.

4. In a machine of the class described, the combination with a plurality of groups of accounting devices, of actuating means therefor, manipulative means common to the groups of accounting devices for selecting any of the accounting devices in the groups for operation and for controlling the actuating means therefor.

5. In a machine of the class described, the combination with a plurality of groups of totalizers, of a plurality of actuators common thereto, manipulative means common to the groups of totalizers for selecting any of the totalizers for operation and common to the actuators for controlling their operation.

6. In a machine of the class described, the combination with a plurality of groups of totalizers, of a plurality of actuators common thereto, a series of keys common to the groups of totalizers for selecting any of the totalizers for operation and common to the actuators for controlling their operation.

7. In a machine of the class described, the combination with a plurality of totalizers, of common differential actuating mechanism therefor, means for moving any of the totalizers differentially to bring the desired totalizer into operative relation with said mechanism, and manipulative means common to said actuating mechanism and said moving means for controlling the extents of movement of the same.

8. In a machine of the class described, the combination with a plurality of groups of totalizers, of actuating means therefor, means for positively driving said actuating means, and manipulative means common to the groups of totalizers for selecting any of the totalizers of the groups for actuation and controlling the extent of movement of the actuating means.

9. In a machine of the class described, the combination with a plurality of totalizers, of common differential actuating mechanism therefor, means for effecting relative movement between the plurality of totalizers and the actuating mechanism to establish operative relation between any desired totalizer and the actuating mechanism, and manipulative means common to said actuating mechanism and said means for controlling the same.

10. In a machine of the class described, the combination with a plurality of totalizers, of common differential actuating mechanism therefor, means for effecting relative differential movement between the plurality of totalizers and the actuating mechanism to establish operative relation between the desired totalizer and the actuating mechanism, and manipulative means common to said actuating mechanism and said means for controlling the same.

11. In a machine of the class described, the combination with a plurality of totalizers, of a plurality of actuators common thereto, means for effecting relative movement between the plurality of totalizers and the actuators to establish operative relation between any desired totalizer and the actuators, and manipulative means common to the actuators and said means for controlling the same.

12. In a machine of the class described, the combination with a plurality of totalizers, of a plurality of actuators common thereto, means for effecting relative movement between the plurality of totalizers and the actuators to establish operative relation between any desired totalizer and the actuators, and a series of keys common to the actuators and said means for controlling the same.

13. In a machine of the class described, the combination with three or more totalizers, of a common actuating means therefor, and common manipulative means for selecting any of the totalizers for operation and controlling the extent of movement of the actuating mechanism.

14. In a machine of the class described, the combination with a plurality of totalizers, of a set of actuators common thereto, and common manipulative means for selecting any of the totalizers for operation and controlling the extent of movement of the actuators.

15. In a machine of the class described, the combination with a plurality of totalizers, of a set of actuators common thereto, and keys common to the totalizers and the set of actuators and common to the various actuators of the set for selecting any of the totalizers for operation and controlling the actuators.

16. In a machine of the class described, the combination with a plurality of groups of totalizers, of a set of actuators common thereto, and manipulative means common to the totalizers and the set of actuators said means being common to the groups of totalizers for selecting any of the totalizers for operation and common to the actuators of the set to control their operation.

17. In a machine of the class described, the combination with a plurality of groups of totalizers, of a set of actuators common thereto, and keys common to the totalizers and the set of actuators said keys being common to the groups of totalizers for selecting any of the totalizers for operation and common to the actuators of the set to control their operation.

18. In a machine of the class described, the combination with a main operating mechanism, of a plurality of groups of totalizers, common actuating means therefor, selecting means operable during the operation of the machine for selecting any of the totalizers for operation, and a series of keys common to the groups of totalizers for controlling said selecting means.

19. In a machine of the class described, the combination with a main operating mechanism, of a plurality of groups of totalizers, common actuating means therefor, selecting means operable during the operation of the machine for selecting any of the totalizers for operation, and a series of keys common to the groups of totalizers for controlling said selecting means, and adapted to control the actuating means.

20. In a machine of the class described, the combination with a plurality of groups of totalizers, of actuating means therefor, and keys common to the groups of totalizers for selecting any of the totalizers in the groups for actuation.

21. In a machine of the class described, the combination with a plurality of groups of totalizers, of actuating means therefor, and keys common to the groups of totalizers for selecting totalizers in the groups for actuation, one totalizer being selected upon each depression of a key and the groups from which the totalizers are selected by the keys being dependent upon the order of depression of the keys.

22. In a machine of the class described, the combination with two groups of totalizers, of actuating means therefor, keys common to the groups of totalizers, and means controlled by the keys whereby the first key depressed selects a corresponding totalizer in one group and depression of another key or a second depression of the same key selects the corresponding totalizer in the other group.

23. In a machine of the class described, the combination with a main operating mechanism, of a plurality of totalizers, actuating means for the totalizers, means for effecting operative relation between the desired totalizers and actuating means during the operation of the machine, and a plurality of keys depressible preliminarily to the operation of the machine and each adapted to select any one of a plurality of said totalizers for operation.

24. In a machine of the class described, the combination with a plurality of totalizers, of actuating means therefor, and keys common to the totalizers and the actuating means and adapted to select the desired totalizers for operation or control the actuating means, dependent upon the order of operation of the keys.

25. In a machine of the class described, the combination with a plurality of totalizers, of actuating means therefor, means for selecting the totalizers for operation, means for controlling said actuating means, and a series of keys adapted to operate said selecting means of said controlling means dependent upon the order of operation of the keys.

26. In a machine of the class described, the combination with a main operating mechanism, of a plurality of totalizers, means for selecting the totalizers for operation and operated during the operation of the machine, actuating mechanism for the totalizers, means operated during the operation of the machine for determining the movement of said actuating mechanism, and a series of keys adapted to control said selecting means or said determining means dependent upon the order of operation of the keys.

27. In a machine of the class described, the combination with a main operating mechanism, of a plurality of groups of totalizers, actuating means for the totalizers, means operable during the operation of the machine for establishing operative relation between a totalizer of each group and the actuating means, and a series of keys common to said groups of totalizers for selecting totalizers in accordance to the order of operation of the keys.

28. In a machine of the class described, the combination with a plurality of totalizers, of actuators therefor, means for selecting any of the totalizers for operation, a shiftable carriage carrying means controlling said actuators, and manipulative means common to the selecting means and the controlling means for controlling operation of both of said means.

29. In a machine of the class described, the combination with a plurality of totalizers, of actuators therefor, means for selecting the totalizers for operation, a shiftable carriage carrying means controlling said actuators, and keys common to the selecting means and the controlling means for controlling operation of both of said means in accordance to the order of operation of the keys.

30. In a machine of the class described, the combination with a plurality of groups of totalizers, of actuators therefor, means for selecting totalizers of the groups for operation, a shiftable carriage carrying means controlling said actuators, and a series of keys common to the selecting means and the controlling means for controlling operation of both of said means in accordance to the order of operation of the keys.

31. In a machine of the class described, the combination with a plurality of totalizers, of actuators therefor, a shiftable carriage carrying means for selecting the totalizers for operation, a shiftable carriage carrying means for controlling said actuators, and manipulative means common to both of said carriages for controlling their shifting movements and the operation of the means carried thereby.

32. In a machine of the class described, the combination with a plurality of totalizers, of actuators therefor, a shiftable carriage carrying means for selecting the totalizers for operation, a shiftable carriage carrying means for controlling said actuators, and a series of keys, one for each totalizer and common to both of said carriages for controlling their shifting movements and the operation of the means carried thereby.

33. In a machine of the class described, the combination with a plurality of groups of totalizers, of actuators therefor, a shiftable carriage carrying means for selecting a plurality of the totalizers for operation, a shiftable carriage carrying means for controlling said actuators, and manipulative means common to both of said carriages for controlling their shifting movements and the operation of the means carried thereby.

34. In a machine of the class described, the combination with a plurality of groups of totalizers, of actuators therefor, a shiftable carriage carrying means for selecting a plurality of the totalizers for operation, a shiftable carriage carrying means for controlling said actuators, and a series of keys one for each totalizer in a group and common to both of said carriages for controlling their shifting movements and the operation of the means carried thereby.

35. In a machine of the class described, the combination with a plurality of totalizers, of actuators therefor, a shiftable carriage carrying means for selecting the totalizers for operation, a shiftable carriage carrying means for controlling said actuators, manipulative means common to both of said carriages for controlling their shifting movements and the operation of the means carried thereby, and means for moving said carriages to move their selecting means and controlling means into operative positions.

36. In a machine of the class described, the combination with a main operating mechanism, of a plurality of groups of totalizers, actuators therefor, a shiftable carriage carrying means controlling the selection of the totalizers for operation, a shiftable carriage carrying means for controlling said actuators, means for shifting said carriages, manipulative means common to both of said carriages for controlling the operation of said shifting means, said selecting means, and said controlling means, and means operated by the main operating mechanism for moving said carriages to move their selecting means and controlling means into operative positions.

37. In a machine of the class described, the combination with a plurality of groups of totalizers, of actuating means therefor, keys common to the groups of totalizers and normally operable to select totalizers in all except one of said groups for operation, and a manipulative device constructed to render the keys operable to select totalizers in the last mentioned group for operation.

38. In a machine of the class described, the combination with a plurality of groups of totalizers, of actuating means therefor, keys common to the groups of totalizers and normally operable to select a totalizer in each group for operation, another group of totalizers, normally incapable of being selected for operation by said keys, and a manipulative device operable to render the keys operable to select the totalizers in the last mentioned group for operation and inoperable to select the totalizers of one of the first mentioned groups for operation.

39. In a machine of the class described, the combination with a plurality of groups of totalizers, of actuating means therefor, keys common to the groups of totalizers and normally operable to select the totalizers in all except one certain group for operation, the keys being adapted to select totalizers in the groups in accordance to their order of operation, and means for rendering said keys operable to select totalizers in said certain group.

40. In a machine of the class described, the combination with a plurality of totalizers, of actuators therefor, keys normally operable to select certain of said totalizers for operation, and means for rendering said keys operable to select other of said totalizers for operation.

41. In a machine of the class described, the combination with a plurality of totalizers, of actuators therefor, keys normally operable to select certain of said totalizers for operation, and an independent key for rendering said keys operable to select other of said totalizers for operation.

42. In a machine of the class described, the combination with a plurality of totalizers, of actuators therefor, keys normally operable to select certain of said totalizers for operation in accordance to the order of operation of the keys, and means for rendering said keys operable to select other of said totalizers for operation.

43. In a machine of the class described, the combination with a plurality of totalizers, of actuators therefor, keys normally operable to select certain of said totalizers for operation and operable to control the movement of said actuators, and means for rendering said keys operable to select other of said totalizers for operation.

44. In a machine of the class described, the combination with a plurality of groups of totalizers, of actuating means therefor, keys common to the groups of totalizers for selecting the totalizers for operation and adapted to control the movements of actuators and normally operable to select the totalizers in all except one certain group for operation, the keys being adapted to select totalizers in the groups in accordance to their order of operation, and means for rendering said keys operable to select totalizers in said certain group.

45. In a machine of the class described, the combination with a plurality of totalizers, of actuators therefor, keys normally operable to select certain of said totalizers for operation and adapted to control the extents of movement of said actuators, and an independent key adapted to render said keys operable to select certain other of said totalizers.

46. In a machine of the class described, the combination with amount differential mechanism, of two normally uncoupled groups of totalizers, means for normally moving but one group to select a totalizer of the group for operation, and means for coupling the two groups of totalizers so that said selecting means moves both groups to select a totalizer of the group which normally is not moved.

47. In a machine of the class described, the combination with amount differential mechanism, of two normally uncoupled groups of totalizers, means for normally moving but one group to select a totalizer of the group for operation, means for coupling the two groups of totalizers so that said selecting means moves both groups to select a totalizer of the group which normally is not moved, and keys common to the selecting means and the differential mechanism.

48. In a machine of the class described, the combination with amount differential mechanism, of two normally uncoupled groups of totalizers, means for normally moving but one group to select a totalizer of the group for operation, and manipulative means for coupling the two groups of totalizers so that said selecting means moves both groups to select a totalizer of the group which normally is not moved.

49. In a machine of the class described, the combination with a main operating mechanism, of amount differential mechanism, two normally uncoupled groups of totalizers, means operated by the main operating mechanism for moving one of said groups to select a totalizer of the group for operation, means for coupling the two groups of totalizers so that selecting means moves both groups to select a totalizer of the group which is not normally moved thereby, and manipulative means for controlling said selecting means.

50. In a machine of the class described, the combination with amount differential mechanism, of two normally uncoupled groups of totalizers, means for normally moving but one group to select a totalizer of the group for operation, means for coupling the two groups of totalizers so that said selecting means moves both groups to select a totalizer of the group which is normally not moved, and manipulative means for controlling said selecting means.

51. In a machine of the class described, the combination with a plurality of totalizers, of common actuating mechanism therefor, and a series of depressible but non-arrestable keys for selecting any of the totalizers for operation and controlling said actuating mechanism.

52. In a machine of the class described, the combination with two groups of totalizers, of actuating means therefor, means for normally effecting engagement of a certain totalizer of one group and a selected totalizer of the second group, keys normally operable to select totalizers of the second group for operation, and means for rendering the keys operable to select totalizers of the first group for operation and disable said engaging means so that engagement of a totalizer of the second group and the actuating mechanism is not effected.

53. In a machine of the class described, the combination with a plurality of special totalizers, of a plurality of transaction totalizers, a grand totalizer for accumulating the totals on the special totalizers, actuating means for the totalizers, manipulative means normally operable to select the special totalizers for operation, means for normally effecting engagement of a special and the grand totalizer with the actuating means, and means for rendering the manipulative means operable to select a transaction totalizer for operation and controlling said engaging means so that engagement of only the selected transaction totalizer with the actuating means is effected.

54. In a machine of the class described, the combination with a plurality of special totalizers, of a plurality of transaction totalizers, a grand totalizer for accumulating the totals on the special totalizers, actuating means for the totalizers, manipulative means normally operable to select the special totalizers for operation, means for normally effecting engagement of a special and the grand totalizer with the actuating means, a single manipulative device for rendering the manipulative means operable to select a transaction totalizer for operation and controlling said engaging means so that engagement of only the selected transaction totalizer with the actuating means is effected.

55. In a machine of the class described, the combination with amount differential mechanism, of two normally uncoupled groups of totalizers, means for normally moving but one group to select a totalizer of the group for operation, means for coupling the two groups of totalizers so that said selecting means moves both groups to select a totalizer of the group which is normally not moved, manipulative means for controlling said coupling means, and manipulative means common to the differential mechanism and the selecting means for controlling the same.

56. In a machine of the class described, the combination with two groups of totalizers, of actuating means therefor, means for normally effecting engagement of a certain totalizer of one group and a selected totalizer of the second group, keys normally operable to select totalizers of the second group for operation, means for rendering the keys operable to select totalizers of the first group for operation and disable said engaging means so that engagement of a totalizer of the second group and the actuating mechanism is not effected, and means operated by said keys for controlling the extent of movement of the actuating means.

57. In a machine of the class described, the combination with an accounting device, of actuators therefor, keys controlling said actuators, and a plurality of consecutive counters selected for operation by said keys, the key operated in a certain order relative to the other operated keys being adapted to select the corresponding consecutive counter for operation.

58. In a machine of the class described, the combination with an accounting device, of actuators therefor, keys controlling said actuators, a plurality of consecutive counters one for each key, and connections intermediate said keys and said counters whereby the key operated in a certain order relative to the other keys selects the corresponding consecutive counter for operation.

59. In a machine of the class described, the combination with an accounting device, of actuators therefor, keys controlling said actuators, consecutive counters one for each key, normally effective connections intermediate said keys and said counters whereby a key operated in a certain order relative to the other keys selects the corresponding counter for operation, and means for disabling said connections when a counter is selected for operation.

60. In a machine of the class described, the combination with a plurality of keys, of a plurality of counters one appropriate to each key, normally effective connections intermediate said keys and counters whereby the first key depressed selects the corresponding counter for operation, and a member moved upon depression of the first key operated to disable said connections.

61. In a machine of the class described, the combination with a plurality of totalizers, of actuating means therefor, keys operable to select a plurality of the totalizers for simultaneous operation, a plurality of counters one for each key, and means controlled by the keys whereby only the key operated in a certain order relative to the other keys selects the corresponding counter for operation.

62. In a machine of the class described, the combination with two differentially adjustable item segments, of keys normally adapted to control but one of said item segments, and means for rendering the keys operable to control the other item segment.

63. In a machine of the class described, the combination with two item segments, one within the other, keys normally controlling movement of one item segment to indicate a character corresponding to the depressed key, and means for rendering the keys operable to control movement of the other item segment to indicate another character corresponding to the key depressed.

64. In a machine of the class described, the combination with two differentially adjustable item segments only one of which indicates at a time, of keys normally controlling one segment, and a manipulative device for rendering said keys operable to control the other segment.

65. In a machine of the class described, the combination with a plurality of differentially adjustable item segments, of means for shifting the same, keys controlling the shifting means and the differential movement of the segments, means normally preventing differential movement of one item segment, and means for disabling said preventive means.

66. In a machine of the class described, the combination with a type carrier adapted to be set differentially of mechanism, for setting the type carrier differentially, means normally coupling the differential mechanism and the type carrier, a second type carrier also adapted to be set differentially, and means for uncoupling the differential mechanism and the first type carrier and coupling the differential mechanism and the second type carrier.

67. In a machine of the class described, the combination with two type carriers of different classes adapted to be set differentially, of a series of keys common thereto, means controlled by the keys for normally operating but one of said type carriers, and an independent manipulative device for causing said means to operate the other type carrier.

68. In a machine of the class described, the combination with a totalizer, of actuators for operating the same in adding operation and for turning the same to zero, normally inoperative "0" stop devices for the actuators, means for rendering the "0" stop devices operative in adding operations when the corresponding denominations are not represented in the amount to be entered on the totalizer, and a device for moving said means to render it effective when the totalizer is to be turned to zero.

69. In a machine of the class described, the combination with a totalizer, of actuators for operating the same to effect addition or to turn the same to zero, a row of stop pins for each actuator, a carriage carrying means for moving said stop pins into operative relation, manipulative means for operating said means, means carried by said carriage for moving the "0" stop pins in the denominations not represented in an amount to operative relation, and a device for shifting said carriage when the totalizer is to be turned to zero so that the last mentioned means is rendered ineffective.

70. In a machine of the class described, the combination with a totalizer, of actuators for operating the same in adding operation and for turning the same to zero, normally inoperative zero-stop devices for the actuators, a member having engaging portions for actuating the zero-stop devices and moving them into operative position when the corresponding denominations are not represented in the amount to be entered, and means for positioning the member so that its engaging portions may be effective during adding operations and ineffective during totaling operations.

71. In a machine of the class described, the combination with a totalizer, of actuators for operating the same in adding operation and for turning the same to zero, normally inoperative zero-stop devices for the actuators, a member having engaging portions adapted to coöperate with the zero-stop devices during adding operations when the corresponding denominations are not represented in the amount to be entered and having recesses into which the zero stops may project during totaling operations, and means for positioning the member so that its engaging portions shall be effective during adding operations and so that its recesses may receive the stop devices during totaling operations.

72. In a machine of the class described, the combination with a totalizer, of actuators for operating the same in adding operation and for turning the same to zero, normally inoperative zero-stop devices for the actuators, a bar having perforations equal in number to the zero-stop devices, means for positioning the bar so that the solid portions shall be in engaging relation with the zero-stop devices during adding operations when the corresponding denominations are not represented in the amount to be entered and for shifting the bar so that the perforations aline with the zero-stop devices so as to permit the same to pass therethrough during totaling operations.

73. In a machine of the class described, the combination of a totalizer, actuators for operating the same in adding operation and for turning the same to zero, normally inoperative zero-stop pins for the actuators, a series of bars coöperating with said pins, a member having engaging portions for actuating such of the bars as are not represented in the amount to be entered, said member having non-engaging portions so as not to engage the series of bars during totalizing operations, and means for positioning the member so that its engaging portions may be effective during adding operations and ineffective during totaling operations.

74. In a machine of the class described, the combination with two sets of differentially movable members, of two shiftable carriages one for each set of said members, means carried by each carriage for controlling the corresponding set of differentially movable members, escapement mechanism for each carriage, and manipulative means for controlling said escapement mechanisms and common to both of said controlling means for controlling the same.

75. In a machine of the class described, the combination with two sets of differentially movable members, of two shiftable carriages one for each set of members, means carried by each carriage for controlling the corresponding set of members, escapement mechanism for each carriage, manipulative means for controlling said escapement mechanisms and operable to control first the controlling means in one carriage and then the controlling means in the other carriage the manipulative means being common to the controlling means in both carriages.

76. In a machine of the class described, the combination with two carriages shiftable toward each other, of a plurality of rows of controlling devices in each carriage, escapement mechanism for each carriage, and keys common to both carriages for controlling the escapement mechanism and the controlling devices.

77. In a machine of the class described, the combination with two carriages shiftable toward each other, of a plurality of rows of controlling devices in each carriage, escapement mechanism for each carriage, and keys common to both carriages for controlling the escapement mechanisms and the controlling devices and operable to control the controlling devices first in one carriage and then the controlling devices in the other carriage.

78. In a machine of the class described, the combination with two shiftable carriages, one of which is shiftable into effective position before the other, of controlling means in each carriage, escapement mechanisms for the carriages, and manipulative means common to both carriages for controlling the escapement mechanisms and operable to effect operation of the controlling means in one carriage first and then the controlling means in the other carriage.

79. In a machine of the class described, the combination with two sets of differentially movable members, of two shiftable carriages one for each set of members, rows of plates carried in each carriage for controlling the movable members, escapement mechanisms for the carriages, and keys common to both carriages for controlling the escapement mechanisms and the plates in both carriages.

80. In a machine of the class described, the combination with two sets of differentially movable members, of two shiftable carriages one for each set of members, a plurality of rows of plates carried in each carriage for controlling the corresponding set of members, escapement mechanisms for the carriages, and keys common to the carriages for controlling the escapement mechanisms and operable to select first the plates in one carriage and then the plates in the other carriage.

81. In a machine of the class described, the combination with a carriage shiftable a fixed number of steps, of controlling means carried by said carriage, keys for controlling the shifting of said carriage and adapted to operate said controlling means upon each step of movement of the carriage, a second carriage shiftable upon each operation of a key, and controlling means carried by said second carriage and operated only by the keys which have operated after the first carriage has been moved its fixed number of steps.

82. In a machine of the class described, the combination with a plurality of groups of totalizers, of actuating means therefor, and keys common to the groups of totalizers for selecting during the same operation of the machine totalizers in the groups for actuation and controlling the extent of movement of the actuating means.

83. In a machine of the class described, the combination with a plurality of groups of accounting devices, of actuating means therefor, and keys common to the groups of accounting devices in the groups for actuating and controlling the extent of movement of the actuating means.

84. In a machine of the class described, the combination with a plurality of groups of totalizers, of actuating means therefor, manipulative means common to the groups of totalizers for selecting during the same operation of the machine any of the totalizers in the groups for operation and for controlling the actuating means therefor.

85. In a machine of the class described, the combination with a plurality of groups of accounting devices, of actuating means therefor, manipulative means common to the groups of accounting devices for selecting during the same operation of the machine any of the accounting devices in the groups for operation and for controlling the actuating means therefor.

86. In a machine of the class described, the combination with a plurality of groups of totalizers, of a plurality of actuators common thereto, manipulative means common to the groups of totalizers for selecting during the same operation of the machine any of the totalizers for operation and common to the actuators for controlling their operation.

87. In a machine of the class described, the combination with a plurality of groups of totalizers, of a plurality of actuators common thereto, a series of keys common to the groups of totalizers for selecting during the same operation of the machine any of the totalizers for operation and common to the actuators for controlling their operation.

88. In a machine of the class described, the combination with a plurality of totalizers, of common differential actuating mechanism therefor, means for moving during the same operation of the machine any of the totalizers differentially to bring the desired totalizer into operative relation with said mechanism, and manipulative means common to said actuating mechanism and said moving means for controlling the extent of movement of the same.

89. In a machine of the class described, the combination with a plurality of groups of totalizers, of actuating means therefor, means for positively driving said actuating means, and manipulative means common to the groups of totalizers for selecting during the same operation of the machine any of the totalizers of the groups for actuation and controlling the extent of movement of the actuating means.

90. In a machine of the class described, the combination with a plurality of totalizers, of common differential actuating mechanism therefor, means for effecting relative movement between the plurality of totalizers and the actuating mechanism to establish operative relation during the same operation of the machine between any desired totalizer and the actuating mechanism, and manipulative means common to said actuating mechanism and said means for controlling the same.

91. In a machine of the class described, the combination with a plurality of totalizers, of a plurality of actuators common thereto, means for effecting relative movement between the plurality of totalizers and the actuators to establish operative relation during the same operation of the machine between any desired totalizer and the actuators, and manipulative means common to the actuators and said means for controlling the same.

92. In a machine of the class described, the combination with a plurality of totalizers, of a plurality of actuators common thereto, means for effecting relative movement between the plurality of totalizers and the actuators to establish operative relation during the same operation of the machine between any desired totalizer and the actuators, and a series of keys common to the actuators and said means for controlling the same.

93. In a machine of the class described, the combination with three or more totalizers, of a common actuating means therefor, and common manipulative means for selecting during the same operation of the machine any of the totalizers for operation and controlling the extent of movement of the actuating mechanism.

94. In a machine of the class described, the combination with a plurality of totalizers, of a set of actuators common thereto, and common manipulative means for selecting during the same operation of the machine any of the totalizers for operation and controlling the extent of movement of the actuators.

95. In a machine of the class described, the combination with a plurality of totalizers, of a set of actuators common thereto, and keys common to the totalizers and the set of actuators and common to the various actuators of the set for selecting during the same operation of the machine any of the totalizers for operation and controlling the actuators.

96. In a machine of the class described, the combination with a plurality of groups of totalizers, of a set of actuators common thereto, and manipulative means common to the totalizers and the set of actuators, said means being common to the groups of totalizers for selecting during the same operation of the machine any of the totalizers for operation and common to the actuators of the set to control their operation.

97. In a machine of the class described, the combination with a plurality of groups of totalizers, of a set of actuators common thereto, and keys common to the totalizers and the set of actuators said keys being common to the groups of totalizers for selecting during the same operation of the machine any of the totalizers for operation and common to the actuators of the set to control their operation.

98. In a machine of the class described, the combination with a main operating mechanism, of a plurality of groups of totalizers, common actuating means therefor, selecting means operable during the same operation of the machine for selecting any of the totalizers for operation, and a series of keys common to the groups of totalizers for controlling said selecting means.

99. In a machine of the class described, the combination with a main operating mechanism, of a plurality of groups of totalizers, common actuating means therefor, selecting means operable during the same operation of the machine for selecting any of the totalizers for operation, and a series of keys common to the groups of totalizers for controlling said selecting means, and adapted to control the actuating means.

100. In a machine of the class described, the combination with a plurality of groups of totalizers, of actuating means therefor, and keys common to the groups of totalizers for selecting during the same operation of the machine any of the totalizers in the groups for actuation.

101. In a machine of the class described, the combination with a plurality of totalizers, of actuators therefor, means for selecting any of the totalizers for operation, a shiftable carriage carrying means controlling said actuators, and manipulative means common to the selecting means and the controlling means for controlling operation of both of said means, during the same operation of the machine.

102. In a machine of the class described, the combination with a plurality of totalizers, of common actuating mechanism therefor, and a series of depressible but non-arrestable keys for selecting during the same operation of the machine any of the totalizers for operation and controlling said actuating mechanism.

In testimony whereof I affix my signature.

HAAKON A. MARTIN.